(12) United States Patent
Perlman et al.

(10) Patent No.: US 12,341,582 B2
(45) Date of Patent: Jun. 24, 2025

(54) SYSTEMS AND METHODS FOR MITIGATING INTERFERENCE WITHIN ACTIVELY USED SPECTRUM

(71) Applicant: Rearden, LLC, Mountain View, CA (US)

(72) Inventors: Stephen G. Perlman, Palo Alto, CA (US); Antonio Forenza, San Francisco, CA (US); Mario Di Dio, San Francisco, CA (US); Fadi Saibi, San Francisco, CA (US)

(73) Assignee: Rearden, LLC, Mountain View, CA (US)

( * ) Notice: Subject to any disclaimer, the term of this patent is extended or adjusted under 35 U.S.C. 154(b) by 572 days.

(21) Appl. No.: 17/667,230

(22) Filed: Feb. 8, 2022

(65) Prior Publication Data

US 2022/0166474 A1 May 26, 2022

Related U.S. Application Data

(63) Continuation of application No. 17/361,252, filed on Jun. 28, 2021, now Pat. No. 11,290,162, which is a continuation of application No. 15/682,076, filed on Aug. 21, 2017, now Pat. No. 11,050,468, which is a continuation-in-part of application No. 14/672,014, filed on Mar. 27, 2015, now Pat. No. 11,190,947.

(60) Provisional application No. 62/380,126, filed on Aug. 26, 2016, provisional application No. 61/980,479, filed on Apr. 16, 2014.

(51) Int. Cl.
*H04B 7/0456* (2017.01)
*H04B 7/06* (2006.01)
*H04B 15/00* (2006.01)
*H04L 5/14* (2006.01)

(52) U.S. Cl.
CPC ......... *H04B 7/0456* (2013.01); *H04B 7/0626* (2013.01); *H04B 15/00* (2013.01); *H04L 5/14* (2013.01); *Y02D 30/70* (2020.08)

(58) Field of Classification Search
CPC .... H04B 7/0456; H04B 7/0626; H04B 15/00; H04L 5/14; Y02D 70/00; Y02D 70/142; Y02D 70/1242; Y02D 70/40; Y02D 70/1262

See application file for complete search history.

(56) References Cited

U.S. PATENT DOCUMENTS 4,003,016 A 1/1977 Rodeck
4,253,193 A 2/1981 Kennard et al.
(Continued)

FOREIGN PATENT DOCUMENTS

AU 2018200832 A1 2/2018
AU 2021261956 B2 12/2022
(Continued)

OTHER PUBLICATIONS

Non-Final Office Action, U.S. Appl. No. 13/633,702, Dec. 17, 2013, 21 pages.
(Continued)

*Primary Examiner* — Rina C Pancholi
(74) *Attorney, Agent, or Firm* — Amster, Rothstein & Ebenstein LLP

(57) ABSTRACT

Systems and methods are described to mitigate interference to out of band receivers using out of band training signals.

14 Claims, 17 Drawing Sheets

(56) References Cited

U.S. PATENT DOCUMENTS

| | | |
|---|---|---|
| 4,564,935 A | 1/1986 | Kaplan |
| 4,771,289 A | 9/1988 | Masak |
| 5,045,862 A | 9/1991 | Alden et al. |
| 5,088,091 A | 2/1992 | Schroeder et al. |
| 5,095,500 A | 3/1992 | Tayloe et al. |
| 5,097,485 A | 3/1992 | O'Connor et al. |
| 5,315,309 A | 5/1994 | Rudow et al. |
| 5,377,183 A | 12/1994 | Dent |
| 5,400,037 A | 3/1995 | East |
| 5,483,667 A | 1/1996 | Faruque |
| 5,555,257 A | 9/1996 | Dent |
| 5,600,326 A | 2/1997 | Yu et al. |
| 5,661,765 A | 8/1997 | Ishizu |
| 5,742,253 A | 4/1998 | Conroy et al. |
| 5,809,422 A | 9/1998 | Raleigh et al. |
| 5,838,671 A | 11/1998 | Ishikawa et al. |
| 5,872,814 A | 2/1999 | McMeekin |
| 5,983,104 A | 11/1999 | Wickman et al. |
| 6,005,516 A | 12/1999 | Reudink et al. |
| 6,005,856 A | 12/1999 | Jensen et al. |
| 6,014,107 A | 1/2000 | Wiesenfarth |
| 6,041,365 A | 3/2000 | Kleinerman |
| 6,052,582 A | 4/2000 | Blasing et al. |
| 6,061,021 A | 5/2000 | Zibell |
| 6,061,023 A | 5/2000 | Daniel et al. |
| 6,067,290 A | 5/2000 | Paulraj et al. |
| 6,232,921 B1 | 5/2001 | Aiken et al. |
| 6,252,912 B1 | 6/2001 | Salinger |
| 6,275,738 B1 | 8/2001 | Kasevich et al. |
| 6,308,080 B1 | 10/2001 | Burt et al. |
| 6,320,853 B1 | 11/2001 | Wong et al. |
| 6,323,823 B1 | 11/2001 | Wong et al. |
| 6,330,460 B1 | 12/2001 | Wong et al. |
| 6,377,782 B1 | 4/2002 | Bishop et al. |
| 6,400,761 B1 | 6/2002 | Smee et al. |
| 6,411,612 B1 | 6/2002 | Halford et al. |
| 6,421,543 B1 | 7/2002 | Molnar |
| 6,442,151 B1 | 8/2002 | H'mimy et al. |
| 6,445,910 B1 | 9/2002 | Oestreich |
| 6,448,937 B1 | 9/2002 | Aiken et al. |
| 6,453,177 B1 | 9/2002 | Wong et al. |
| 6,459,900 B1 | 10/2002 | Scheinert |
| 6,473,467 B1 | 10/2002 | Wallace et al. |
| 6,484,030 B1 | 11/2002 | Antoine et al. |
| 6,519,478 B1 | 2/2003 | Scherzer et al. |
| 6,611,231 B2 | 8/2003 | Crilly, Jr. et al. |
| 6,654,590 B2 | 11/2003 | Boros et al. |
| 6,668,161 B2 | 12/2003 | Boros et al. |
| 6,684,366 B1 | 1/2004 | Trott et al. |
| 6,697,644 B2 | 2/2004 | Scherzer et al. |
| 6,718,180 B1 | 4/2004 | Lundh et al. |
| 6,718,184 B1 | 4/2004 | Aiken et al. |
| 6,760,388 B2 | 7/2004 | Ketchum et al. |
| 6,760,599 B1 | 7/2004 | Uhlik |
| 6,760,603 B1 | 7/2004 | Scherzer et al. |
| 6,763,225 B1 | 7/2004 | Farmine et al. |
| 6,771,706 B2 | 8/2004 | Ling et al. |
| 6,785,341 B2 | 8/2004 | Walton et al. |
| 6,791,508 B2 | 9/2004 | Berry et al. |
| 6,794,939 B2 | 9/2004 | Kim et al. |
| 6,795,413 B1 | 9/2004 | Uhlik |
| 6,799,026 B1 | 9/2004 | Scherzer et al. |
| 6,801,580 B2 | 10/2004 | Kadous |
| 6,804,311 B1 | 10/2004 | Dabak et al. |
| 6,834,043 B1 | 12/2004 | Vook et al. |
| 6,836,673 B1 | 12/2004 | Trott |
| 6,847,832 B2 | 1/2005 | Wong et al. |
| 6,862,271 B2 | 3/2005 | Medvedev et al. |
| 6,888,795 B2 | 5/2005 | Gupta et al. |
| 6,888,809 B1 | 5/2005 | Foschini et al. |
| 6,888,899 B2 | 5/2005 | Raleigh et al. |
| 6,895,258 B1 | 5/2005 | Scherzer et al. |
| 6,901,062 B2 | 5/2005 | Scherzer et al. |
| 6,920,192 B1 | 7/2005 | Laroia et al. |
| 6,925,127 B1 | 8/2005 | Dent |
| 6,956,537 B2 | 10/2005 | Scherzer et al. |
| 6,963,742 B2 | 11/2005 | Boros et al. |
| 6,970,682 B2 | 11/2005 | Crilly, Jr. et al. |
| 6,978,150 B2 | 12/2005 | Hamabe |
| 6,996,060 B1 | 2/2006 | Dahlby et al. |
| 7,006,043 B1 | 2/2006 | Nalbandian |
| 7,013,144 B2 | 3/2006 | Yamashita et al. |
| 7,016,649 B1 | 3/2006 | Narasimhan et al. |
| 7,020,490 B2 | 3/2006 | Khatri |
| 7,027,415 B1 | 4/2006 | Dahlby et al. |
| 7,027,523 B2 | 4/2006 | Jalali et al. |
| 7,027,837 B1 | 4/2006 | Uhlik et al. |
| 7,031,336 B2 | 4/2006 | Scherzer et al. |
| 7,031,754 B2 | 4/2006 | Scherzer et al. |
| 7,068,704 B1 | 6/2006 | Orr |
| 7,072,413 B2 | 7/2006 | Walton et al. |
| 7,072,693 B2 | 7/2006 | Farlow et al. |
| 7,075,485 B2 | 7/2006 | Song et al. |
| 7,079,809 B1 | 7/2006 | Scherzer |
| 7,085,240 B2 | 8/2006 | Wu et al. |
| 7,095,723 B2 | 8/2006 | Sezgin et al. |
| 7,096,040 B1 | 8/2006 | Scherzer et al. |
| 7,116,723 B2 | 10/2006 | Kim et al. |
| 7,117,014 B1 | 10/2006 | Van Rensburg et al. |
| 7,120,440 B2 | 10/2006 | Cho et al. |
| 7,139,527 B2 | 11/2006 | Tamaki et al. |
| 7,142,154 B2 | 11/2006 | Quilter et al. |
| 7,154,936 B2 | 12/2006 | Bjerke et al. |
| 7,154,960 B2 | 12/2006 | Liu et al. |
| 7,158,493 B1 | 1/2007 | Uhlik et al. |
| 7,167,684 B2 | 1/2007 | Kadous et al. |
| 7,181,167 B2 | 2/2007 | Onggosanusi et al. |
| 7,184,492 B2 | 2/2007 | Dent |
| 7,193,991 B2 | 3/2007 | Melpignano et al. |
| 7,194,006 B2 | 3/2007 | Wong et al. |
| 7,197,082 B2 | 3/2007 | Alexiou et al. |
| 7,197,084 B2 | 3/2007 | Ketchum et al. |
| 7,197,282 B2 | 3/2007 | Dent et al. |
| 7,209,511 B2 | 4/2007 | Dent |
| 7,218,689 B2 | 5/2007 | Gupta |
| 7,224,942 B2 | 5/2007 | Dent |
| 7,227,855 B1 | 6/2007 | Barratt et al. |
| 7,242,724 B2 | 7/2007 | Alexiou et al. |
| 7,242,964 B1 | 7/2007 | Aiken et al. |
| 7,248,645 B2 | 7/2007 | Vialle et al. |
| 7,248,841 B2 | 7/2007 | Agee et al. |
| 7,248,879 B1 | 7/2007 | Walton et al. |
| 7,269,231 B2 | 9/2007 | Ding et al. |
| 7,272,294 B2 | 9/2007 | Zhou et al. |
| 7,299,071 B1 | 11/2007 | Barratt et al. |
| 7,310,680 B1 | 12/2007 | Graham |
| 7,313,403 B2 | 12/2007 | Gong et al. |
| 7,327,795 B2 | 2/2008 | Oprea |
| 7,333,540 B2 | 2/2008 | Yee |
| 7,336,626 B1 | 2/2008 | Barratt et al. |
| 7,339,906 B1 | 3/2008 | Dahlby et al. |
| 7,339,908 B2 | 3/2008 | Uhlik et al. |
| 7,352,774 B2 | 4/2008 | Uhlik et al. |
| 7,352,819 B2 | 4/2008 | Lakshmipathi et al. |
| 7,363,376 B2 | 4/2008 | Uhlik et al. |
| 7,366,202 B2 | 4/2008 | Scherzer et al. |
| 7,366,245 B2 | 4/2008 | Li et al. |
| 7,366,519 B2 | 4/2008 | Jason et al. |
| 7,369,841 B1 | 5/2008 | Uhlik et al. |
| 7,369,876 B2 | 5/2008 | Lee et al. |
| 7,394,858 B2 | 7/2008 | Sadowsky et al. |
| 7,406,315 B2 | 7/2008 | Uhlik et al. |
| 7,412,212 B2 | 8/2008 | Hottinen |
| 7,418,053 B2 | 8/2008 | Perlman et al. |
| 7,430,197 B1 | 9/2008 | Uhlik |
| 7,437,177 B2 | 10/2008 | Ozluturk et al. |
| 7,450,489 B2 | 11/2008 | Sandhu |
| 7,451,839 B2 | 11/2008 | Perlman |
| 7,471,736 B2 | 12/2008 | Ding et al. |
| 7,486,931 B2 | 2/2009 | Cho et al. |
| 7,492,743 B2 | 2/2009 | Uhlik |
| 7,499,548 B2 | 3/2009 | Meandzija et al. |
| 7,502,420 B2 | 3/2009 | Ketchum |
| 7,519,011 B2 | 4/2009 | Petrus et al. |

(56) References Cited

U.S. PATENT DOCUMENTS

| | | |
|---|---|---|
| 7,548,752 B2 | 6/2009 | Sampath et al. |
| 7,558,575 B2 | 7/2009 | Losh et al. |
| 7,599,420 B2 | 10/2009 | Forenza et al. |
| 7,599,443 B2 | 10/2009 | Ionescu et al. |
| 7,606,192 B2 | 10/2009 | Uhlik |
| 7,609,751 B1 | 10/2009 | Giallorenzi et al. |
| 7,616,698 B2 | 11/2009 | Sun et al. |
| 7,630,337 B2 | 12/2009 | Zheng et al. |
| 7,633,944 B1 | 12/2009 | Chang et al. |
| 7,633,994 B2 | 12/2009 | Forenza et al. |
| 7,636,381 B2 | 12/2009 | Forenza et al. |
| 7,684,753 B2 | 3/2010 | Ionescu et al. |
| 7,688,789 B2 | 3/2010 | Pan et al. |
| 7,689,639 B2 | 3/2010 | Dent |
| 7,719,993 B2 | 5/2010 | Li et al. |
| 7,729,316 B2 | 6/2010 | Uhlik |
| 7,729,433 B2 | 6/2010 | Jalloul et al. |
| 7,747,250 B2 | 6/2010 | Larsson et al. |
| 7,751,368 B2 | 7/2010 | Li et al. |
| 7,751,843 B2 | 7/2010 | Butala |
| 7,756,222 B2 | 7/2010 | Chen et al. |
| 7,801,490 B1 | 9/2010 | Scherzer |
| 7,849,173 B1 | 12/2010 | Uhlik |
| 7,864,663 B2 | 1/2011 | Dent |
| 7,948,444 B2 | 5/2011 | Signell et al. |
| 7,961,809 B2 | 6/2011 | Bourdoux et al. |
| 7,978,673 B1 | 7/2011 | Uhlik et al. |
| 7,986,742 B2 | 7/2011 | Ketchum et al. |
| 7,995,973 B2 | 8/2011 | Dent et al. |
| 8,041,362 B2 | 10/2011 | Li et al. |
| 8,081,944 B2 | 12/2011 | Li |
| 8,086,271 B2 | 12/2011 | Dent |
| 8,090,320 B2 | 1/2012 | Dent et al. |
| 8,116,710 B2 | 2/2012 | Dent et al. |
| 8,126,510 B1 | 2/2012 | Samson et al. |
| 8,170,081 B2 | 5/2012 | Forenza et al. |
| 8,260,198 B2 | 9/2012 | Yamaura |
| 8,320,432 B1 | 11/2012 | Chockalingam et al. |
| 8,428,177 B2 | 4/2013 | Tsai et al. |
| 8,451,764 B2 | 5/2013 | Chao et al. |
| 8,469,800 B2 | 6/2013 | Lemay et al. |
| 8,482,462 B2 | 7/2013 | Komijani et al. |
| 8,548,384 B2 | 10/2013 | Lee et al. |
| 8,612,619 B2 | 12/2013 | Guo et al. |
| 8,638,880 B2 | 1/2014 | Baldemair et al. |
| 8,654,815 B1 | 2/2014 | Forenza et al. |
| 8,675,768 B2 | 3/2014 | Xu et al. |
| 8,705,484 B2 | 4/2014 | Caire et al. |
| 8,731,480 B2 | 5/2014 | Kim et al. |
| 8,787,469 B2 | 7/2014 | Kim et al. |
| 8,797,970 B2 | 8/2014 | Xing et al. |
| 8,849,339 B2 | 9/2014 | Anto et al. |
| 8,902,862 B2 | 12/2014 | Yu et al. |
| 8,971,380 B2 | 3/2015 | Forenza et al. |
| 8,989,155 B2 | 3/2015 | Forenza et al. |
| 9,089,002 B2 | 7/2015 | Abraham et al. |
| 9,094,180 B2 | 7/2015 | Zirwas et al. |
| 9,179,495 B1 | 11/2015 | Scherzer et al. |
| 9,252,858 B2 | 2/2016 | Abbasfar et al. |
| 9,307,506 B1 | 4/2016 | Kelly et al. |
| 9,331,882 B2 | 5/2016 | Fehri et al. |
| 9,685,997 B2 | 6/2017 | Forenza et al. |
| 9,698,881 B2 | 7/2017 | Nammi et al. |
| 10,205,513 B1 | 2/2019 | Winters et al. |
| 10,277,290 B2 | 4/2019 | Forenza et al. |
| 10,349,417 B2 | 7/2019 | Forenza et al. |
| 10,637,554 B2 | 4/2020 | Zhu et al. |
| 10,749,583 B2 | 8/2020 | Park et al. |
| 10,804,985 B2 | 10/2020 | Ge et al. |
| 10,985,811 B2 | 4/2021 | Forenza et al. |
| 11,190,947 B2 | 11/2021 | Perlman et al. |
| 2001/0031647 A1 | 10/2001 | Scherzer et al. |
| 2002/0027985 A1 | 3/2002 | Rashid-Farrokhi |
| 2002/0041575 A1 | 4/2002 | Karabinis et al. |
| 2002/0051433 A1 | 5/2002 | Affes et al. |
| 2002/0061004 A1 | 5/2002 | Lomp et al. |
| 2002/0097705 A1 | 7/2002 | Sezgin et al. |
| 2002/0136169 A1 | 9/2002 | Struhsaker et al. |
| 2002/0142723 A1 | 10/2002 | Foschini et al. |
| 2002/0168017 A1 | 11/2002 | Berthet et al. |
| 2002/0177447 A1 | 11/2002 | Walton et al. |
| 2002/0181444 A1 | 12/2002 | Acampora |
| 2002/0193146 A1 | 12/2002 | Wallace et al. |
| 2003/0003863 A1 | 1/2003 | Thielecke et al. |
| 2003/0012315 A1 | 1/2003 | Fan |
| 2003/0036359 A1 | 2/2003 | Dent et al. |
| 2003/0043887 A1 | 3/2003 | Hudson |
| 2003/0043929 A1 | 3/2003 | Sampath |
| 2003/0045297 A1 | 3/2003 | Dent |
| 2003/0048753 A1 | 3/2003 | Jalali |
| 2003/0065779 A1 | 4/2003 | Malik et al. |
| 2003/0072379 A1 | 4/2003 | Ketchum |
| 2003/0092456 A1 | 5/2003 | Dent |
| 2003/0114165 A1 | 6/2003 | Mills |
| 2003/0114193 A1 | 6/2003 | Kavak et al. |
| 2003/0119556 A1 | 6/2003 | Khan et al. |
| 2003/0125026 A1 | 7/2003 | Tsunehara et al. |
| 2003/0125040 A1 | 7/2003 | Walton et al. |
| 2003/0128658 A1 | 7/2003 | Walton et al. |
| 2003/0139196 A1 | 7/2003 | Medvedev et al. |
| 2003/0147362 A1 | 8/2003 | Dick et al. |
| 2003/0148738 A1 | 8/2003 | Das et al. |
| 2003/0156056 A1 | 8/2003 | Perry |
| 2003/0161282 A1 | 8/2003 | Medvedev et al. |
| 2003/0211843 A1 | 11/2003 | Song et al. |
| 2003/0214431 A1 | 11/2003 | Hager et al. |
| 2003/0220112 A1 | 11/2003 | Bugeja |
| 2003/0235146 A1 | 12/2003 | Wu et al. |
| 2004/0009755 A1 | 1/2004 | Yoshida |
| 2004/0042556 A1 | 3/2004 | Medvedev et al. |
| 2004/0043784 A1 | 3/2004 | Czaja et al. |
| 2004/0051676 A1* | 3/2004 | Travis .................. H01Q 5/45 343/760 |
| 2004/0063450 A1 | 4/2004 | Uhlik |
| 2004/0082356 A1 | 4/2004 | Walton et al. |
| 2004/0095907 A1 | 5/2004 | Agee et al. |
| 2004/0097197 A1 | 5/2004 | Juncker et al. |
| 2004/0131011 A1 | 7/2004 | Sandell et al. |
| 2004/0136349 A1 | 7/2004 | Walton et al. |
| 2004/0152480 A1 | 8/2004 | Willars et al. |
| 2004/0170430 A1 | 9/2004 | Gorokhov |
| 2004/0176097 A1 | 9/2004 | Wilson et al. |
| 2004/0179627 A1 | 9/2004 | Ketchum et al. |
| 2004/0185909 A1 | 9/2004 | Alexiou et al. |
| 2004/0190636 A1 | 9/2004 | Oprea |
| 2004/0203347 A1 | 10/2004 | Nguyen |
| 2004/0203987 A1 | 10/2004 | Butala |
| 2004/0209579 A1 | 10/2004 | Vaidyanathan |
| 2004/0252632 A1 | 12/2004 | Bourdoux et al. |
| 2005/0003865 A1 | 1/2005 | Lastinger et al. |
| 2005/0020237 A1 | 1/2005 | Alexiou et al. |
| 2005/0024231 A1 | 2/2005 | Fincher et al. |
| 2005/0031047 A1 | 2/2005 | Maltsev et al. |
| 2005/0041750 A1 | 2/2005 | Lau |
| 2005/0041751 A1 | 2/2005 | Nir et al. |
| 2005/0042988 A1 | 2/2005 | Hoek et al. |
| 2005/0043031 A1 | 2/2005 | Cho et al. |
| 2005/0047515 A1 | 3/2005 | Walton et al. |
| 2005/0058217 A1 | 3/2005 | Sandhu et al. |
| 2005/0075110 A1 | 4/2005 | Posti et al. |
| 2005/0085267 A1 | 4/2005 | Lemson et al. |
| 2005/0096058 A1 | 5/2005 | Warner et al. |
| 2005/0101259 A1 | 5/2005 | Tong et al. |
| 2005/0101352 A1 | 5/2005 | Logothetis et al. |
| 2005/0111406 A1 | 5/2005 | Pasanen et al. |
| 2005/0111599 A1 | 5/2005 | Walton et al. |
| 2005/0148368 A1 | 7/2005 | Scheinert et al. |
| 2005/0157683 A1 | 7/2005 | Ylitalo et al. |
| 2005/0169396 A1 | 8/2005 | Baier et al. |
| 2005/0174977 A1 | 8/2005 | Pedlar et al. |
| 2005/0186991 A1 | 8/2005 | Bateman |
| 2005/0232135 A1 | 10/2005 | Mukai et al. |
| 2005/0239406 A1 | 10/2005 | Shattil |
| 2005/0259627 A1 | 11/2005 | Song et al. |

(56) References Cited

U.S. PATENT DOCUMENTS

| | | |
|---|---|---|
| 2005/0265273 A1 | 12/2005 | Karabinis et al. |
| 2005/0271009 A1 | 12/2005 | Shirakabe et al. |
| 2005/0287962 A1 | 12/2005 | Mehta et al. |
| 2006/0002496 A1 | 1/2006 | Wallace et al. |
| 2006/0023803 A1 | 2/2006 | Perlman et al. |
| 2006/0032979 A1 | 2/2006 | Mitchell et al. |
| 2006/0046658 A1 | 3/2006 | Cruz et al. |
| 2006/0050804 A1 | 3/2006 | Leclair |
| 2006/0056855 A1 | 3/2006 | Nakagawa et al. |
| 2006/0062180 A1 | 3/2006 | Sayeedi et al. |
| 2006/0098568 A1 | 5/2006 | Oh et al. |
| 2006/0098754 A1 | 5/2006 | Kim et al. |
| 2006/0146755 A1 | 7/2006 | Pan et al. |
| 2006/0159160 A1 | 7/2006 | Kim et al. |
| 2006/0159187 A1 | 7/2006 | Wang et al. |
| 2006/0165120 A1 | 7/2006 | Karabinis |
| 2006/0198461 A1 | 9/2006 | Hayase |
| 2006/0199584 A1 | 9/2006 | Bergstrom et al. |
| 2006/0203708 A1 | 9/2006 | Sampath et al. |
| 2006/0209979 A1 | 9/2006 | Sandell et al. |
| 2006/0264242 A1* | 11/2006 | Dent ............... H04B 7/18506 455/562.1 |
| 2006/0270359 A1 | 11/2006 | Karmi et al. |
| 2006/0281421 A1 | 12/2006 | Pan et al. |
| 2006/0287743 A1 | 12/2006 | Sampath et al. |
| 2006/0292990 A1 | 12/2006 | Karabinis et al. |
| 2007/0004337 A1 | 1/2007 | Biswas et al. |
| 2007/0015526 A1 | 1/2007 | Hansen |
| 2007/0025464 A1 | 2/2007 | Perlman |
| 2007/0054633 A1 | 3/2007 | Piirainen |
| 2007/0058590 A1 | 3/2007 | Wang et al. |
| 2007/0064823 A1 | 3/2007 | Hwang et al. |
| 2007/0066331 A1 | 3/2007 | Zheng et al. |
| 2007/0082674 A1 | 4/2007 | Pedersen et al. |
| 2007/0086400 A1 | 4/2007 | Shida et al. |
| 2007/0093273 A1 | 4/2007 | Cai |
| 2007/0093274 A1 | 4/2007 | Jafarkhani et al. |
| 2007/0099665 A1 | 5/2007 | Kim et al. |
| 2007/0132653 A1 | 6/2007 | Weller et al. |
| 2007/0135125 A1 | 6/2007 | Kim et al. |
| 2007/0183362 A1 | 8/2007 | Mondal et al. |
| 2007/0206504 A1 | 9/2007 | Koo et al. |
| 2007/0211747 A1 | 9/2007 | Kim |
| 2007/0220151 A1 | 9/2007 | Li et al. |
| 2007/0242782 A1 | 10/2007 | Han et al. |
| 2007/0243871 A1 | 10/2007 | Chen et al. |
| 2007/0249380 A1 | 10/2007 | Stewart et al. |
| 2007/0253508 A1 | 11/2007 | Zhou et al. |
| 2007/0254602 A1 | 11/2007 | Li et al. |
| 2007/0258531 A1 | 11/2007 | Chen et al. |
| 2007/0263736 A1 | 11/2007 | Yuda et al. |
| 2007/0280116 A1 | 12/2007 | Wang et al. |
| 2007/0284474 A1* | 12/2007 | Olson ............... G05D 1/0022 244/10 |
| 2007/0286298 A1 | 12/2007 | Choi et al. |
| 2008/0013644 A1 | 1/2008 | Hugl et al. |
| 2008/0051150 A1 | 2/2008 | Tsutsui |
| 2008/0080631 A1 | 4/2008 | Forenza et al. |
| 2008/0080635 A1 | 4/2008 | Hugl et al. |
| 2008/0089396 A1 | 4/2008 | Zhang et al. |
| 2008/0102881 A1 | 5/2008 | Han et al. |
| 2008/0107135 A1 | 5/2008 | Ibrahim |
| 2008/0117961 A1 | 5/2008 | Han et al. |
| 2008/0118004 A1 | 5/2008 | Forenza et al. |
| 2008/0125051 A1 | 5/2008 | Kim et al. |
| 2008/0130790 A1 | 6/2008 | Forenza et al. |
| 2008/0132281 A1 | 6/2008 | Kim et al. |
| 2008/0165866 A1 | 7/2008 | Teo et al. |
| 2008/0181285 A1 | 7/2008 | Hwang et al. |
| 2008/0192683 A1 | 8/2008 | Han et al. |
| 2008/0192697 A1 | 8/2008 | Shaheen |
| 2008/0200211 A1 | 8/2008 | Hwang et al. |
| 2008/0205538 A1 | 8/2008 | Han et al. |
| 2008/0214185 A1 | 9/2008 | Cho et al. |
| 2008/0227422 A1 | 9/2008 | Hwang et al. |
| 2008/0232394 A1 | 9/2008 | Kozek et al. |
| 2008/0233902 A1 | 9/2008 | Pan et al. |
| 2008/0239938 A1 | 10/2008 | Jalloul et al. |
| 2008/0260054 A1 | 10/2008 | Myung et al. |
| 2008/0261587 A1 | 10/2008 | Lennartson et al. |
| 2008/0267142 A1 | 10/2008 | Mushkin et al. |
| 2008/0268833 A1 | 10/2008 | Huang et al. |
| 2008/0292011 A1 | 11/2008 | Yang |
| 2008/0317014 A1 | 12/2008 | Veselinovic et al. |
| 2009/0010204 A1 | 1/2009 | Pratt, Jr. et al. |
| 2009/0023467 A1 | 1/2009 | Huang et al. |
| 2009/0034636 A1 | 2/2009 | Kotecha et al. |
| 2009/0041148 A1 | 2/2009 | Li et al. |
| 2009/0041151 A1 | 2/2009 | Khan et al. |
| 2009/0046678 A1 | 2/2009 | Lee et al. |
| 2009/0046800 A1 | 2/2009 | Xu et al. |
| 2009/0060013 A1 | 3/2009 | Ashikhmin et al. |
| 2009/0067402 A1 | 3/2009 | Forenza et al. |
| 2009/0069054 A1 | 3/2009 | Zangi et al. |
| 2009/0075686 A1 | 3/2009 | Gomadam et al. |
| 2009/0086648 A1 | 4/2009 | Xu et al. |
| 2009/0086855 A1 | 4/2009 | Jin et al. |
| 2009/0097448 A1 | 4/2009 | Vasudevan et al. |
| 2009/0135944 A1 | 5/2009 | Dyer et al. |
| 2009/0168914 A1 | 7/2009 | Chance et al. |
| 2009/0186611 A1* | 7/2009 | Stiles ............... H04B 7/18506 455/431 |
| 2009/0195355 A1 | 8/2009 | Mitchell |
| 2009/0202016 A1 | 8/2009 | Seong et al. |
| 2009/0207822 A1 | 8/2009 | Kim et al. |
| 2009/0209206 A1 | 8/2009 | Zou et al. |
| 2009/0227249 A1 | 9/2009 | Ylitalo |
| 2009/0227292 A1 | 9/2009 | Laroia et al. |
| 2009/0232245 A1 | 9/2009 | Lakkis |
| 2009/0254790 A1 | 10/2009 | Pi et al. |
| 2009/0262695 A1 | 10/2009 | Chen et al. |
| 2009/0268675 A1 | 10/2009 | Choi |
| 2009/0285156 A1 | 11/2009 | Huang et al. |
| 2009/0290517 A1 | 11/2009 | Rao et al. |
| 2009/0290632 A1 | 11/2009 | Wegener |
| 2009/0296650 A1 | 12/2009 | Venturino et al. |
| 2009/0316807 A1 | 12/2009 | Kim et al. |
| 2009/0318183 A1 | 12/2009 | Hugl et al. |
| 2010/0008331 A1 | 1/2010 | Li et al. |
| 2010/0034151 A1 | 2/2010 | Alexiou et al. |
| 2010/0068999 A1 | 3/2010 | Bangs et al. |
| 2010/0080163 A1 | 4/2010 | Krishnamoorthi et al. |
| 2010/0080323 A1 | 4/2010 | Mueck et al. |
| 2010/0098030 A1 | 4/2010 | Wang et al. |
| 2010/0099428 A1 | 4/2010 | Bhushan et al. |
| 2010/0119001 A1 | 5/2010 | Walton et al. |
| 2010/0128630 A1 | 5/2010 | Barak et al. |
| 2010/0150013 A1 | 6/2010 | Hara et al. |
| 2010/0157861 A1 | 6/2010 | Na et al. |
| 2010/0164802 A1 | 7/2010 | Li et al. |
| 2010/0172309 A1 | 7/2010 | Forenza et al. |
| 2010/0183099 A1 | 7/2010 | Toda et al. |
| 2010/0189191 A1 | 7/2010 | Taoka et al. |
| 2010/0195527 A1 | 8/2010 | Gorokhov et al. |
| 2010/0203887 A1 | 8/2010 | Kim |
| 2010/0220671 A1 | 9/2010 | Guillouard et al. |
| 2010/0220679 A1 | 9/2010 | Abraham et al. |
| 2010/0224725 A1 | 9/2010 | Perlman et al. |
| 2010/0227562 A1 | 9/2010 | Shim et al. |
| 2010/0232336 A1 | 9/2010 | Choudhury et al. |
| 2010/0234071 A1 | 9/2010 | Shabtay et al. |
| 2010/0238824 A1 | 9/2010 | Farajidana et al. |
| 2010/0238984 A1 | 9/2010 | Sayana et al. |
| 2010/0260060 A1 | 10/2010 | Abraham et al. |
| 2010/0260103 A1 | 10/2010 | Guey et al. |
| 2010/0260115 A1 | 10/2010 | Frederiksen et al. |
| 2010/0265842 A1 | 10/2010 | Khandekar et al. |
| 2010/0279625 A1 | 11/2010 | Ko et al. |
| 2010/0290369 A1 | 11/2010 | Hui et al. |
| 2010/0290382 A1 | 11/2010 | Hui et al. |
| 2010/0296591 A1 | 11/2010 | Xu et al. |
| 2010/0315966 A1 | 12/2010 | Weigand |
| 2010/0316154 A1 | 12/2010 | Park et al. |
| 2010/0316163 A1 | 12/2010 | Forenza et al. |

(56) References Cited

U.S. PATENT DOCUMENTS

| | | |
|---|---|---|
| 2010/0322176 A1 | 12/2010 | Chen et al. |
| 2010/0323611 A1 | 12/2010 | Choudhury |
| 2011/0002371 A1 | 1/2011 | Forenza et al. |
| 2011/0002410 A1 | 1/2011 | Forenza et al. |
| 2011/0002411 A1 | 1/2011 | Forenza et al. |
| 2011/0003606 A1 | 1/2011 | Forenza et al. |
| 2011/0003607 A1 | 1/2011 | Forenza et al. |
| 2011/0003608 A1 | 1/2011 | Forenza et al. |
| 2011/0007856 A1 | 1/2011 | Jang et al. |
| 2011/0017700 A1 | 1/2011 | Patcheak et al. |
| 2011/0019715 A1 | 1/2011 | Brisebois |
| 2011/0038436 A1 | 2/2011 | Kim et al. |
| 2011/0044193 A1 | 2/2011 | Forenza et al. |
| 2011/0051832 A1 | 3/2011 | Mergen et al. |
| 2011/0069638 A1 | 3/2011 | Ishizu et al. |
| 2011/0076954 A1 | 3/2011 | Wee et al. |
| 2011/0077038 A1 | 3/2011 | Montojo et al. |
| 2011/0085610 A1 | 4/2011 | Zhuang et al. |
| 2011/0086611 A1 | 4/2011 | Klein et al. |
| 2011/0090005 A1 | 4/2011 | Nakayama |
| 2011/0090840 A1 | 4/2011 | Lee et al. |
| 2011/0090885 A1 | 4/2011 | Safavi |
| 2011/0096736 A1 | 4/2011 | Kwon et al. |
| 2011/0105174 A1 | 5/2011 | Pelletier et al. |
| 2011/0111781 A1 | 5/2011 | Chen et al. |
| 2011/0135308 A1 | 6/2011 | Tarlazzi et al. |
| 2011/0142020 A1 | 6/2011 | Kang et al. |
| 2011/0142104 A1 | 6/2011 | Coldrey et al. |
| 2011/0149765 A1 | 6/2011 | Gorokhov et al. |
| 2011/0164597 A1 | 7/2011 | Amini et al. |
| 2011/0164697 A1 | 7/2011 | Liao et al. |
| 2011/0194504 A1 | 8/2011 | Gorokhov et al. |
| 2011/0195670 A1 | 8/2011 | Dakshinamurthy et al. |
| 2011/0199946 A1 | 8/2011 | Breit et al. |
| 2011/0205963 A1 | 8/2011 | Tang et al. |
| 2011/0207416 A1 | 8/2011 | Doi |
| 2011/0211485 A1 | 9/2011 | Xu et al. |
| 2011/0216662 A1 | 9/2011 | Nie et al. |
| 2011/0261769 A1 | 10/2011 | Ji et al. |
| 2011/0274053 A1 | 11/2011 | Baik et al. |
| 2011/0294527 A1 | 12/2011 | Brueck et al. |
| 2011/0305195 A1 | 12/2011 | Forck et al. |
| 2011/0306381 A1 | 12/2011 | Jia et al. |
| 2011/0310987 A1 | 12/2011 | Lee et al. |
| 2011/0310994 A1 | 12/2011 | Ko et al. |
| 2012/0002743 A1 | 1/2012 | Cavalcante et al. |
| 2012/0014415 A1 | 1/2012 | Su et al. |
| 2012/0014477 A1 | 1/2012 | Ko et al. |
| 2012/0021707 A1 | 1/2012 | Forrester et al. |
| 2012/0039254 A1 | 2/2012 | Stapleton et al. |
| 2012/0039320 A1 | 2/2012 | Lemson et al. |
| 2012/0039419 A1 | 2/2012 | Maddah-Ali et al. |
| 2012/0044111 A1 | 2/2012 | Nagoshi et al. |
| 2012/0046039 A1 | 2/2012 | Hagerman et al. |
| 2012/0051257 A1 | 3/2012 | Kim et al. |
| 2012/0051258 A1 | 3/2012 | Josso |
| 2012/0054172 A1 | 3/2012 | Agrawal et al. |
| 2012/0076023 A1 | 3/2012 | Ko et al. |
| 2012/0076028 A1 | 3/2012 | Ko et al. |
| 2012/0076042 A1 | 3/2012 | Chun et al. |
| 2012/0076236 A1 | 3/2012 | Ko et al. |
| 2012/0082038 A1 | 4/2012 | Xu et al. |
| 2012/0087261 A1 | 4/2012 | Yoo et al. |
| 2012/0087430 A1 | 4/2012 | Forenza et al. |
| 2012/0093078 A1 | 4/2012 | Perlman et al. |
| 2012/0106388 A1 | 5/2012 | Shimezawa et al. |
| 2012/0108278 A1 | 5/2012 | Kim et al. |
| 2012/0108928 A1 | 5/2012 | Tverskoy |
| 2012/0114021 A1 | 5/2012 | Chung et al. |
| 2012/0127977 A1 | 5/2012 | Copeland et al. |
| 2012/0163427 A1 | 6/2012 | Kim |
| 2012/0176982 A1 | 7/2012 | Zirwas et al. |
| 2012/0188988 A1 | 7/2012 | Chung et al. |
| 2012/0218968 A1 | 8/2012 | Kim et al. |
| 2012/0224528 A1 | 9/2012 | Tapia et al. |
| 2012/0230691 A1 | 9/2012 | Hui et al. |
| 2012/0236741 A1 | 9/2012 | Xu et al. |
| 2012/0236840 A1 | 9/2012 | Kim et al. |
| 2012/0252470 A1 | 10/2012 | Wong et al. |
| 2012/0257575 A1 | 10/2012 | Davydov et al. |
| 2012/0258657 A1 | 10/2012 | Scheinert |
| 2012/0275530 A1 | 11/2012 | Olesen et al. |
| 2012/0281555 A1 | 11/2012 | Gao et al. |
| 2012/0281622 A1 | 11/2012 | Saban et al. |
| 2012/0288022 A1 | 11/2012 | Guey et al. |
| 2012/0289284 A1 | 11/2012 | Kuningas |
| 2012/0300717 A1 | 11/2012 | Cepeda et al. |
| 2012/0314570 A1 | 12/2012 | Forenza et al. |
| 2012/0314649 A1 | 12/2012 | Forenza et al. |
| 2012/0314797 A1 | 12/2012 | Kummetz et al. |
| 2012/0328301 A1 | 12/2012 | Gupta et al. |
| 2013/0003658 A1 | 1/2013 | Stewart et al. |
| 2013/0010840 A1 | 1/2013 | Maddah-Ali et al. |
| 2013/0028109 A1 | 1/2013 | Joengren et al. |
| 2013/0033998 A1 | 2/2013 | Seo et al. |
| 2013/0038766 A1 | 2/2013 | Perlman et al. |
| 2013/0039168 A1 | 2/2013 | Forenza et al. |
| 2013/0039332 A1 | 2/2013 | Nazar et al. |
| 2013/0039349 A1 | 2/2013 | Ebrahimi et al. |
| 2013/0039387 A1 | 2/2013 | Qu |
| 2013/0044797 A1 | 2/2013 | Nammi |
| 2013/0051240 A1 | 2/2013 | Bhattad et al. |
| 2013/0058307 A1 | 3/2013 | Kim et al. |
| 2013/0064216 A1 | 3/2013 | Gao et al. |
| 2013/0077514 A1 | 3/2013 | Dinan |
| 2013/0077569 A1 | 3/2013 | Nam et al. |
| 2013/0083681 A1 | 4/2013 | Ebrahimi et al. |
| 2013/0089009 A1 | 4/2013 | Li et al. |
| 2013/0089159 A1 | 4/2013 | Liu |
| 2013/0094548 A1 | 4/2013 | Park |
| 2013/0114437 A1 | 5/2013 | Yoo et al. |
| 2013/0114763 A1 | 5/2013 | Park |
| 2013/0115986 A1 | 5/2013 | Mueck et al. |
| 2013/0128821 A1 | 5/2013 | Hooli et al. |
| 2013/0142290 A1 | 6/2013 | Farmanbar et al. |
| 2013/0170360 A1 | 7/2013 | Xu et al. |
| 2013/0188567 A1 | 7/2013 | Wang et al. |
| 2013/0195047 A1 | 8/2013 | Koivisto et al. |
| 2013/0195086 A1 | 8/2013 | Xu et al. |
| 2013/0195467 A1 | 8/2013 | Schmid et al. |
| 2013/0208604 A1 | 8/2013 | Lee et al. |
| 2013/0208671 A1 | 8/2013 | Royz et al. |
| 2013/0242890 A1 | 9/2013 | He et al. |
| 2013/0242956 A1 | 9/2013 | Hall |
| 2013/0272170 A1 | 10/2013 | Chatterjee et al. |
| 2013/0272250 A1 | 10/2013 | Shimezawa et al. |
| 2013/0272441 A1 | 10/2013 | Uyehara et al. |
| 2013/0273950 A1 | 10/2013 | Sun et al. |
| 2013/0286866 A1 | 10/2013 | Hammarwall et al. |
| 2013/0286958 A1 | 10/2013 | Liang et al. |
| 2013/0286997 A1 | 10/2013 | Davydov et al. |
| 2013/0315189 A1 | 11/2013 | Kim et al. |
| 2013/0315195 A1 | 11/2013 | Ko et al. |
| 2013/0315211 A1 | 11/2013 | Balan et al. |
| 2013/0322308 A1 | 12/2013 | Yu et al. |
| 2013/0329592 A1 | 12/2013 | Beale |
| 2013/0331114 A1 | 12/2013 | Gormley et al. |
| 2014/0010197 A1 | 1/2014 | Wang et al. |
| 2014/0016556 A1 | 1/2014 | Shimezawa et al. |
| 2014/0025999 A1 | 1/2014 | Kessler |
| 2014/0029490 A1 | 1/2014 | Kim et al. |
| 2014/0038619 A1 | 2/2014 | Moulsley |
| 2014/0056156 A1 | 2/2014 | Joengren |
| 2014/0064206 A1 | 3/2014 | Bao et al. |
| 2014/0086209 A1 | 3/2014 | Su et al. |
| 2014/0086296 A1 | 3/2014 | Badic et al. |
| 2014/0087680 A1 | 3/2014 | Luukkala et al. |
| 2014/0094169 A1 | 4/2014 | Takano |
| 2014/0112216 A1 | 4/2014 | Seo et al. |
| 2014/0113677 A1 | 4/2014 | Parkvall et al. |
| 2014/0133435 A1 | 5/2014 | Forenza et al. |
| 2014/0139037 A1 | 5/2014 | John et al. |
| 2014/0140225 A1 | 5/2014 | Wala |
| 2014/0146756 A1 | 5/2014 | Sahin et al. |

(56) References Cited

U.S. PATENT DOCUMENTS

| | | | |
|---|---|---|---|
| 2014/0153427 A1 | 6/2014 | Seo et al. |
| 2014/0185700 A1 | 7/2014 | Dong et al. |
| 2014/0198744 A1 | 7/2014 | Wang et al. |
| 2014/0206280 A1 | 7/2014 | Nilsson et al. |
| 2014/0219142 A1 | 8/2014 | Schulz et al. |
| 2014/0219152 A1 | 8/2014 | Anto et al. |
| 2014/0219202 A1 | 8/2014 | Kim et al. |
| 2014/0219267 A1 | 8/2014 | Eyuboglu et al. |
| 2014/0225788 A1 | 8/2014 | Schulz et al. |
| 2014/0226570 A1 | 8/2014 | Comeau et al. |
| 2014/0241209 A1 | 8/2014 | Pollakowski et al. |
| 2014/0241218 A1 | 8/2014 | Moshfeghi |
| 2014/0241240 A1 | 8/2014 | Kloper et al. |
| 2014/0245095 A1 | 8/2014 | Nammi et al. |
| 2014/0294108 A1 | 10/2014 | Etkin et al. |
| 2014/0295758 A1 | 10/2014 | Pedersen |
| 2014/0301278 A1 | 10/2014 | Ghosh et al. |
| 2014/0301345 A1 | 10/2014 | Kim et al. |
| 2014/0301493 A1 | 10/2014 | Govindswamy et al. |
| 2014/0307630 A1 | 10/2014 | Nagata et al. |
| 2014/0340255 A1 | 11/2014 | Meerkerk et al. |
| 2014/0340260 A1 | 11/2014 | Richards |
| 2014/0341143 A1 | 11/2014 | Yang et al. |
| 2014/0348077 A1 | 11/2014 | Chen et al. |
| 2014/0348090 A1 | 11/2014 | Nguyen et al. |
| 2014/0348131 A1 | 11/2014 | Duan et al. |
| 2015/0003311 A1 | 1/2015 | Feuersaenger et al. |
| 2015/0011197 A1 | 1/2015 | Tarraf et al. |
| 2015/0016317 A1 | 1/2015 | Park et al. |
| 2015/0049689 A1 | 2/2015 | Seo |
| 2015/0092416 A1 | 4/2015 | Potucek et al. |
| 2015/0098410 A1 | 4/2015 | Jongren et al. |
| 2015/0117392 A1 | 4/2015 | Hammarwall et al. |
| 2015/0118369 A1 | 4/2015 | Hyde et al. |
| 2015/0131750 A1 | 5/2015 | Xue et al. |
| 2015/0131751 A1 | 5/2015 | Bayesteh et al. |
| 2015/0133126 A1 | 5/2015 | Liu et al. |
| 2015/0181568 A1 | 6/2015 | Seo et al. |
| 2015/0229372 A1 | 8/2015 | Perlman et al. |
| 2015/0270882 A1 | 9/2015 | Shattil |
| 2015/0271003 A1 | 9/2015 | Kuchi et al. |
| 2015/0296533 A1 | 10/2015 | Park |
| 2015/0304855 A1 | 10/2015 | Perlman et al. |
| 2015/0305010 A1 | 10/2015 | Guan et al. |
| 2016/0013855 A1 | 1/2016 | Campos et al. |
| 2016/0061027 A1 | 3/2016 | Gao et al. |
| 2016/0094318 A1 | 3/2016 | Shattil |
| 2016/0157146 A1 | 6/2016 | Karabinis |
| 2016/0248559 A1 | 8/2016 | Guo et al. |
| 2016/0294455 A1 | 10/2016 | Forenza et al. |
| 2016/0302028 A1 | 10/2016 | Ling et al. |
| 2016/0302218 A1 | 10/2016 | Behravan et al. |
| 2016/0353290 A1 | 12/2016 | Nammi et al. |
| 2016/0374070 A1 | 12/2016 | Ghosh |
| 2019/0385057 A1 | 12/2019 | Litichever et al. |
| 2020/0084673 A1 | 3/2020 | Ahmadi |
| 2022/0141554 A1 | 5/2022 | Rodriguez et al. |

FOREIGN PATENT DOCUMENTS

| | | |
|---|---|---|
| CA | 1307842 C | 9/1992 |
| CA | 2011298 C | 5/1999 |
| CA | 2856772 A1 | 1/2006 |
| CA | 2838781 A1 | 1/2013 |
| CN | 1256803 A | 6/2000 |
| CN | 1516370 A | 7/2004 |
| CN | 1538636 A | 10/2004 |
| CN | 1703113 A | 11/2005 |
| CN | 1734972 A | 2/2006 |
| CN | 1820424 A | 8/2006 |
| CN | 1898973 A | 1/2007 |
| CN | 1980080 A | 6/2007 |
| CN | 101031129 A | 9/2007 |
| CN | 101238648 A | 8/2008 |
| CN | 101291503 A | 10/2008 |
| CN | 101310454 A | 11/2008 |
| CN | 101405965 A | 4/2009 |
| CN | 101442388 A | 5/2009 |
| CN | 101494491 A | 7/2009 |
| CN | 101536320 A | 9/2009 |
| CN | 101542938 A | 9/2009 |
| CN | 101682432 A | 3/2010 |
| CN | 101861718 A | 10/2010 |
| CN | 101873281 A | 10/2010 |
| CN | 101981826 A | 2/2011 |
| CN | 102007707 A | 4/2011 |
| CN | 102027636 A | 4/2011 |
| CN | 102158272 A | 8/2011 |
| CN | 102185641 A | 9/2011 |
| CN | 102186541 A | 9/2011 |
| CN | 102439891 A | 5/2012 |
| CN | 102594420 A | 7/2012 |
| CN | 102948085 A | 2/2013 |
| CN | 103069903 A | 4/2013 |
| CN | 103117975 A | 5/2013 |
| CN | 103152807 A | 6/2013 |
| CN | 103201958 A | 7/2013 |
| CN | 103797725 A | 5/2014 |
| CN | 104025684 A | 9/2014 |
| CN | 104038245 A | 9/2014 |
| CN | 104335625 A | 2/2015 |
| CN | 105119794 A | 12/2015 |
| CN | 105981340 A | 9/2016 |
| EP | 1359683 A1 | 11/2003 |
| EP | 1392029 A1 | 2/2004 |
| EP | 1597842 A1 | 11/2005 |
| EP | 2244390 A2 | 10/2010 |
| EP | 2252109 A1 | 11/2010 |
| EP | 2889957 A1 | 7/2015 |
| EP | 2904814 A1 | 8/2015 |
| EP | 3419188 A1 | 12/2018 |
| GB | 2300547 A | 11/1996 |
| JP | 02-210897 A | 8/1990 |
| JP | 11-252613 A | 9/1999 |
| JP | 2001-217759 A | 8/2001 |
| JP | 2002-281551 A | 9/2002 |
| JP | 2002-374224 A | 12/2002 |
| JP | 2003-018054 A | 1/2003 |
| JP | 2003-051775 A | 2/2003 |
| JP | 2003-134013 A | 5/2003 |
| JP | 2003-179948 A | 6/2003 |
| JP | 2003-284128 A | 10/2003 |
| JP | 2004-502376 A | 1/2004 |
| JP | 2004-104206 A | 4/2004 |
| JP | 2005-039822 A | 2/2005 |
| JP | 2005-159448 A | 6/2005 |
| JP | 2006-081162 A | 3/2006 |
| JP | 2006-245871 A | 9/2006 |
| JP | 2007-060106 A | 3/2007 |
| JP | 2007-116686 A | 5/2007 |
| JP | 2008-035287 A | 2/2008 |
| JP | 2009-213052 A | 9/2009 |
| JP | 2009-273167 A | 11/2009 |
| JP | 2009-540692 A | 11/2009 |
| JP | 2010-016674 A | 1/2010 |
| JP | 2010-021999 A | 1/2010 |
| JP | 2010-068496 A | 3/2010 |
| JP | 2010-074520 A | 4/2010 |
| JP | 2010-193189 A | 9/2010 |
| JP | 2010-206794 A | 9/2010 |
| JP | 2010-537577 A | 12/2010 |
| JP | 2011-035912 A | 2/2011 |
| JP | 2011-078025 A | 4/2011 |
| JP | 2011-097225 A | 5/2011 |
| JP | 2011-517393 A | 6/2011 |
| JP | 2011-524117 A | 8/2011 |
| JP | 2011-176493 A | 9/2011 |
| JP | 2012-120063 A | 6/2012 |
| JP | 2012-124859 A | 6/2012 |
| JP | 2012-175189 A | 9/2012 |
| JP | 2012-521180 A | 9/2012 |
| JP | 2012-532495 A | 12/2012 |
| JP | 2013-502117 A | 1/2013 |
| JP | 2013-507064 A | 2/2013 |

(56) References Cited

FOREIGN PATENT DOCUMENTS

| | | |
|---|---|---|
| JP | 2013-102450 A | 5/2013 |
| JP | 2016-513940 A | 5/2016 |
| KR | 10-2008-0081698 A | 9/2008 |
| KR | 10-2009-0132625 A | 12/2009 |
| KR | 10-2010-0057071 A | 5/2010 |
| KR | 10-2012-0003781 A | 1/2012 |
| KR | 10-2012-0024836 A | 3/2012 |
| KR | 10-2012-0084243 A | 7/2012 |
| KR | 10-2012-0119175 A | 10/2012 |
| KR | 10-2018-0061394 A | 6/2018 |
| KR | 10-2012-0001598 A | 1/2021 |
| RU | 2330381 C2 | 7/2008 |
| RU | 2010110620 A | 9/2011 |
| RU | 2455779 C2 | 7/2012 |
| RU | 2012121952 A | 2/2014 |
| RU | 2543092 C2 | 2/2015 |
| TW | 201031243 A | 8/2010 |
| TW | 201112665 A | 4/2011 |
| TW | 201212570 A | 3/2012 |
| TW | 201220741 A | 5/2012 |
| TW | 201225563 A | 6/2012 |
| TW | 201626760 A | 7/2016 |
| WO | 99/23767 A1 | 5/1999 |
| WO | 00/54463 A1 | 9/2000 |
| WO | 02/01732 A2 | 1/2002 |
| WO | 02/08785 A1 | 1/2002 |
| WO | 02/54626 A1 | 7/2002 |
| WO | 02/93784 A1 | 11/2002 |
| WO | 02/99995 A2 | 12/2002 |
| WO | 03/03604 A1 | 1/2003 |
| WO | 03/84092 A2 | 10/2003 |
| WO | 03/94460 A2 | 11/2003 |
| WO | 2003/107582 A2 | 12/2003 |
| WO | 2004/017586 A1 | 2/2004 |
| WO | 2004/073210 A1 | 8/2004 |
| WO | WO-2004075454 A2 * | 9/2004 ............ H04W 88/08 |
| WO | 2004/095719 A2 | 11/2004 |
| WO | 2005/046081 A1 | 5/2005 |
| WO | 2005/064871 A1 | 7/2005 |
| WO | 2006/049417 A1 | 5/2006 |
| WO | 2006/063138 A2 | 6/2006 |
| WO | 2006/078019 A1 | 7/2006 |
| WO | 2006/110737 A2 | 10/2006 |
| WO | 2006/113872 A1 | 10/2006 |
| WO | 2007/024913 A1 | 3/2007 |
| WO | 2007/027825 A2 | 3/2007 |
| WO | 2007/046621 A1 | 4/2007 |
| WO | 2007/114654 A1 | 10/2007 |
| WO | 2008/119216 A1 | 10/2008 |
| WO | 2009/026400 A1 | 2/2009 |
| WO | 2009/099752 A1 | 8/2009 |
| WO | 2009/125962 A2 | 10/2009 |
| WO | 2009/151989 A2 | 12/2009 |
| WO | 2010/017482 A1 | 2/2010 |
| WO | 2010/019524 A2 | 2/2010 |
| WO | 2010/067419 A1 | 6/2010 |
| WO | 2011/017700 A1 | 2/2011 |
| WO | 2011/018121 A1 | 2/2011 |
| WO | 2011/099802 A2 | 8/2011 |
| WO | 2011/100492 A1 | 8/2011 |
| WO | 2011/116824 A1 | 9/2011 |
| WO | 2011/155763 A2 | 12/2011 |
| WO | 2012/000278 A1 | 1/2012 |
| WO | 2012/001086 A1 | 1/2012 |
| WO | 2012/007837 A1 | 1/2012 |
| WO | 2012/024454 A1 | 2/2012 |
| WO | 2012/044111 A2 | 4/2012 |
| WO | 2012/044969 A1 | 4/2012 |
| WO | 2012/058600 A2 | 5/2012 |
| WO | 2012/061325 A1 | 5/2012 |
| WO | 2012/091342 A2 | 7/2012 |
| WO | 2012/108807 A1 | 8/2012 |
| WO | 2012/108928 A1 | 8/2012 |
| WO | 2012/108976 A1 | 8/2012 |
| WO | 2012/130071 A1 | 10/2012 |
| WO | 2013/040089 A2 | 3/2013 |
| WO | 2013/114335 A1 | 8/2013 |
| WO | 2013/166464 A1 | 11/2013 |
| WO | 2013/173809 A1 | 11/2013 |
| WO | 2014/055294 A1 | 4/2014 |
| WO | 2014/082048 A1 | 5/2014 |
| WO | 2015/160497 A1 | 10/2015 |
| WO | 2016/037305 A1 | 3/2016 |
| WO | 2016/057304 A1 | 4/2016 |

OTHER PUBLICATIONS

Non-Final Office Action, U.S. Appl. No. 13/844,355, Jan. 8, 2015, 23 pages.
Non-Final Office Action, U.S. Appl. No. 14/023,302, Jul. 17, 2014, 37 pages.
Non-Final Office Action, U.S. Appl. No. 14/086,700, Apr. 2, 2015, 12 pages.
Non-Final Office Action, U.S. Appl. No. 14/611,565, Aug. 31, 2015, 21 pages.
Non-Final Office Action, U.S. Appl. No. 14/611,565, Mar. 14, 2017, 23 pages.
Non-Final Office Action, U.S. Appl. No. 14/672,014, Dec. 30, 2016, 7 pages.
Non-Final Office Action, U.S. Appl. No. 14/672,014, Jun. 14, 2018, 129 pages.
Non-Final office action, U.S. Appl. No. 15/057,002, Oct. 23, 2017, 60 pages.
Non-Final Office Action, U.S. Appl. No. 15/201,276, Jan. 25, 2018, 77 pages.
Non-Final Office Action, U.S. Appl. No. 15/201,276, Mar. 1, 2017, 107 pages.
Non-Final Office Action, U.S. Appl. No. 15/340,914, Apr. 25, 2018, 15 pages.
Non-Final Office Action, U.S. Appl. No. 15/340,914, Jul. 21, 2017, 114 pages.
Non-Final Office Action, U.S. Appl. No. 15/616,817, Nov. 1, 2017, 14 pages.
Non-Final Office Action, U.S. Appl. No. 16/436,864, Mar. 4, 2020, 6 pages.
Notice of Acceptance from foreign counterpart Australian Patent Application No. 20160219662, dated May 5, 2017, 3 pages.
Notice of Acceptance from foreign counterpart Australian Patent Application No. AU20140200745, dated Sep. 19, 2016, 3 page.
Notice of Acceptance from foreign counterpart New Zealand Patent Application No. 610463 dated Aug. 5, 2015, 1 page.
Notice of Acceptance from foreign counterpart New Zealand Patent Application No. 717370, dated Jan. 10, 2018, 1 page.
Notice of Acceptance, AU App. No. 2012308632, Sep. 13, 2017, 4 pages.
Notice of Acceptance, AU App. No. 2017210619, Oct. 14, 2019, 4 pages.
Notice of Acceptance, AU App. No. 2018201553, Nov. 14, 2019, 4 pages.
Notice of Acceptance, AU App. No. 2018253582, Nov. 18, 2019, 3 pages.
Notice of Acceptance, AU Patent App. No. 2013327697, Feb. 15, 2017, 4 pages.
Notice of Acceptance, AU Patent App. No. 2014248533, Jun. 28, 2017, 4 pages.
Notice of Acceptance, New Zealand Patent App. No. 729017, Jun. 28, 2018, 1 page.
Notice of Acceptance, NZ App. No. 738000, Jun. 4, 2019, 1 page.
Notice of Acceptance, NZ App. No. 751530, May 1, 2020, 2 pages.
Notice of Allowance and Search Report, TW Patent App. No. 102134408, Feb. 17, 2017, 9 pages.
Notice of Allowance from counterpart MX Patent App. No. MX/a/2014/002900, Nov. 26, 2015, 4 pages. Translation attached.
Notice of Allowance, U.S. Appl. No. 12/802,976, Mar. 14, 2011, 9 pages.
Notice of Allowance, AU Patent App. No. 2011323559, May 13, 2016, 2 pages.
Notice of Allowance, CA App. No. 2,848,355, Apr. 3, 2020, 1 page.

(56) References Cited

OTHER PUBLICATIONS

Notice of Allowance, CA App. No. 2695799, Feb. 9, 2016, 1 page.
Notice of Allowance, CA App. No. 2816556, May 18, 2021, 1 page.
Notice of Allowance, Canadian Patent App. No. P14906, Jun. 1, 2015, 1 page.
Notice of Allowance, CN App. No. 201480016091.6, Apr. 24, 2020, 8 pages (3 pages of English Translation and 5 pages of Original Document).
Notice of Allowance, IL App. No. 248265, May 7, 2020, 3 pages.
Notice of Allowance, IL App. No. 269145, Aug. 23, 2020, 3 pages of Original Document Only.
Notice of Allowance, KR App. No. 10-2014-7009876, Oct. 4, 2019, 3 pages (1 page of English Translation and 2 pages of Original Document).
Notice of Allowance, KR App. No. 10-2015-7014235, Oct. 28, 2020, 3 pages (1 pages of English Translation and 2 page of Original Document).
Notice of Allowance, KR App. No. 10-2017-7002596, Feb. 27, 2019, 3 pages.
Notice of Allowance, KR App. No. 10-2018-7035654, Oct. 2, 2019, 4 pages (2 pages of English Translation and 2 pages of Original Document).
Notice of Allowance, KR Patent App. No. 2015-7002560, Feb. 4, 2016, 2 Pages.
Notice of Allowance, KR. App. No. 10-2014-7035524, Oct. 14, 2020, 4 pages (1 page of English Translation and 3 pages of Original Document).
Notice of Allowance, TW App. No. 107123446, Nov. 20, 2019, 3 pages of Original Document Only.
Notice of Allowance, U.S. Appl. No. 16/578,265, Jan. 28, 2021, 7 pages.
Notice of Allowance, U.S. Appl. No. 10/817,731, Sep. 30, 2010, 6 pages.
Notice of Allowance, U.S. Appl. No. 10/902,978, Apr. 16, 2008, 7 pages.
Notice of Allowance, U.S. Appl. No. 10/902,978, Jun. 27, 2008, 7 pages.
Non-Final Office Action, U.S. Appl. No. 11/256,478, Sep. 19, 2008, 14 pages.
Non-Final Office Action, U.S. Appl. No. 11/894,362, Oct. 29, 2008, 17 pages.
Non-Final Office Action, U.S. Appl. No. 11/894,394, Oct. 28, 2008, 13 pages.
Non-Final Office Action, U.S. Appl. No. 11/894,540, Apr. 29, 2009, 8 pages.
Non-Final Office Action, U.S. Appl. No. 11/894,540, Oct. 29, 2008, 13 pages.
Non-Final Office Action, U.S. Appl. No. 12/143,503, Dec. 9, 2010, 15 pages.
Non-Final Office Action, U.S. Appl. No. 12/630,627, Aug. 22, 2012, 23 pages.
Non-Final Office Action, U.S. Appl. No. 12/630,627, Mar. 16, 2011, 5 pages.
Non-Final Office Action, U.S. Appl. No. 12/637,643, Jun. 7, 2012, 25 pages.
Non-Final Office Action, U.S. Appl. No. 12/637,643, Sep. 23, 2011, 18 pages.
Non-Final Office Action, U.S. Appl. No. 12/802,958, Aug. 13, 2015, 22 pages.
Non-Final Office Action, U.S. Appl. No. 12/802,958, Jan. 16, 2018, 118 pages.
Non-Final Office Action, U.S. Appl. No. 12/802,958, Nov. 4, 2016, 19 pages.
Non-Final Office Action, U.S. Appl. No. 12/802,958, Nov. 21, 2012, 17 pages.
Non-Final Office Action, U.S. Appl. No. 12/802,974, Apr. 24, 2015, 27 pages.
Non-Final Office Action, U.S. Appl. No. 12/802,974, Dec. 19, 2012, 7 pages.
Non-Final Office Action, U.S. Appl. No. 12/802,975, Aug. 1, 2013, 21 pages.
Non-Final Office Action, U.S. Appl. No. 12/802,975, Dec. 19, 2012, 16 pages.
Non-Final Office Action, U.S. Appl. No. 12/802,975, Jan. 14, 2019, 112 pages.
Non-Final Office Action, U.S. Appl. No. 12/802,975, Jul. 1, 2016, 21 pages.
Non-Final Office Action, U.S. Appl. No. 12/802,975, Sep. 14, 2017, 23 pages.
Non-Final Office Action, U.S. Appl. No. 12/802,988, Apr. 17, 2012, 10 pages.
Non-Final Office Action, U.S. Appl. No. 12/802,988, Aug. 15, 2016, 19 pages.
Non-Final Office Action, U.S. Appl. No. 12/802,988, Sep. 15, 2017, 11 pages.
Non-Final Office Action, U.S. Appl. No. 12/802,989, Jun. 14, 2012, 10 pages.
Non-Final Office Action, U.S. Appl. No. 12/802,989, Mar. 30, 2016, 35 pages.
Non-Final Office Action, U.S. Appl. No. 13/232,996, Jun. 20, 2016, 30 pages.
Non-Final Office Action, U.S. Appl. No. 13/232,996, Mar. 21, 2014, 9 pages.
Non-Final Office Action, U.S. Appl. No. 13/232,996, Nov. 5, 2018, 36 pages.
Non-Final Office Action, U.S. Appl. No. 13/232,996, Sep. 21, 2017, 15 pages.
Non-Final Office Action, U.S. Appl. No. 13/464,648, Feb. 12, 2013, 12 pages.
Non-Final Office Action, U.S. Appl. No. 13/475,598, Dec. 30, 2013, 16 pages.
Non-Final Office Action, U.S. Appl. No. 13/797,950, Jan. 11, 2017, 65 pages.
Non-Final Office Action, U.S. Appl. No. 13/797,950, May 11, 2015, 61 pages.
Non-Final Office Action, U.S. Appl. No. 13/797,971, May 11, 2015, 52 pages.
Non-Final Office Action, U.S. Appl. No. 13/797,971, Oct. 4, 2016, 56 pages.
Non-Final Office Action, U.S. Appl. No. 13/797,984, Feb. 28, 2017, 13 pages.
Non-Final Office Action, U.S. Appl. No. 13/797,984, Jan. 14, 2016, 14 pages.
Non-Final Office Action, U.S. Appl. No. 13/797,984, Jan. 29, 2015, 15 pages.
Non-Final Office Action, U.S. Appl. No. 13/844,355, Apr. 18, 2016, 21 pages.
Non-Final Office Action, U.S. Appl. No. 13/844,355, Aug. 27, 2018, 39 pages.
Non-Final Office Action, U.S. Appl. No. 13/844,355, Jun. 30, 2017, 159 pages.
Non-final Office Action, U.S. Appl. No. 13/844,355, Mar. 21, 2019, 31 pages.
Non-Final Office Action, U.S. Appl. No. 14/023,302, Jun. 11, 2015, 8 pages.
Non-Final Office Action, U.S. Appl. No. 14/086,700, Mar. 4, 2016, 10 pages.
Non-Final Office Action, U.S. Appl. No. 14/086,700, May 25, 2017, 12 pages.
Non-Final Office Action, U.S. Appl. No. 14/156,254, Sep. 11, 2014, 44 pages.
Non-Final Office Action, U.S. Appl. No. 14/611,565, Apr. 19, 2018, 141 pages.
Non-Final Office Action, U.S. Appl. No. 14/611,565, Apr. 4, 2019, 35 pages.
Non-Final Office Action, U.S. Appl. No. 14/611,565, Feb. 26, 2021, 11 pages.
Third Office Action, CN App. No. 201480016091.6, Jul. 10, 2019, 5 pages (2 pages of English Translation and 3 pages of Original Document).
Third Office Action, MX App. No. MX/a/2014/013795, Jul. 27, 2016, 6 pages.

(56) References Cited

OTHER PUBLICATIONS

Tomlinson M., "New Automatic Equaliser Employing Modulo Arithmetic," Electronics Letters, 1971, vol. 7 (5/6), pp. 138-139.
Tran et al. "A Conic Quadratic Programming Approach to Physical Layer Multicasting for Large-Scale Antenna Arrays," IEEE Signal Processing Letters, Jan. 1, 2014, vol. 21, No. 1, pp. 114-117.
Truong K.T., et al. "Effects of Channel Aging in Massive MIMO Systems," Journal of Communications and Networks, Special Issue on Massive MIMO, 2013, vol. 15 (4), pp. 338-351.
Truong K.T., et al., "The Viability of Distributed Antennas for Massive MIMO Systems," Proceedings of the Asilomar Conference on Signals, Systems, and Computers, Pacific Grove, CA, Nov. 3-6, 2013, pp. 1318-1323.
Tsakalaki et al., "On the Beamforming Performance of Large-Scale Antenna Arrays", Proc. Loughborough Antennas and Propagation Conference (LAPC), Nov. 12-13, 2012, 4 pages.
Tse et al., "Diversity-multiplexing tradeoff in multiple-access channels", IEEE Trans. Info. Th., Mar. 2004, vol. 50, No. 9, pp. 1859-1874.
Tse et al., "Performance Tradeoffs between Maximum Ratio Transmission and Switched-Transmit Diversity", in Proc. 11.sup.th IEEE International Symposium on Personal, Indoor and Mobile Radio Communication, vol. 2, Sep. 2000, pp. 1485-1489.
Tureli et al., "OFDM blind carrier offset estimation: ESPRIT", IEEE Trans. Commun., vol. 48, No. 9, Sep. 2000, pp. 1459-1461.
Tyler et al., "Adaptive antennas: the Calibration Problem", IEEE Comm. Mag., Dec. 2004, pp. 114-122.
Ubuquiti, "airFiber", Available Online at <http:f/www.ubnt.com/airfiber>, Retreived on Sep. 4, 2015, 10 pages.
Ubuquiti, "airMAX", Available Online at <http:www.ubnt.comairmax>, 2015, 10 pages.
Uthansakul P., et al., MIMO antenna selection using CSI from reciprocal channel, Int. Journal of Elect. and Info. Eng., 2010, vol. 4, No. 10, pp. 482-491.
Valkama et al., "Advanced methods for 1/Q imbalance compensation in communication receivers," IEEE Transactions on Signal Processing, vol. 49, No. 10, 2001, pp. 2335-2344.
Van De Beek et al., "ML estimation of time and frequency offset in OFDM systems", Signal Processing, IEEE Transactions on [see also Acoustics, Speech, and Signal Processing, IEEE Transactions, vol. 45, No. 7, Jul. 1997, pp. 1800-1805.
Van et al., "Beamforming: A Versatile Approach to Spatial Filtering," IEEE ASSP Magazine, 1988, pp. 4-24.
Vance, A., "Steve Perlman's wireless fix", Businessweek, Available Online at <http://www.businessweek.com/magazine/the-edison-of-silicon-valley-727-2011.html>, Jul. 2011, 10 pages.
Vaughan R. G., "On Optimum Combining at the Mobile," IEEE Transactions on Vehicular Technology, Nov. 1988, vol. 37, No. 4, pp. 181-188.
Vaughn R., et al., "Switched parasitic elements for antenna diversity," IEEE Transactions on Antennas and Propagation, 1999, vol. 47, pp. 399-405.
Venkatesan et al., "A WiMAX-Based Implementation of Network MIMO for Indoor Wireless Systems," EURASIP Journal on Advances in Signal Processing, 2009, vol. 2009, 11 pages.
Venkatesan et al., "Network MIMO: Overcoming InterCell Interference in Indoor Wireless Systems," Asilomar Conference on Signals, 2007, vol. 2007, pp. 83-87.
Vieira et al., "A flexible 100-antenna testbed for Massive MIMO," in Proc IEEE Globecom 2014 Workshop—Massive MIMO: From Theory to Practice, Austin, Texas, USA, Dec. 2014, pp. 287-293.
Vishwanath, S, "Duality, Achievable Rates, and Sum-Rate Capacity of Gaussian MIMO Broadcast Channels," IEEE Trans. Info. Th., vol. 49, No. 10, pp. 2658-2668, Oct. 2003.
Visotsky E., et al., "Space-Time Transmit Precoding with Imperfect Feedback," IEEE Transactions on Information Theory, 2001, vol. 47, pp. 2632-2639.
Visuri et al "Colocated Antenna Arrays: Design Desiderata for Wireless Communications," 2002, vol. 2002, pp. 580-584.

Viswanath et al., "Opportunistic beamforming using dump antennas," IEEE Transactions on Information Theory, 2002, vol. 48, pp. 1277-1294.
Viswanath, "Sum Capacity of the Vector Gaussian Broadcast Channel and Uplink-Downlink Duality," IEEE Transactions on Information Theory, 2003, vol. 49, No. 8, pp. 1912-1921.
Wagner et al., "Large System Analysis of Linear Precoding in MISO Broadcast Channels with Limited Feedback," IEEE Transactions on Information Theory, 2012, vol. 58, No. 7, pp. 4509-4537.
Waldschmidt et al., "Compact MIMO-arrays based on polarisation-diversity", Proc. IEEE Antennas and Prop. Symp., 2003, vol. 2, pp. 499-502.
Waldschmidt et al., "Complete RF system model for analysis of compact MIMO arrays," IEEE Trans. on Vehicular Technologies, 2004, vol. 53, pp. 579-586.
Wallace et al., "Statistical Characteristics of Measured MIMO Wireless Channel Data and Comparison to Conventional Models," Proceedings IEEE Vehicular Technology Conference, Oct. 2001, vol. 2 (7-11), pp. 1078-1082.
Wallace et al., "Termination-dependent diversity performance of coupled antennas: Network theory analysis,", IEEE Trans. Antennas Propagat., vol. 52, Jan. 2004, pp. 98-105.
Wang Z., "Performance of Uplink Multiuser Massive MIMO system," International Conference on Acoustics Speech and Signal Processing, Florence, Italy, Nov. 6, 2013, 5 pages.
Wang Z., et al., "Enhanced downlink MU-Comp schemes for TD-LTE-Advanced," Wireless Communications and Networking Conference (WCNC), IEEE, 2010, 6 pages.
Wannstrom J., "Carrier Aggregation Explained," 3GPP, Available Online at <http://www.3gpp.org/Carrier-Aggregation-explained>, Jun. 2013, 6 pages.
Warrington et al. "Measurement and Modeling of HF Channel Directional Spread Characteristics for Northerly Paths", Radio Science, vol. 41, RS2006, DOI:10.1029/2005RS003294, 2006, pp. 1-13.
Webpass, Buildings online, Available Online at <http://www.webpass.net/buildings?city=san+francisco&column=address&order=asc>, Retrieved on Sep. 4, 2015, 3 pages.
Weedon W.H., et al., "MEMS-switched reconfigurable antennas", IEEE Antennas and Propagation Society, AP-S International Symposium (Digest), vol. 3, 2001, pp. 654-657.
Wen et al.,"On the Sum-Rate of Multiuser MIMO Uplink Channels with Jointly-Correlated Rician fading", IEEE Trans. Commun., 2011, vol. 59, No. 10, pp. 2883-2895.
Wenck et al., "Asymptotic Mutual Information for Rician MIMO-MA Channels with Arbitrary Inputs: A Replica Analysis", IEEE Trans. Commun., 2010, vol. 58, No. 10, pp. 2782-2788.
Wennestrom et al., "An Antenna Solution for MIMO Channels: The Switched Parasitic Antenna," IEEE International Symposium on Personal, Indoor and Mobile Radio Communications, PIMRC, vol. 1, 2001, pp. 159-163.
Werner, Kari, et al., "LTE-Advanced 8×8 MIMO Measurements in an Indoor Scenario", Proceedings of ISAP2012, Nagoya, Japan, Oct. 29, 2012, pp. 750-753.
Werner, Karl, et al., "LTE-Advanced 8×8 MIMO Measurements in an Indoor Scenario", Proceedings of ISAP2012, Nagoya, Japan, Oct. 29, 2012, pp. 750-753.
Wheeler et al., "Small antennas," IEEE Transactions on Antennas and Propagation, 1975, vol. AP-23, No. 4, pp. 462-469.
Wi-Fi alliance, Homepage, Available Online at <www.wi-fi.org>, Retrieved on Aug. 14, 2014, pp. 1-3.
Wikipedia, "Advanced Mobile Phone System", Available Online at <https://en.wikipedia.org/wiki/AdvancedMobilePhoneSystem>, 2014, 6 pages.
Wikipedia, "IS-95" Available Online at <http:en.wikipedia.orgwikiIS-95>, 2014, 6 pages.
WiMAX forum, Available Online at <http://www.wimaxforum.org/>, Aug. 14, 2014, 1 page.
Wired, Has OnLive's Steve Perlman Discovered Holy Grail of Wireless?, Jun. 30, 2011 Retrieved from the Internet: http:www.wired.comepicenter201106perlman-holy-grail-wireless.

(56) References Cited

OTHER PUBLICATIONS

Forenza et al., "Switching Between OSTBC and Spatial Multiplexing with Linear Receivers in Spatially Correlated MIMO Channels", IEEE, 2006, pp. 1-5.
Foschin et al., "Coordinating multiple antenna cellular networks to achieve enormous spectral efficiency", Proceedings of the IEEE, Aug. 2006, vol. 153, No. 4, pp. 548-555.
Foschini et al., "Simplified processing for high spectral efficiency wireless communication employing multi-element arrays", IEEE Jour. Select. Areas in Comm., vol. 17, No. 11, Nov. 1999, pp. 1841-1852.
Foschini et al., "The Value of Coherent Base Station Coordination", Conference on In-formation Sciences and Systems (CISS 2005), Mar. 16-18, 2005, 6 pages.
Fourth Office Action, CN App. No. 201480016091.6, Dec. 10, 2019, 6 pages (3 pages of English Translation and 3 pages of Original Document).
Further Examination Report (Postponed Acceptance), New Zealand Patent App. No. 728719, Jan. 31, 2018, 2 pages.
Further Examination Report, New Zealand App. No. 701567, Aug. 24, 2016, 6 pages.
Further Examination Report, New Zealand App. No. 701691, Sep. 26, 2016, 3 pages.
Further Examination Report, New Zealand Patent App. No. 717370, Aug. 3, 2017, 4 pages.
Fusco et al., "Blind Frequency-offset Estimation for OFDM/OQAM Systems," IEEE Transactions on [see also Acoustics, Speech, and Signal Processing, IEEE Transactions on], 2007, vol. 55, pp. 1828-1838.
Gao et al., "Linear Pre-Coding Performance in Measured Very-Large MIMO Channels," IEEE Vehicular Technology, 2011, pp. 1-5.
Garcia et al., "Channel Model for Train to Train Communication Using the 400 MHz Band", in Proc. of IEEE Vehicular Technology Conference, May 2008, pp. 3082-3086.
Gesbert et al., "From Theory to Practice: An Overview of MIMO Space-Time Coded Wireless Systems," IEEE Journal on Selected Areas in Communications, 2003, vol. 21, No. 3, pp. 281-302.
Gesbert et al., "Multi-Cell MIMO Cooperative Networks: A New Look at Interference," IEEE Journal on Selected Areas in Communications, Dec. 2010, vol. 28, No. 9, pp. 1380-1408.
Gesbert et al., "Outdoor MIMO Wireless Channels: Models and Performance Prediction", IEEE Transactions on Communications, vol. 50, No. 12, Dec. 2002, pp. 1926-1934.
Ghogho et al., "Training design for multipath channel and frequency offset estimation in MIMO systems", Signal Processing, IEEE Transactions on [see also Acoustics, Speech, and Signal Processing, IEEE Transactions on], vol. 54, No. 10, Oct. 2006, pp. 3957-3965.
Glazunov et al., "Experimental Characterization of the Propagation Channel along a Very Large Virtual Array in a Reverberation Chamber", Progress in Electromagnetics Research B, Jan. 2014, vol. 59, pp. 205-217.
Goldman D., "Sorry, America: Your Wireless Airwaves are Full", CNN Money, Available Online at <http://money.cnn.com/2012/02/21/technology/spectrum crunch/index.html>, 2012, 3 pages.
Gopalakrishnan et al., "An Analysis of Pilot Contamination on Multi-User MIMO Cellular Systems with Many Antennas," Proceedings in Signal Processing Advances in Wireless Communications, 2011, pp. 381-385.
Govindasamy et al., "Asymptotic Spectral Efficiency of the Uplink in Spatially Distributed Wireless Networks with Multi-Antenna Base Stations," IEEE Transactions on Communications, 2013, vol. 61, No. 7, 100 pages.
GSMA, "GSM technology" Printed on Aug. 14, 2014, Available Online at <http://www.gsmworld.com/technology/index.htm>, 1 page.
Guey et al., "Modeling and Evaluation of MIMO Systems Exploiting Channel Reciprocity in TDD Mode," VTC 2004—Fall, IEEE 60th, Oct. 2004, pp. 4265-4269.
Guillaud et al., "A Practical Method for Wireless Channel Reciprocity Exploitation Through Relative Calibration", IEEE Proceedings of Sign Processing, Aug. 2005, vol. 1, pp. 403-406.
Guillaud et al., "A Specular Approach to MIMO Frequency selective Channel Tracking and Prediction," Fifth IEEE Workshop on Signal Processing Advances in Wireless Communications, Jul. 11-14, 2004, pp. 59-63.
Gunashekar G., "Investigations into the Feasibility of MIMO Techniques within the HF Band: Preliminary Results," Radio Science, 2009, 33 pages.
Guthy et al., "Large System Analysis of Projection Based Algorithms for the MIMO Broadcast Channel", in Proc. of the IEEE Intl Symp. Inform. Theory, Austin, U.S.A., Jun. 2010, 5 pages.
Guthy et al., "Large System Analysis of Sum Capacity in the Gaussian MIMO Broadcast Channel", IEEE J. Sel. Areas Communication, 2013, vol. 31, No. 2, pp. 149-159.
Guthy et al., "Large System Analysis of the Successive Encoding Successive Allocation Method for the MIMO BC", Proc. of the International ITG Workshop on Smart Antennas, Bremen, Germany, Feb. 2010.
Hachem et al., "A New Approach for Mutual Information Analysis of Large Dimensional Multi-Antenna Channels," IEEE Transactions on Information Theory, 2008, vol. 54, No. 9, pp. 3987-4004.
Hakkarainen et al., "Widely-Linear Beamforming and RF Impairment Suppression in Massive Antenna Arrays", Journal of Communications and Networks, 2013, vol. 15, No. 4, pp. 383-397.
Hallen H., "Long-Range Prediction of Fading Signals", Institute of Electrical and Electronics Engineers Signal Processing Magazine, 2000, vol. 17, No. 3, pp. 62-75.
Haring, L., "Residual carrier and sampling frequency synchronization in multiuser OFDM systems", VTC—Spring. IEEE 63rd Vehicular Technology Conference, vol. 4, 2006, pp. 1937-1941.
Hazlett et al., "Radio Spectrum for a Hungry Wireless World", Sep. 22, 2011, 41 pages.
Heath et al., "Antenna selection for spatial multiplexing systems with linear receivers," IEEE Trans. Comm, 2001, vol. 5, pp. 142-144.
Heath et al., "Switching between diversity and multiplexing in MIMO systems", IEEE Trans. Comm., vol. 53, No. 6, Jun. 2005, pp. 962-968.
Heath et al., "Switching between Multiplexing and Diversity Based on Constellation Distance," Proc. of Allerton Conf on 208, Comm. Control and Comp, Oct. 4-6, 2000, pp. 212-221.
Heath Ret al., "Exploiting Limited Feedback in Tomorrow's Wireless Communication Networks," IEEE Journal on Sel. Areas in Comm., Special Issue on Exploiting Limited Feedback in Tomorrow's Wireless Communication Networks, 2008, vol. 26, No. 8, pp. 1337-1340.
Hewlett Packard, "GPS and Precision Timing Applications", Application Note 1272, May 1996, pp. 1-28.
High Frequency Active Auroroal Research Program—Homepage, Available Online at <http:www.haarp.alaska.edu>, Printed on Apr. 9, 2004, 1 page.
Hochwald et al., "A Vector-Perturbation Technique for Near-Capacity Multiantenna Multiuser Communication—Part I: Channel Inversion and Regularization", Institute of Electrical and Electronics Engineers Transactions on Communications, 2005, vol. 53, No. 1, pp. 195-202.
Hochwald et al., "A Vector-Perturbation Technique for Near-Capacity Multiantenna Multiuser Communication—Part II: Perturbation", Institute of Electrical and Electronics Engineers Transactions on Communications, 2005, vol. 53, No. 3, pp. 537-544.
Hochwald et al., "Multi-Antenna Channel Hardening and its Implications for Rate Feedback and Scheduling", Institute of Electrical and Electronics Engineers Transactions on Information Theory, 2004, vol. 50, No. 9, pp. 1893-1909.
Hong et al. "Joint Base Station Clustering and Beamformer Design for Partial Coordinated Transmission in Heterogenous Networks," IEEE Journal on Selected Areas in Communications, 2013, vol. 31, No. 2, pp. 226-240.
Hosseini et al., "Massive MIMO and Small Cells: How to Densify Heterogeneous Networks," Wireless Communications Symposium, IEEE ICC, 2013, pp. 5442-5447.

(56) References Cited

OTHER PUBLICATIONS

Hoydis et al., "Iterative Deterministic Equivalents for the Performance Analysis of Communication Systems," Dec. 18, 2011, pp. 1-43.
Huang et al., "Joint Beamforming and Power Control in Coordinated Multicell: Max-Min Duality, Effective Network and Large System Transition," IEEE Transactions on Wireless Communications, 2013, pp. 1-14.
Huawei, et al., "CoMP Clarification of definitions and TP," R1-084351, Nov. 10-14, 2008, 3GPP TSG RAN WG1 Meeting #55, 7 pages.
Huff et al., "A Novel Radiation Pattern and Frequency Reconfigurable Single Turn Square Spiral Microstrip Antenna", IEEE Microwave and Wireless Components Letters, vol. 13, No. 2, Feb. 2003, pp. 57-59.
Huh et al., Multi-cell MIMO Downlink with Cell Cooperation and Fair Scheduling: A Large-System Limit Analysis, IEEE Transactions on Information Theory, 2011, vol. 57, No. 12, pp. 7771-7786.
Huh H., et al., Achieving "Massive MIMO" Spectral Efficiency with a Not-so-Large Number of Antennas. IEEE Transactions on Wireless Communications, Sep. 2012, vol. 11 (9), pp. 3226-3239.
Simon et al., "Digital Communication Over Fading Channels", A Unified Approach to Performance Analysis, Wiley Series in Telecommunications and Signal Processing, 2000, 10 pages.
Simon et al., "Optimizing MIMO Antenna Systems with Channel Covariance Feedback," IEEE Journal on Selected Areas in Communications, 2003, vol. 2003, pp. 406-417.
Spencer et al., "Adaptive Antennas and MIMO Systems for Wireless Communications—An Introduction to the Multi-User MIMI Downlink", IEEE Communications Magazine, Oct. 2004, pp. 60-67.
Spencer et al., "Zero-forcing methods for downlink spatial multiplexing in multiuser MIMO channels," IEEE Trans. Sig. Proc, 2004, vol. 52, pp. 461-471.
Srinidhi et al., "Layered Tabu Search Algorithm for Large-MIMO Detection and a Lower Bound on ML Performance," IEEE Trans. Commun, 2010, 5 pages.
Stancil et al., "Doubling wireless channel capacity using co-polarised, co-located electric and magnetic dipoles", Electronics Letters, 2002, vol. 38, No. 14, pp. 746-747.
Stanley M., "Mobile Data Wave: Who Dares to Invest, Wins," Jun. 13, 2012, 23 pages.
Sternad M., et al., "Channel Estimation and Prediction for Adaptive OFDM Downlinks [Vehicular Applications]," in Proceeding IEEE Vehicular Technology Conference, vol. 2, Oct. 2003, pp. 1283-1287.
Stevanovic et al., "Smart Antenna Systems for Mobile Communications", Final Report, Laboratoire d'Electromagnetisme et d'Acoustique, Ecole Polytechnique Federale de Lausanne, CH-1015 Lausanne Suisse, Jan. 2003, 120 pages.
Stoytchev et al., "Compact antenna arrays for MIMO applications," IEEE Proc. IEEE Antennas and Prop. Symp., 2001, vol. 3, pp. 708-711.
Strangeways H., "Determination of the Correlation Distance for Spaced Antennas on Multipath HF Links and Implications for Design of SIMO and MIMO Systems," School of Electronic and Electrical Engineering, University of Leeds, IEEE First European Conf. on Antennas and Prop., 2005, 12 pages.
Strangways H.J., "Investigation of signal correlation for spaced and co-located antennas on multipath HF links and implications for the design of SIMO and MIMO system," IEEE First European Conf. on Antennas and Propagation (EuCAP 2006), Nov. 2006, pp. 1-6.
Strohmer et al., "Application of Time-Reversal with MMSE Equalizer to UWB Communications", Proc. of IEEE Globecom, vol. 5, Nov. 2004, pp. 3123-3127.
Studer et al., "PAR-Aware Large-Scale Multi-User MIMO-OFDM Downlink", IEEE J. Sel. Areas Commun., Sep. 4, 2012, vol. 31, No. 2, pp. 303-313.
Sulonen et al. "Comparison of MIMO Antenna Configurations in Picocell and Microcell Environments," IEEE Journal on Selected Areas in Communications, 2003, vol. 21, No. 5, pp. 703-712.
Summons to attend oral proceedings pursuant to Rule 115(1) EPC, EP App. No. 12762167.0, Nov. 29, 2017, 8 pages.
Summons to attend oral proceedings pursuant to Rule 115(1) EPC, EP App. No. 13784690.3, Jul. 6, 2020, 5 pages.
Summons to attend oral proceedings pursuant to Rule 115(1) EPC, EP App. No. 13843203.4, Dec. 21, 2020, 9 pages.
Summons to attend oral proceedings pursuant to Rule 115(1) EPC, EP App. No. 13856705.2, Nov. 5, 2018, 7 pages.
Summons to attend oral proceedings pursuant to Rule 115(1) EPC, EP App. No. 14779084.4, Nov. 29, 2019, 9 pages.
Summons to attend oral proceedings, EP App. No. 10156954.9, Jan. 30, 2019, 8 pages.
Supplemental Notice of Allowability, U.S. Appl. No. 12/802,975, Oct. 28, 2020, 2 pages.
Supplemental Notice of Allowability, U.S. Appl. No. 15/340,914, Jan. 13, 2021, 5 pages.
Supplemental Notice of Allowance, U.S. Appl. No. 12/802,958, Dec. 3, 2018, 11 pages.
Supplementary European Search Report, EP App. No. 13790935, Dec. 1, 2015, 9 pages.
Supplementary Partial European Search Report and Search Opinion, EP App No. 17864744.2, May 13, 2020, 16 pages.
Supplementary Partial European Search Report, EP App. No. 11838640.8, Mar. 2, 2017, 13 pages.
Supplementary Partial Search Report, EP App. No. EP14770916, Oct. 21, 2016, 6 pages.
Supplementary Search Report, EP App. No. 05733294, Apr. 5, 2012, 4 pages.
Suraweera et al., Multi-Pair Amplify-and-Forward Relaying with Very Large Antenna Arrays, Proceedings in IEEE International Conference on Communications (ICC), Budapest, Hungary, Jun. 2013, 7 pages.
Suthisopapan et al., "Near Capacity Approaching Capacity of Large MIMO Systems by Non-Binary LDPC Codes and MMSE Detection", in Proc. of the IEEE International Symposium on Information Theory, Mar. 2012, 7 pages.
Suzuki et al., Large-scale multiple antenna fixed wireless systems for rural areas, Proceedings in IEEE PIMRC, Sep. 2012, 6 pages.
Suzuki H., et al., Highly Spectrally Efficient Ngara Rural Wireless Broadband Access Demonstrator, Proceedings in IEEE International Symposium on Communications and Information Technologies (ISCIT), Oct. 2012, 6 pages.
Svac et al., Soft-Heuristic Detectors for Large MIMO Systems, IEEE Trans. Signal Processing, 2013, vol. 61, No. 18, pp. 4573-4586.
Svantesson T., et al., "Analysis of Electromagnetic Field Polarizations in Multiantenna Systems," IEEE Transactions on Wireless Communications, vol. 3 (2), Mar. 2004, pp. 641-646.
Svantesson T., et al., "On Capacity and Correlation of Multi-Antenna Systems Employing Multiple Polarizations," IEEE Antennas and Propagation Society, 2002, vol. 3, pp. 202-205.
Takeuchi et al., "On an Achievable Rate of Large Rayleigh Block-Fading MIMO Channels with No CSI," IEEE Transactions on Information Theory, 2011, 47 pages.
Taluja et al., Diversity Limits of Compact Broadband Multi-Antenna Systems, IEEE J. Sel. Areas Communication, 2013, vol. 31, No. 2, pp. 326-337.
Tang et al., "Joint frequency offset estimation and interference cancellation for MIMO-OFDM systems [mobile radio]," 2004 IEEE 60th Vehicular Technology Conference, VTC2004-Fal, 2004, vol. 3, pp. 1553-1557.
Tanumay et al., "A Novel Monte-Carlo-Sampling-Based Receiver for Large-Scale Uplink Multiuser MIMO Systems," IEEE Transactions on Vehicular Technology, 2013, vol. 62, No. 7, pp. 3019-3038.
Taricco et al., "Asymptotic Mutual Information Statistics of Separately-Correlated Rician Fading MIMO Channels," IEEE Trans. Inform. Theory, Aug. 2008, vol. 54, No. 8, pp. 3490-3504.
Tarighat et al., "Compensation schemes and performance analysis of IQ imbalances in OFDM receivers," IEEE Signal Processing, Transactions on [see also Acoustics, Speech, and Signal Processing, IEEE Transactions on], 2005, vol. 53, pp. 3257-3268.

(56) References Cited

OTHER PUBLICATIONS

Tarighat et al., "MIMO OFDM receivers for systems with IQ imbalances," IEEE Trans. Sig. Pro, for orthogonal space-time block codes (OSTBC), 2005, vol. 53, pp. 3583-3596.
Tarokh et al., "Space-time block codes from orthogonal designs," IEEE Trans. Info, vol. 45, 1999, pp. 1456-1467.
Tarokh et al., "Space-Time Codes for High Data Rate Wireless Communication: Performance Criterion and Code Construction," IEEE Transactions on Information Theory, 1998, vol. 44, pp. 744-765.
Teletar I. E., "Capacity of Multi-antenna Gaussian Channels", European Transactions on Telecommunications, vol. 10, Nov. 1999, pp. 1-28.
Teukolsky S. A., "Numerical Recipes in C: The Art of Scientific Computing", Cambridge University Press, 1992, 949 pages.
Texas Instruments, "Aspects of Coordinated Multi-Point Transmission for Advanced E-UTRA," Nov. 11-15, 2008, 3GPP TSG RAN WG1 #55, R1-084444, 5 pages.
The White House, "Presidential Memorandum: Unleashing the Wireless Broadband Revolution", [retrieved on Jun. 28, 2010] Retrieved from the Internet: URL: http://www.whitehouse.gov/the-press-office/presidential-memorandum-unleashing-wireless-broadband-revolution.
Third Office Action, Chinese Patent App. No. 201280044869.5, Aug. 31, 2017, 15 pages.
"Electromagnetic-Wave Propagation", HW Sams Publishers, Reference Data for Radio Engineers, "Electromagnetic-Wave Propagation", 5th Edition, 1973, Chapter 26., (1973), 1-32.
"MIMO System uses SOMA for IEEE802.11", Available Online at <http://www.electronicstalk.com/news/ime/ime149.html>, Electronicstalk, 2004, pp. 1-3.
3GPP Technical Specification Group, "Spatial channel model, SCM-134 text V6.0", Spatial Channel Model AHG (Combined ad-hoc from 3GPP and 3GPP2), Apr. 2003, pp. 1-45.
3GPP TR 25.876 V7.0.0 (Mar. 2007), Technical Report, "3rd Generation Partnership Project; Technical Specification Group Radio Access Network"; Multiple Input Multiple Output in UTRA; (Release 7), pp. 2-76.
3GPP TR 25.912, "Feasibility Study for Evolved UTRA and UTRAN", V9.0.0 (Oct. 2009), Oct. 2009, pp. 1-66.
3GPP TR 25.913, "Requirements for Evolved Utra (E-UTRA) and Evolved UTRAN (E-UTRAN)", V8.0.0 (Jan. 2009), Jan. 2009, pp. 1-20.
3GPP TR 36.819, "3rd Generation Partnership Project; Technical Specification Group Radio Access Network; Coordinated multi-point operation for LTE physical layer aspects (Release 11)", Dec. 20, 2011, 69 pages.
3GPP TS 36.211 V8.7.0 (May 2009), Technical Specification, 3rd Generation Partnership Project; Technical Specification Group Radio Access Network; Evolved Universal Terrestrial Radio Access (E-UTRA); Physical Channels and Modulation (Release 8), pp. 1-83.
3GPP, "3rd Generation Partnership Project; Technical Specification Group Radio Access Network, Coordinated multi-point operation for LTE physical layer aspects (Release 11)", 3GPP Draft; DRAFT36819-B10, 3rd Generation Partnership Project; (3GPP), Dec. 20, 2011, V11.1.0, pp. 1-69.
3GPP, "LTE", downloaded from http://www.3gpp.org/LTE on Aug. 14, 2014, 4 pages.
3GPP, "UMTS", Universal Mobile Telecommunications System, pp. 1-2, printed on Nov. 17, 2014, Retrieved from the Internet: < URL: www.3gpp.orgarticleumts>.
3GPP, ETS1136 212 V9.1.0 (2010), "Technical Specification LTE; Evolved Universal Terrestrial Radio Access (E-UTRA); Multiplexing and Channel Coding (3GPP TS 36.212 VERION 9.1.0 Release 9) 3GPP, ETS1136 212 V9.1.C (2010)" 63 pages.
3GPP, TS 36.201, "Evolved Universal Terrestrial Radio Access (E-UTRA); LTE Physical Layer—General Description (Release 11)," Oct. 2012, pp. 1-14.
3GPP, TS 36.211, "Evolved Universal Terrestrial Radio Access (E-UTRA); Physical Channels and Modulation (Release 11)," pp. 1-107, Oct. 2012, submitted as Part 1 and Part 2.
3GPP, TS 36.212, Evolved Universal Terrestrial Radio Access (E-UTRA); Multiplexing and channel coding (Release 11) pp. 1-80, Oct. 2012, submitted as Part 1 and Part 2.
3GPP, TS 36.212.V8.7.0 (May 2009), "Technical Specification 3rd Generation Partnership Project; Technical Specification Group Radio Access Network; Evolved Universal Terrestrial Radio Access (E-UTRA); Multiplexing and channel Coding (Release 8) 3GPP, TS 36.212.V8.7.0 (May 2009)," May 2009, 60 pages.
3GPP, TS 36.213, "Evolved Universal Terrestrial Radio Access (E-UTRA); Physical layer procedures (Release 11)," Oct. 2012, 145 pages.
3GPP, TS 36.808, "Evolved Universal Terrestrial Radio Access (E-UTRA); Carrier Aggregation (Release 1O)", v10.0.0, Jun. 2012, 28 pages.
Abandonment, U.S. Appl. No. 13/475,598, Feb. 8, 2016, 1 page.
Abandonment, U.S. Appl. No. 14/086,700, Dec. 26, 2017, 2 pages.
Abbasi N., "Capacity estimation of HF-MIMO systems", International Conference on Ionospheric Systems and Techniques, 2009, 5 pages.
Adrian et al., "Quantum Tagging: Authenticating Location via Quantum Information and Relativistic Signalling Constraints,", Phys. Rev. A84, 012326 (2011), arXiv: 1008.2147, 2010, 9 pages.
Advisory Action for U.S. Appl. No. 12/802,989, May 4, 2017, 3 pages.
Advisory Action, U.S. Appl. No. 13/844,355, Jul. 17, 2019, 3 pages.
Advisory Action, U.S. Appl. No. 14/611,565, Feb. 7, 2020, 3 pages.
Advisory Office Action, U.S. Appl. No. 14/611,565, Nov. 10, 2020, 3 pages.
Aggarwal et al., "On the Design of Large Scale Wireless Systems," IEEE Journal of Selected Areas Communications, 2013, vol. 31. No. 2, pp. 215-225.
Airgo, "Homepage: Airgo—Wireless without Limits", Available Online at <http:www.airgonetworks.com>, printed on Apr. 9, 2004, 1 page.
Akbudak et al., "CoMP in Heterogeneous networks: A Low-Complexity Linear Transceiver Design," Workshop on Cooperative and Cognitive Mobile Networks, Communications (ICC), 2012 IEEE International Conference on, IEEE, Jun. 10, 2012, pp. 5624-5629.
Aktas et al., "Scaling Results on the Sum Capacity of Cellular Networks with MIMO Links", IEEE Transactions on Information Theory, 2006, vol. 52, pp. 3264-3274.
Akyildiz et al., "The Evolution to 4G Cellular Systems: LTE-Advanced," Physical Communication, vol. 3, 2010, pp. 217-244.
Alamouti et al., "A simple transmit diversity technique for wireless communications," IEEE Journal on Selected Areas in Communications, 1998, vol. 16, No. 8, pp. 1451-1458.
Allowance Receipt, MX App. No. MX/a/2019/010059, May 3, 2021, 3 pages (Original Document Only).
Alrabadi et al., "Beamforming via Large and Dense Antenna Arrays above a Clutter," Institute of Electrical and Electronics Engineers Journal on Selected Areas in Communications, 2013, vol. 31, No. 2, pp. 314-325.
Andersen et al., "The MIMO Cube—a Compact MIMO Antenna," IEEE Proceedings of Wireless Personal Multimedia Communications International Symposium, vol. 1, Oct. 2002, pp. 112-114.
Andersen J. B., "Antenna Arrays in Mobile Communications: Gain, diversity, and Channel Capacity.1," IEEE Antennas and Propagation Magazine, vol. 42, No. 2, Apr. 2000, pp. 12-16.
Anderson et al., "Beamforming in large-scale MIMO Multiuser Links Under a Per-node Power Constraint," Proceedings in International Symposium on Wireless Communication Systems, Aug. 2012, pp. 821-825.
Andrews et al., "Tripling the Capacity of Wireless Communications using Electromagnetic Polarization", Nature, vol. 409, Jan. 2001, pp. 316-318.
Andrews J. G., "Seven Ways That Hetnet are a Cellular Paradigm Shift," IEEE Communications Magazine, Mar. 2013, [online], Retrieved from the Internet: http://users.ece.utexas.edu/-jandrews/pubs/And HetNetCommMag2012v3.pdf, pp. 136-144.

(56) References Cited

OTHER PUBLICATIONS

Anritsu, "LTE resource guide", 18 pages, 2009, www.us.anritsu.com.

Araujo et al., "Channel Estimation for Millimeter-Wave Very-Large MIMO Systems," EUSPICO 2014, in proceedings, Sep. 1-5, 2014, 5 pages.

Arnau et al., "Dissection of Multibeam Satellite Communications with a Large-scale Antenna System Toolbox," European Wireless 2014 (EW2014), May 14-16, 2014, pp. 548-553.

ArrayComm, "Field-Proven Results," Improving wireless economics through MAS software, printed on Mar. 28, 2011, www.arraycomm.comserve.phppage=proof, 3 pages.

Artigue C., et al.,"On the Precoder Design of Flat Fading MIMO Systems Equipped with MMSE Receivers: A Large System Approach", IEEE Trans. Inform. Theory, 2011, vol. 57 (7), pp. 4138-4155.

AT&T, "1946: First Mobile Telephone Call" 1 page, Jun. 17, 1946, Available Online at <http:www.corp.att.comattlabsreputationtimeline46mobile.html>.

Baker M., "LTE-Advanced Physical Layer," Alcatel-Lucent, Dec. 2009, 48 pages.

Barbieri A., et al., "Coordinated Downlink Multi-point Communications in Heterogeneous Cellular Networks", (Qualcomm), Information Theory and App. Workshop, Feb. 2012, pp. 7-16.

BelAir Networks, "Small cells", Available Online at <URL:http:www.belairnetworks.comsitesdefaultfilesVVPSmallCells.pdf>, 2007, 4 pages.

Benedetto et al., "Analysis of the effect of the I/Q baseband i-lter mismatch in an OFDM modem," Wireless personal communications, 2000, pp. 175-186.

Bengtsson E. L., "UE Antenna Properties and Their Influence on Massive MIMO System Performance," 2002, 5 pages.

Final Office Action, U.S. Appl. No. 15/340,914, Jan. 3, 2019, 67 pages.

Final Office Action, U.S. Appl. No. 15/682,076, Oct. 30, 2019, 26 pages.

Final Office Action, U.S. Appl. No. 15/792,610, Dec. 16, 2019, 8 pages.

Final Office Action, U.S. Appl. No. 16/188,841, Jul. 7, 2020, 17 pages.

Final Office Action, U.S. Appl. No. 16/208,895, Apr. 6, 2021, 8 pages.

Final Office Action, U.S. Appl. No. 17/317,856, Aug. 20, 2021, 33 pages.

Final Office Action, U.S. Appl. No. 13/233,006, Dec. 19, 2017, 114 pages.

Final Office Action, U.S. Appl. No. 13/233,006, Feb. 18, 2014, 18 pages.

Final Office Action, U.S. Appl. No. 13/233,006, Nov. 5, 2015, 10 pages.

Final Office Action, U.S. Appl. No. 13/233,006, Nov. 13, 2018, 9 pages.

Final Office Action, U.S. Appl. No. 13/233,006, Oct. 12, 2016, 10 pages.

First Exam Report, New Zealand App. No. 701567, Feb. 3, 2016, 4 pages.

First Exam Report, New Zealand Patent App. No. 717370, Apr. 8, 2016, 2 pages.

First Examination Report from counterpart AU Patent App. No. 2011323559, Oct. 12, 2015, 3 pages.

First Examination Report, AU App. No. 2018253582, Jun. 3, 2019, 3 pages.

First Examination Report, AU Patent App. No. 2014248533, Mar. 1, 2017, 5 pages.

First Examination Report, AU Patent App. No. 2020256510, Aug. 10, 2015, 3 pages.

First Examination Report, AU Patent App. No. AU2017245425, May 9, 2018, 9 pages.

First Examination Report, New Zealand App. No. 729017, Jun. 30, 2017, 3 pages.

First Examination Report, New Zealand App. No. 742186, Jun. 28, 2018, 4 pages.

First Examination Report, New Zealand App. No. 743604, Jul. 10, 2018, 5 pages.

First Examination Report, New Zealand Patent App. No. 728719, May 31, 2017, 4 pages.

First Examination Report, NZ App. No. 622137, Aug. 28, 2014, 2 pages.

First Examination Report, NZ App. No. 701691, Feb. 10, 2016, 4 pages.

First Examination Report, NZ App. No. 751530, Oct. 18, 2019, 3 pages.

First Examination Report, NZ App. No. 757995, Nov. 1, 2019, 2 pages.

First Examination Report,, AU Patent App. No. AU2011323559, Sep. 30, 2015, 3 pages.

First Office Action and Search report, Chinese Patent App. No. 201380026522.2, Mar. 27, 2017, 20 pages.

First Office Action and Search Report, Chinese Patent App. No. 201480016091.6, Apr. 25, 2018, 17 pages.

First Office Action and Search Report, CN App. No. 201210466082.X, Apr. 3, 2015, 26 pages.

First Office Action and Search Report, CN App. No. 201580007666.2, Jan. 11, 2019, 13 pages.

First Office Action and Search Report, CN App. No. 201580019760.X, Jun. 5, 2019, 12 pages (6 pages of English Translation and 6 pages of Original Document).

First Office Action and Search Report, TW App. No. 100139880, Feb. 26, 2016, 27 pages.

First Office Action Report, Chinese Patent App. No. 201310407419.4, Nov. 20, 2015, 8 pages.

First Office Action, EP Patent App. No. 12762167.0, Jan. 4, 2016, 4 pages.

First Office Action, EP Patent App. No. 201380035543.0, Feb. 15, 2016, 8 pages.

First Office Action, JP Patent App. No. JP2014264325, Nov. 12, 2015, 4 pages.

First Office Action, KR Patent App. No. 10-2015-7033311, Feb. 16, 2016, 12 pages.

First Office Action, MX Patent App. No. MX/a/2014/002900, Apr. 24, 2015, 3 pages.

First Office Action, MX Patent App. No. MXa2014013795, Nov. 1, 2016, 3 pages.

First Office Action, MX Patent App. No. MXa2014013795, Oct. 30, 2015, 7 pages.

First Office Action, RU Patent App. No. 2011131821, Jun. 26, 2015, 8 pages.

First Office Action, TW Patent App. No. 102117728, Aug. 9, 2016, 11 pages.

Fletcher et al., "Mutual coupling in multi-element array antennas and its influence on MIMO channel capacity," IEEE Electronics Letters, 2003, vol. 39 (4), pp. 342-344.

Forenza A., et al., "Impact of antenna geometry on MIMO communication in indoor clustered channels," Proc. IEEE Antennas and Prop. Symp, 2004, vol. 2, pp. 1700-1703.

Forenza et al., "Adaptive MIMO Transmission for Exploiting the Capacity of Spatially Correlated Channels," IEEE Trans. on Veh. Tech, 2007, vol. 56, No. 2, pp. 619-630.

Forenza et al., "Adaptive MIMO transmission scheme: Exploiting the spatial selectivity of wireless channels", Proceedings Institute of Electrical and Electronics Engineers Vehicular Technology Conference, 2005, vol. 5, pp. 3188-3192.

Forenza et al., "Benefit of Pattern Diversity via 2-element Array of Circular Patch Antennas in Indoor Clustered MIMO Channels", IEEE Trans. on Communications, vol. 54, No. 5, May 2006, pp. 943-954.

Forenza et al., "Link Adaptation and Channel Prediction in Wireless OFDM Systems," Proceeding of IEEE International Midwest Symposium on Circuits and Systems, 2002, pp. 211-214.

Forenza et al., "Optimization Methodology for Designing 2-CPAs Exploiting Pattern Diversity in Clustered MIMO Channels", Institute of Electrical and Electronics Engineers Transactions on Communications, 2008, vol. 56, No. 10, pp. 1748-1759.

(56) References Cited

OTHER PUBLICATIONS

Office Action, MX App. No. MX/A/2019/001966, Mar. 16, 2022, 5 pages of original document only.
Office Action, TW App. No. 111124746, Mar. 15, 2023, 3 pages (Only English Translation).
Office Action, JP App. No. 2016-550718, Jan. 10, 2019, 4 pages.
Office Action, JP App. No. 2016-562961, Feb. 6, 2020, 7 pages (4 pages of English Translation and 3 pages of Original Document).
Office Action, JP App. No. 2018-222367, Jun. 8, 2020, 7 pages (4 pages of English Translation and 3 pages of Original Document).
Office Action, JP App. No. 2019-039195, Jun. 17, 2019, 8 pages (4 pages of English Translation and 4 pages of Original Document).
Office Action, JP App. No. 2019-093904, Jul. 6, 2020, 6 pages (3 pages of English Translation and 3 pages of Original Document).
Office Action, JP App. No. 2019-238040, Feb. 25, 2021, 7 pages (4 pages of English Translation and 3 pages of Original Document).
Office Action, JP Patent App. No. 2012-057351, Jul. 1, 2013, 6 pages.
Office Action, JP Patent App. No. 2012-057351, Mar. 10, 2014, 2 pages.
Office Action, JP Patent App. No. 2013-156855, Apr. 17, 2015, 6 pages.
Office Action, JP Patent App. No. 2013-537753, Sep. 7, 2015, 9 pages.
Office Action, KR App. No. 10-2014-7035524, Oct. 21, 2019, 11 pages (6 pages of English Translation and 5 pages of Original Document).
Office Action, KR App. No. 10-2015-7028298, Jul. 27, 2020, 14 pages (8 pages of English Translation and 6 pages of Original Document).
Office Action, KR App. No. 10-2015-7029455, Jul. 27, 2020, 14 pages (8 pages of English Translation and 6 pages of Original Document).
Office Action, KR App. No. 1020107006265, Jul. 29, 2014, 10 pages.
Office Action, KR Patent App. No. 20050070079, Jul. 29, 2011, 3 pages.
Office Action, KR Patent App. No. 2015-7002560, May 21, 2015, 10 pages.
Office Action, MX Patent App. No. MX/a/2014/002900, May 25, 2015, 7 pages.
Office Action, MX Patent App. No. MX/a/2014/013377, Mar. 22, 2016, 20 pages.
Office Action, MX Patent App. No. MX/a/2014/013377, Nov. 30, 2017, 4 pages.
Office Action, MX Patent App. No. Mx/a/2015/002992, Nov. 8, 2016, 4 pages.
Office Action, New Zealand Patent App. No. 610463, Jan. 22, 2014, 2 pages.
Office Action, RU App. No. 2014151216, Sep. 30, 2016, 12 pages.
Office Action, RU App. No. 2019104259, Aug. 20, 2020, 14 pages (7 pages of English Translation and 7 pages of Original Document).
Office Action, RU Patent App. No. 2016144927, Dec. 21, 2016, 6 pages.
Office Action, TW App No. 102117728, Nov. 29, 2016, 6 pages (3 pages of English Translation and 3 pages of Original Document).
Office Action, TW App. No. 094125985, Jan. 6, 2012, 7 pages.
Office Action, TW App. No. 100139880, Jan. 26, 2017, 7 pages.
Office Action, TW App. No. 103107541, Sep. 28, 2018, 7 pages.
Office Action, TW App. No. 108118765, Apr. 16, 2020, 6 pages (3 pages of English Translation and 3 pages of Original Document).
Office Action, TW App. No. 108130461, Oct. 30, 2020, 16 pages (7 pages of English Translation and 9 pages of Original Document).
Office Action, TW App. No. 108148122, Jul. 8, 2020, 19 pages (8 pages of English Translation and 11 pages of Original Document).
Office Action, TW App. No. 109105764, Sep. 9, 2020, 47 pages (21 pages of English Translation and 26 pages of Original Document).
Office Action, TW App. No. 110125850, Dec. 16, 2021, 7 pages (4 pages of English Translation and 3 pages of Original Document).
Office Action, TW Patent App. No. 101133865, Oct. 28, 2016, 5 pages.
Office Action, TW Patent App. No. 102116145, Mar. 31, 2017, 7 pages.
Office Action, U.S. Appl. No. 12/802,988, Aug. 14, 2013, 26 pages.
Onggosanusi et al., High Rate Space-Time Block Coded Scheme: Performance and Improvement in Correlated Fading Channels, Proc. IEEE Wireless Comm. and Net. Conf, Mar. 2002, vol. 1, pp. 194-199.
Optimized Markov Chain Monte Carlo for Signal Detection in MIMO Systems: An Analysis of the Stationary Distribution and Mixing Time, Signal Processing, vol. 62, No. 17, Sep. 2014.
Ozgur et al., "Spatial Degrees of Freedom of Large Distributed MIMO Systems and Wireless Ad Hoc Networks", Institute of Electrical and Electronics Engineers Journal on Selected Areas in Communications, 2013, vol. 31, No. 2, pp. 202-214.
Pan, et al, "Precoding and Power allocation for Cooperative MIMO systems", International Conference on Wireless Communications, Networking and Mobile Computing, IEEE, 2006, 4 pages.
Panasonic, "Target scenarios for new carrier types," 3GPP TSG-RAN WGI#72, R1-130684, Jan. 28, 2013-Feb. 1, 2013, 7 pages.
Papadogiannis et al "Efficient Selective Feedback Design for Multicell Cooperative Networks," Institute of Electrical and Electronics Engineers Transactions on Vehicular Technology, 2010, vol. 60, No. 1, pp. 196-205.
Papadopoulos et al., Achieving Large Spectral Efficiencies from MU-MIMO with Tens of Antennas: Location-Adaptive TDD MU-MIMO Design and User Scheduling, in Proc. IEEE Asilomar Conf. on Signals, Systems, and Computers (ACSSC), Pacific Grove, CA, Nov. 2010, pp. 636-643.
Parkvall et al., "LTE Advanced-Evolving LTE Towards IMT-Advanced," Ericsson, IEEE VTC, Sep. 2008, 5 pages.
Partial Supplementary Search Report, EP App. No. 15780522.7, Oct. 20, 2017, 7 pages.
Paulraj et al., "Introduction to Space-Time Wireless Communications", 2003, 33 Pages.
Paulraj, "Is OFDMA, MIMO and OS the right stuff for mobile broad-band?" 63 pages, http://www.ieeevtc.org/vtc2005fall1/presentations/paulraj.pdf, Sep. 2005.
Payami et al., Channel Measurements and Analysis for Very Large Array Systems at 2.6 GHz, in Proc. 6th European Conference on Antennas and Propagation, EuCAP 2012, Prague, Czech Republic, Mar. 26, 2012, 5 pages.
Per-Erik et al., "VDSL2: Next Important Broadband Technology", Ericsson Review No. 1, 2006, pp. 36-47.
Perlman et al., "Distributed-Input Distributed-Output (Dido), Wireless Technology: A New Approach to Multiuser Wireless," Retrieved from http://www.rearden.com/DIDO/DIDO White Paper 110727.pdf, Aug. 2011, 19 pages.
European Search Report and Search Opinion, EP App. No. 17864744.2, Aug. 14, 2020, 15 pages.
European Search Report, EP App. No. 10156954.9-2411, Sep. 2, 2010, 5 pages.
European Search Report, EP App. No. 19159810.1, Sep. 25, 2019, 8 pages.
Examination Report from counterpart AU Patent App. No. AU2014200745, Sep. 25, 2015, 3 pages.
Examination Report No. 1, AU App. No. 2012308632, Oct. 11, 2016, 3 pages.
Examination report No. 1, AU App. No. 2015214278, Jun. 5, 2018, 4 pages.
Examination report No. 1, AU App. No. 2015248161, Jul. 2, 2018, 5 pages.
Examination Report No. 1, AU App. No. 2019203120, Jul. 3, 2020, 4 pages.
Examination Report No. 1, AU App. No. 2020200070, Sep. 8, 2020, 4 pages.
Examination Report No. 2, AU App. No. 2012308632, Jun. 6, 2017, 5 pages.
Examination Report No. 2, NZ App. No. 761315, Aug. 5, 2020, 3 pages.
Examination Report No. 3, AU App. No. 2019200838, Aug. 4, 2020, 5 pages.

(56) References Cited

OTHER PUBLICATIONS

Examination report No. 4, AU App. No. 2013347803, Jan. 25, 2018, 6 pages.
Examination Report, AU App. No. 2016219662, Sep. 9, 2016, 2 pages.
Examination report, AU App. No. 2018241100, Sep. 27, 2019, 2 pages.
Examination Report, AU App. No. 2020201409, Apr. 16, 2021, 6 pages.
Examination report, Indian Patent App. No. 3496/CHENP/2013, Oct. 29, 2018, 7 pages.
Examination Report, NZ App. No. 622137, Dec. 21, 2016, 3 pages.
Examiner Report, CA App. No. 2885817, Jul. 17, 2020, 5 pages.
Examiner's Report from counterpart AU Patent App. No. 2013256044, May 9, 2016, 2 pages.
Examiner's Report, CA App. No. 2539333, Dec. 4, 2012, 15 pages.
Examiner's Report, CA App. No. 28656772, Jan. 7, 2016, 3 pages.
Examiner's Report, CA App. No. CA2695799, Apr. 1, 2015, 4 pages.
Examiner's Report, CA App. No. 2892555, Sep. 15, 2020, 2 pages.
Extended European Search Report, EP App. No. 08798313.6, Nov. 14, 2012, 10 pages.
Extended European Search Report, EP App. No. 10156950.7, Nov. 6, 2012, 10 pages.
Extended European Search Report, EP App. No. 10184659.0, Nov. 29, 2012, 8 pages.
Extended European Search Report, EP App. No. 11838640.8, May 31, 2017, 15 pages.
Extended European Search Report, EP App. No. 18186156.8, Nov. 26, 2018, 7 pages.
Extended Search Report, EP App. No. 13843203.4, Feb. 15, 2016, 8 pages.
Extended Search Report, EP App. No. 13856705.2, Mar. 2, 2016, 10 pages.
Extended Search Report, EP App. No. 14770916.6, Jan. 24, 2017, 12 pages.
Extended Search Report, EP App. No. 14779084.4, Sep. 29, 2016, 8 pages.
Extended Search Report, EP App. No. 15746217.7, Jan. 22, 2018, 18 pages.
Extended Search Report, EP App. No. 15780522.7, Feb. 6, 2018, 13 pages.
Extended Search Report, EP App. No. EP13784690.3, Nov. 23, 2015, 4 pages.
Fakhereddin et al., "Combined effect of polarization diversity and mutual coupling on MIMO capacity," Proc. IEEE Antennas and Prop. Symp, 2003, vol. 2, pp. 495-498.
FCC, "Open commission meeting", Available Online at <http:reboot.fcc.govopen-meetings2010september>, Sep. 23, 2010, 3 pages.
FCC, Broadband action agenda, National Broadband Plan, Available Online at <http://www.broadband.gov/plan/national-broadband-plan-action-agenda.pdf>, 2010, pp. 1-8.
Federal Communications Commission, "Authorization of Spread Spectrum Systems under Parts 15 and 90 of the FCC Rules and Regulations", Jun. 1985, 18 pages.
Federal Communications Commission, "Evaluating Compliance with FCC Guidelines for Human Exposure to Radiofrequency Electromagnetic Fields," OET Bulletin 65, Ed. 97-01, Aug. 1997, 84 pages.
Fella Adlane, "Adaptive WiMAX Antennas: The promise of higher ROI," Available Online at <http:www.wimax.comcommentaryspotlightspotlight8-08-2005searchterm=Adlane Fella>, Printed on May 9, 2008, pp. 1-3.
Feng et al., "Self-organizing networks (SON) in 3GPP LTE", Nom or Research, May 2008, pp. 1-15.
Final Office Action with partial English translation, JP Patent App. No. 2005223345, Feb. 18, 2014, 23 pages.
Final Office Action, JP App. No. 2005-223345, May 12, 2011, 12 pages.
Final Office Action, U.S. Appl. No. 10/817,731, Jul. 9, 2008, 21 pages.
Final Office Action, U.S. Appl. No. 10/817,731, Sep. 11, 2009, 36 pages.
Final Office Action, U.S. Appl. No. 12/630,627, Apr. 2, 2013, 23 pages.
Final Office Action, U.S. Appl. No. 12/630,627, Oct. 20, 2011, 13 pages.
Final Office Action, U.S. Appl. No. 12/802,958, Apr. 15, 2015, 24 pages.
IEEE 802.22, "IEEE 802.22 Working Group on Wireless Regional Area Networks", Retrieved on Aug. 14, 2014, Available Online at <http:www.ieee802.org/22/>, 1 page.
IntelliCell: A Fully Adaptive Approach to Smart Antennas, ArrayComm, Incorporated, WP-ISA-031502-2.0, 2002, pp. 1-18.
Intention to Grant, EP App. No. 13790935.4, Jun. 24, 2020, 8 pages.
Intention to Grant, EP App. No. 14770916.6, Apr. 28, 2021, 8 pages.
International Preliminary Report on Patentability and Written Opinion, App. No. PCT/US2013/071749, Jun. 4, 2015, 7 pages.
International Preliminary Report on Patentability and Written Opinion, App. No. PCT/US2014/025102, Sep. 24, 2015, 10 pages.
International Preliminary Report on Patentability and Written Opinion, App. No. PCT/US2014/025108, Sep. 24, 2015, 8 pages.
International Preliminary Report on Patentability and Written Opinion, App. No. PCT/US2014/025123, Sep. 24, 2015, 10 pages.
International Preliminary Report on Patentability and Written Opinion, App. No. PCT/US2015/014511, Aug. 18, 2016, 5 pages.
International Preliminary Report on Patentability from foreign counterpart PCT/US2013/061493, Apr. 16, 2015, 7 pages.
International Preliminary Report on Patentability, App. No. PCT/US11/58663, May 7, 2013, 26 pages.
International Preliminary Report on Patentability, App. No. PCT/US2012/054937, Mar. 27, 2014, 13 pages.
International Preliminary Report on Patentability, App. No. PCT/US2013/039580, Nov. 4, 2014, 7 pages.
International Preliminary Report on Patentability, App. No. PCT/US2013/041726, Nov. 18, 2014, 6 pages.
International Preliminary Report on Patentability, PCT App. No. PCT/US06/41009, Apr. 23, 2008, 4 pages.
International Preliminary Report on Patentability, PCT App. No. PCT/US2005/11033, Jun. 3, 2008, 7 pages.
International Preliminary Report on Patentability, PCT App. No. PCT/US2008/073780, Feb. 24, 2010, 10 pages.
International Preliminary Report on Patentability, PCT App. No. PCT/US2015/023436, Oct. 27, 2016, 6 pages.
International Preliminary Report on Patentability, PCT App. No. PCT/US2017/047963, Mar. 7, 2019, 8 pages.
International Preliminary Report on Patentability, PCT App. No. PCT/US2017/058291, May 9, 2019, 7 pages.
International Search Report and the Written Opinion, App. No. PCT/US15/14511, May 18, 2015, 7 pages.
International Search Report and the Written Opinion, App. No. PCT/US2013/061493, Dec. 6, 2013, 9 pages.
International Search Report and Written Opinion, App. No. PCT/US13/41726, Jul. 16, 2013, 7 pages.
International Search Report and Written Opinion, App. No. PCT/US2012/054937, Apr. 2, 2013, 17 pages.
International Search Report and Written Opinion, App. No. PCT/US2013/039580, Aug. 20, 2013, 12 pages.
International Search Report and Written opinion, App. No. PCT/US2013/071749, Apr. 8, 2014, 9 pages.
International Search Report and Written opinion, App. No. PCT/US2014/025102, Jul. 18, 2014, 11 pages.
International Search Report and Written opinion, App. No. PCT/US2014/025105, Jul. 14, 2014, 12 pages.
International Search Report and Written Opinion, App. No. PCT/US2014/025108, Sep. 19, 2014, 10 Pages.
International Search Report and Written opinion, App. No. PCT/US2014/025123, Jul. 18, 2014, 11 pages.
International Search Report and Written Opinion, App. No. PCT/US2015/023436, Aug. 19, 2015, 10 pages.
International Search Report and Written Opinion, App. No. PCT/US2017/047963, Nov. 3, 2017, 9 pages.

(56) References Cited

OTHER PUBLICATIONS

International Search Report and Written Opinion, App. No. PCT/US2017/058291, Mar. 8, 2018, 12 pages.
International Search Report and Written Opinion, PCT App. No. PCT/US 06/41009, May 24, 2007, 6 pages.
International Search Report and Written opinion, PCT App. No. PCT/US05/11033, May 2, 2008, 10 pages.
International Search Report and Written Opinion, PCT App. No. PCT/US11/58663, Mar. 29, 2012, 27 pages.
International Search Report and Written Opinion, PCT App. No. PCT/US2008/073780, Nov. 19, 2008.
International Search Report and Written Opinion, PCT App. No. PCT/US2021/026431, Jun. 29, 2021, 6 pages.
ITU, "ISM Band," Available Online at <http://www.itu.int/ITUR/terrestrial/faq/index.html#g013>, Aug. 14, 2014, pp. 1-8.
J. Duplicity, et al., "MU-MIMO in LTE systems", EURASIP Journal on Wireless Communications and Networking, Mar. 2011, 10 pages.
J. G. Proakis, Communication System Engineering, Prentice Hall, 1994, 11 pages.
Jafar et al., "Channel Capacity and Beamforming for Multiple Transmit and Receive Antennas with Covariance Feedback," Proc. IEEE Int. Cont. on Comm, Jun. 2001, vol. 7, pp. 2266-2270.
Jafar et al., "Transmitter Optimization and Optimality of Beamforming for Multiple Antenna Systems," IEEE Trans Wireless Comm, Jul. 2004, vol. 3, No. 4, pp. 1165-1175.
Jakes W. C., Microwave Mobile Communications, IEEE Press, 1974, Table of Contents, 4 pages.
Jindal N., et al., "Dirty Paper Coding vs. TDMA for MIMO Broadcast Channels", IEEE Trans. on Information Theory, vol. 51, May 2005, pp. 1783-1794.
Jindal, N , "MIMO Broadcast Channels With Finite-Rate Feedback," IEEE Trans. on Info. Theory, vol. 52, pp. 5045-5060, Nov. 2006.
Jing J., et al. "A Downlink Max-SINR Precoding for Massive MIMO System," International Journal of Future Generation Communication and Networking, Jun. 2014, vol. 7 (3), pp. 107-116.
Jorswieck et al., "Channel Capacity and Capacity-Range of Beamforming in MIMO Wireless Systems under Correlated Fading with Covariance Feedback," IEEE Transactions on Wireless Communications, Sep. 2004, vol. 3, pp. 1543-1553.
Jose et al. "Pilot Contamination and Precoding in Multi-cell TDD Systems," IEEE Transactions on Wireless Communications, 2011, vol. 10, No. 8, pp. 2640-2651.
Jose J., "Channel Estimation and Linear Precoding in Multiuser Multiple-Antenna TDD Systems," IEEE Transactions on Vehicular Technology, 2011, vol. 60, No. 5, pp. 2102-2116.
Wong et al., "A joint-channel diagonalization for multiuser MIMO antenna systems", IEEE Trans. Wireless Comm., vol. 2, Jul. 2003, pp. 773-786.
Wong et al., "Exploiting Spatia-Temporal Correlations in MIMO Wireless Channel Prediction," Dec. 2006, IEEE GLOBECOM Conference, 5 pages.
Wong et al., "Joint Channel Estimation and Prediction for OFDM Systems," Proceedings in IEEE Global Telecommunications Conference, St. Louis, MO, 2005, pp. 2255-2259.
Wong et al., "Long Range Channel Prediction for Adaptive OFDM Systems," Proceedings IEEE Asilomar Conf. on Signals, Systems, and Computers, vol. 1, Nov. 7-10, 2004, pp. 723-736.
Wong et al., "Performance Enhancement of Multiuser MIMO Wireless Communication Systems," IEEE Transactions on Communications, vol. 50, No. 12, Dec. 2002, pp. 1960-1970.
Written Opinion, BR App. No. 112014027631-5, Jun. 18, 2020, 4 pages of Original document only.
Written Opinion, BR App. No. 112014028207, Jul. 21, 2021, 10 pages (5 pages of English Translation and 5 pages of Original document).
Written Opinion, BR App. No. 112015022911-5, Jul. 22, 2020, 4 pages of Original Document Only.
Written Opinion, BR App. No. 112015023223-0, Jul. 22, 2020, 5 pages of Original Document Only.
Wu et al., "Approximate Matrix Inversion for High-Throughput Data Detection in the Large-scale MIMO Uplink," IEEE International Symposium on Circuits and Systems (ISCAS), May 2013, pp. 2155-2158.
Xiao et al., "A Comparative Study of MIMO Capacity with Different Antenna Topologies," IEEE ICCS'02, vol. 1, Nov. 2002, pp. 431-435.
Xu J., "LTE-Advanced Signal Generation and Measurements using SystemVue," Agilent Technologies, Dec. 23, 2010, 46 pages.
Yang et al., "On the Capacity of Large-MIMO Block-Fading Channels," IEEE Journal on Selected Areas in Communications, vol. 31, No. 2, Feb. 2012, pp. 117-132.
Yin et al., "A Coordinated Approach to Channel Estimation in Large-scale Multiple-antenna Systems", IEEE Journal on Selected Areas in Communications, vol. 31, No. 2, Mar. 2012, pp. 264-273.
Yin et al., "Full-Duplex in Large-Scale Wireless System," Proceeding of the Asilomar Conference on Signals, Systems and Computers, Nov. 2013, 5 pages.
Yin et al., "Implementation trade-offs for linear detection in large-scale MIMO systems," Proceeding Institute of Electrical and Electronics Engineers International Conference on Acoustics Speech, and Signal Processing, May 2013, 5 pages.
Yoo et al., "Multi-Antenna Downlink Channels with Limited Feedback and User Selection," IEEE Journal on Selected Areas in Communications, Sep. 2007, vol. 25, No. 7, pp. 1478-1491.
Yoshida, Susumu, "Coherent Coordinated Multipoint Transmission Techniques for Wireless Distributed Networks", Kyoto University, Available Online at <www.soumu.go.jp/main_content/000256555.pdf>, 2013, 5 pages (3 pages of English Translation and 2 pages of Original Document).
Yu et al., "Sum Capacity of Gaussian Vector Broadcast Channels", IEEE Transactions on Information Theory, vol. 50, No. 9, Sep. 2004, pp. 1875-1892.
Yu et al., "Trellis Precoding for the Broadcast Channel," IEEE GLOBECOM, 2001, vol. 2, pp. 1344-1348.
Zaidel et al., "Vector Precoding for Gaussian MIMO Broadcast Channels: Impact of Replica Symmetry Breaking", Institute of Electrical and Electronics Engineers Transactions on Information Theory, Mar. 2012, vol. 58, No. 3, pp. 1413-1440.
Zakhour et al., "Min-Max Fair Coordinated Beamforming via Large Systems Analysis,", in Proc. of the IEEE International Symposium on Information Theory, St. Petersburg, Jul. 2011, pp. 1990-1994.
Zamir et al., "Capacity and lattice-strategies for cancelling known interference," Proceedings of International Symposium on Information Theory, Honolulu, Hawaii, Nov. 2000, pp. 1-32.
Zetterberg, Per, "Experimental Investigation of TDD Reciprocity based Zero-Forcing Transmit Precoding", EURASIP Journal on Advances in Signal Processing, vol. 2011, Article ID 137541, Jun. 2010, 11 pages.
Zhang et al. "On Capacity of Large-Scale MIMO Multiple Access Channels with Distributed Sets of Correlated Antennas," IEEE Journal on Selected Areas in Communications, Sep. 26, 2012, vol. 31, No. 2, pp. 1-52.
Zhang et al., "Cochannel Interference Mitigation and Cooperative Processing in Downlink Multicell Multiuser MIMO Networks," EURASIP Journal on Wireless Communications and Networking, vol. 2004, No. 2, Jul. 2004, pp. 222-235.
Zhang et al., "Coordinated Multi-Cell MIMO Systems With Cellular Block Diagonalization", IEEE 2007, pp. 1669-1673.
Zhang et al., "Electromagnetic Lens-focusing Antenna Enabled Massive MIMO", Jun. 6, 2013, pp. 1-7.
Zhang et al., "Hermitian Precoding for Distributed MIMO Systems with Individual Channel State Information," IEEE Journal on Selected Areas in Communications, 2013, vol. 31, No. 2, pp. 241-250.
Zhang et al., "Networked MIMO with Clustered Linear Precoding", IEEE Transactions on Wireless Communications, vol. 8, No. 4, Apr. 2009, pp. 1910-1921.
Zheng et al., "Diversity and multiplexing: a fundamental tradeoff in multiple antenna channels," IEEE Trans. Info. Th., 2003, vol. 49, No. 5, pp. 1073-1096.

(56) References Cited

OTHER PUBLICATIONS

Zhou et al., "An Improved LR-aided K-Best Algorithm for MIMO Detection," in Proc. IEEE International Conference on Wireless Communications and Signal Processing (WCSP), Oct. 2012, 5 pages.
Zhuang et al., "Channel models for link and system level simulations", IEEE 802.16 Broadband Wireless Access Working Group, Sep. 2004, 15 pages.
Zogg et al., "Multipath Delay Spread in a Hilly Region at 210 MHz", IEEE Transactions on Vehicular Technology, vol. VT-36, No. 4, Nov. 1987, pp. 184-187.
Zou et al., "Li Reducing the Complexity of Quasi-Maximum-Likelihood Detectors Through Companding for Coded MIMO Systems," IEEE Transactions on Vehicular Technology, Mar. 2012, vol. 2012, pp. 1109-1123.
Zyren J., "Overview on the 3GPP Long Term Evolution Physical Layer," Freescale White Paper, Jul. 2007, 27 pages.
Final Office Action, U.S. Appl. No. 12/802,958, Apr. 29, 2016, 33 pages.
Final Office Action, U.S. Appl. No. 12/802,958, Jun. 25, 2013, 48 pages.
Final Office Action, U.S. Appl. No. 12/802,958, Jun. 7, 2017, 18 pages.
Final Office Action, U.S. Appl. No. 12/802,974, Aug. 1, 2014, 23 pages.
Final Office Action, U.S. Appl. No. 12/802,974, Nov. 30, 2015, 22 pages.
Final Office Action, U.S. Appl. No. 12/802,975, Aug. 4, 2014, 40 pages.
Final Office Action, U.S. Appl. No. 12/802,975, Dec. 14, 2015, 26 pages.
Final Office Action, U.S. Appl. No. 12/802,975, Dec. 22, 2016, 29 pages.
Final Office Action, U.S. Appl. No. 12/802,975, Jun. 22, 2018, 27 pages.
Final Office Action, U.S. Appl. No. 12/802,975, Oct. 18, 2019, 21 pages.
Final Office Action, U.S. Appl. No. 12/802,988, Aug. 2, 2013, 13 pages.
Final Office Action, U.S. Appl. No. 12/802,988, Feb. 8, 2017, 13 pages.
Final Office Action, U.S. Appl. No. 12/802,988, Jan. 13, 2016, 11 pages.
Final Office Action, U.S. Appl. No. 12/802,988, Jan. 22, 2018, 11 pages.
Final Office Action, U.S. Appl. No. 12/802,988, Oct. 21, 2014, 13 pages.
Final Office Action, U.S. Appl. No. 12/802,988, Sep. 5, 2012, 8 pages.
Final Office Action, U.S. Appl. No. 12/802,989, Aug. 25, 2015, 24 pages.
Final Office Action, U.S. Appl. No. 12/802,989, Jun. 12, 2014, 17 pages.
Final Office Action, U.S. Appl. No. 12/802,989, Nov. 2, 2016, 14 pages.
Final Office Action, U.S. Appl. No. 12/802,989, Nov. 27, 2012, 12 pages.
Final Office Action, U.S. Appl. No. 13/232,996, Apr. 11, 2017, 149 pages.
Final Office Action, U.S. Appl. No. 13/232,996, Jul. 31, 2013, 12 pages.
Final Office Action, U.S. Appl. No. 13/232,996, Mar. 21, 2018, 20 pages.
Final Office Action, U.S. Appl. No. 13/232,996, Nov. 12, 2015, 14 pages.
Final Office Action, U.S. Appl. No. 13/232,996, Oct. 23, 2014, 15 pages.
Final Office Action, U.S. Appl. No. 13/464,648, Aug. 1, 2013, 10 pages.
Final Office Action, U.S. Appl. No. 13/475,598, Aug. 27, 2014, 30 pages.
Final Office Action, U.S. Appl. No. 13/797,950, Aug. 24, 2017, 74 pages.
Final Office Action, U.S. Appl. No. 13/797,950, Feb. 2, 2016, 65 pages.
Final Office Action, U.S. Appl. No. 13/797,971, Oct. 9, 2015, 52 pages.
Final Office Action, U.S. Appl. No. 13/797,984, Aug. 20, 2015, 15 pages.
Final Office Action, U.S. Appl. No. 13/797,984, Sep. 29, 2016, 13 pages.
Final Office Action, U.S. Appl. No. 13/844,355, Aug. 12, 2015, 20 pages.
Final Office Action, U.S. Appl. No. 13/844,355, Dec. 15, 2016, 23 pages.
Final Office Action, U.S. Appl. No. 13/844,355, Feb. 7, 2018, 24 pages.
Final Office Action, U.S. Appl. No. 13/844,355, Feb. 21, 2019, 34 pages.
Final Office Action, U.S. Appl. No. 13/844,355, Jun. 3, 2019, 26 pages.
Final Office Action, U.S. Appl. No. 14/023,302, Mar. 2, 2015, 5 pages.
Final Office Action, U.S. Appl. No. 14/086,700, Oct. 14, 2016, 11 pages.
Final Office Action, U.S. Appl. No. 14/086,700, Sep. 2, 2015, 9 pages.
Final Office Action, U.S. Appl. No. 14/611,565, May 10, 2021, 7 pages.
Final Office Action, U.S. Appl. No. 14/611,565, Dec. 4, 2019, 19 pages.
Final Office Action, U.S. Appl. No. 14/611,565, Jun. 16, 2016, 22 pages.
Final Office Action, U.S. Appl. No. 14/611,565, Oct. 25, 2017, 25 pages.
Final Office Action, U.S. Appl. No. 14/611,565, Oct. 25, 2018, 20 pages.
Final Office Action, U.S. Appl. No. 14/611,565, Sep. 3, 2020, 7 pages.
Final Office Action, U.S. Appl. No. 14/672,014, Oct. 16, 2017, 9 pages.
Final Office Action, U.S. Appl. No. 14/672,014, Oct. 2, 2019, 10 pages.
Final Office Action, U.S. Appl. No. 15/057,002, Jul. 16, 2018, 13 pages.
Final Office Action, U.S. Appl. No. 15/181,383, Jan. 11, 2018, 8 pages.
Jungnickel et al., "Capacity of MIMO systems with closely spaced antennas", IEEE Comm. Lett., vol. 7, Aug. 2003, pp. 361-363.
Kamata et. al, "Effects of IQ Imbalance and an Effective Compensation Scheme in the MIMO-OFDM Communication System," Proceedings of the 2005 Institute of Electronics, Information and Communication General Conference, Mar. 7, 2005, B-5-90, 5 pages.
Kang et al., "Water-Filling Capacity and Beamforming Performance of MIMO Systems With Covariance Feedback," IEEE Workshop on Signal Processing Advances in Wireless Communications, Jun. 2003, pp. 556-560.
Kannan et al., "Separation of cochannel signals under imperfect timing and carrier synchronization", IEEE Trans. Veh. Technol., vol. 50, No. 1, Jan. 2001, pp. 79-96.
Karakayali et al. "Network Coordination for Spectrally Efficient Communications in Cellular Systems," IEEE Wireless Communications Magazine, 2006, vol. 13, No. 4, pp. 56-61.
Karakayali et al., "On the Maximum Common Rate Achievable in a Coordinated Network," Proceedings of the International Conference on Communications (ICC'06), Mar. 3, 2006, vol. 9, pp. 1-6.
Kayama et al., "Demodulation Reference Signal Design and Channel Estimation for LTE-Advanced Uplink," Advances in Vehicular Networking Technologies, 2011, pp. 418-432.

(56) References Cited

OTHER PUBLICATIONS

Kellerman F. C., "LDPC OFDM Space-Time Multipath Fading Channel Results," Proceedings SPIE, Digital Wireless Communications, XP-002672064, 2003, vol. 5100, pp. 19-30.
Kent, Adrian, et al, "Quantum Tagging: Authenticating Location via Quantum Information and Relativistic Signaling Constraints". 2010, 9 pages. Phys. Rev. A84, 012326 (2011), DOI: 10.1103/PhysRevA. 84.012326, arXiv:1008.2147.
Kermoal et al., "A Stochastic MIMO Radio Channel Model With Experimental Validation," IEEE Journal on Selected Areas in Communications, 2002, vol. 20, No. 6, pp. 1211-1226.
Khaled N., et al., "Interpolation Based Multi-Mode Precoding for MIMO-OFDM Systems with Limited Feedback," IEEE Transactions on Wireless Communications, vol. 6 (3), Mar. 2007, pp. 1003-1013.
Knievel C, "Low Complexity Receiver for Large-MIMO Space Time Coded Systems", in Proc. IEEE VTC—Fall'2011, Sep. 2011, 5 pages.
Knievel C., et al., "On Particle Swarm Optimization for MIMO Channel Estimation", Article ID 614384, Journal of Electrical and Computer Engineering, 2012, vol. 2012, 10 pages.
Kouassi B. et al., "Reciprocity-Based Cognitive Transmissions using a MU Massive MIMO Approach", 2013, pp. 1331-1335.
Kountouris M., et al., "HetNets and Massive MIMO: Modeling, Potential Gains, and Performance Analysis," in Proc. IEEE-APS Topical Conference on Antennas and Propagation in Wireless Communications, Sep. 2013, 5 pages.
Krim et al., "Two Decades of Array Signal Processing Research," IEEE Signal Proceedings Magazine, 1996, pp. 67-94.
Krishnan et al., "Cellular Systems with Many Antennas: Large System Analysis under Pilot Contamination," in Proceedings of the 50th Annual Allerton Conference on Communication, Control, and Computing, 2012, pp. 1220-1224.
Kumagawa et al., "A Study of Introducing Distributed Transmit Power Control to Distributed Antenna System," 2011, 30 pages.
Kumar et al. "Asymptotic Performance of Linear Receivers in MIMO Fading Channels", IEEE Information Theory Workshop, Feb. 19, 2009, 48 pages.
Lang et al., "Design and development of a 5.25 GHz software defined wireless OFDM communication platform", IEEE Communications Magazine, vol. 42, No. 6, Jun. 2004, pp. 6-12.
Lee et al., "Coordinated Multipoint Transmission and Reception in LTE-Advanced: Deployment Scenarios and Operational Challenges," IEEE Communications Magazine, Feb. 2012, pp. 148-155.
Lee et al., "Frequency-offset estimation for MIMO and OFDM systems using orthogonal training sequences", IEEE Trans. Veh. Technol., vol. 56, No. 1, Jan. 2007, pp. 146-156.
Lee et al., "MIMO Technologies in 3GPP LTE and LTE-Advanced," EURASIP Journal on Wireless Communications and Networking, 2009, 10 pages.
Lee et al., "Network Massive MIMO for Cell-Boundary Users: From a Precoding Normalization Perspective", IEEE Goblecom Workshops, 2012.
Lee J., "Introduction of LTE-Advanced DL/UL MIMO," Samsung Electronics, Sep. 2009, 18 pages.
Lee J., et al., "A Compressed Analog Feedback Strategy for Spatially Correlated Massive MIMO Systems," in Proceedings IEEE Vehicular Technology Conference (VTC), Quebec, Canada, Sep. 2012, pp. 1-6.
Letter Restarting Period for Response from U.S. Appl. No. 13/233,006, nailed Apr. 15, 2016, 9 pages.
Li et al., "MIMO techniques in WiMAX and LTE: a feature overview", IEEE Communications Magazine, May 2010, pp. 86-92.
Li P., et al., Multiple Output Selection—LAS Algorithm in Large MIMO Systems, IEEE Commun., 2010, vol. 14 (5), pp. 399-401.
Liang et al., "Asymptotic Performance of MMSE Receivers for Large Systems Using Random Matrix Theory," IEEE Transactions on Information Theory, 2007, vol. 53, No. 11, pp. 4173-4190.
Liang et al., "Block-iterative Generalized Decision Feedback Equalizers (BI-GDFE) for Large MIMO Systems: Algorithm Design and Asymptotic Performance Analysis," IEEE Transactions on Signal Processing, 2006, vol. 54, No. 6, pp. 2035-2048.
Liang Y., et al., "Interference Suppression in Wireless Cellular Networks through Picocells," Annual Conference on Social Studies Communication and Education, 2007, vol. 2007, pp. 1041-1045.
Liang Y., et al., "On the Relationship Between MMSE-SIC and Bi-GDFE Receivers for Large Multiple-Input Multiple-Output Channels," IEEE Transactions on Signal Processing, 2008, vol. 56 (8), pp. 3627-3637.
Lindstrom M., (Ericsson), "LTE-Advanced Radio Layer 2 and RRC Aspects," 3GPP TSG-RAN WG2, Dec. 17-18, 2009, 38 pages.
Liu G., "Time and frequency offset estimation for distributed multiple-input multiple-output orthogonal frequency division multiplexing system," Institute of Engineering and Technology Communications, 2010, vol. 4, No. 6, pp. 708-715.
Love D J., et al., "Grassmannian Beamforming for Multiple-Input Multiple-Output Wireless Systems", IEEE Trans. on Info. Theory special issue on MIMO Communication, 2003, vol. 49, pp. 2735-2747.
Love et al., "An Overview of Limited Feedback in Wireless Communication Systems," Special Issue on Exploiting Limited Feedback in Tomorrow's Wireless Communication Networks, IEEE Journal on Sel. Areas in Comm., 2008, vol. 26, No. 8, pp. 1341-1365.
Love et al., "Like deck chairs on the Titanic: why spectrum reallocation won't avert the coming data crunch but technology might keep the wireless industry afloat", Feb. 2012, pp. 705-719.
Lozano A., et al., "Fundamental Limits of Cooperation", Mar. 2012, 27 pages.
Luise et al., "Carrier frequency acquisition and tracking for OFDM systems", IEEE Trans. Commun., vol. 44, No. 11, Nov. 1996, pp. 1590-1598.
Luise et al., "Low-complexity blind carrier frequency recovery for OFDM signals over frequency-selective radio channels," IEEE Transactions. Communications, 2002, vol. 50, No. 7, pp. 1182-1188.
M. Baker, "LTE-Advanced physical layer", Alcatel-Lucent, Dec. 2009, 48 pages.
M. Costa, "Writing on dirty paper," IEEE Transactions on Information Theory, vol. 29, No. 3, May 1983, pp. 439-441.
Marek S., "AT&T's Rinne talks about carrier aggregation trials, small cells and more", Retrieved from the Internet: URL: http:www.fiercebroadbandwireless.comstoryatts-rinne-talks-about-carrieraggregation-trials-small-cells-and-more2012-11-08, 3 pages.
Martinez A. O., et al "Very Large Aperture Massive MIMO: a Measurement Based Study", Dec. 8, 2014, 6 pages.
Martinez et al., "Energy Detection Using Very Large Antenna Array Receivers," 48th Asilomar Conference on Signals, Systems, and Computers Proceedings, Nov. 2-5, 2014, 5 pages.
Marzetta et al., "Noncooperative Cellular Wireless with Unlimited Numbers of Base Station Antennas," IEEE Transactions on Wireless Communications, 2010, vol. 9(11), pp. 3590-3600.
Masouros et al., "Large-Scale MIMO Transmitters in Fixed Physical Spaces: The Effect of Transmit Correlation and Mutual Coupling", IEEE Trans. Commun., 2013, vol. 61, No. 7, pp. 2794-2804.
Matthaiou et al. "Sum Rate Analysis of ZF Receivers in Distributed MIMO Systems," IEEE Journal on Selected Areas in Communications, 2013, vol. 31 (2), pp. 180-191.
Matthaiou et al., "Sum Rate Analysis of ZF Receivers in Distributed MIMO Systems with Rayleigh/Lognormal Fading," 2012 IEEE International Conference on Communications, ICC 2012, Ottawa, Jun. 10-15, pp. 3857-3861.
Bengtsson, M., "A Pragmatic Approach to Multi-User Spatial Multiplexing", IEEE 2002, pp. 130-134.
Besson et al., "On parameter estimation of MIMO flat-fading channels with frequency offsets," IEEE Transactions on Transaction, Signal Processing, see also Acoustics, Speech, and Signal Processing, vol. 51, No. 3, 2003, pp. 602-613.
Bhagavatula R., et al., "Sizing up MIMO Arrays," IEEE Vehicular Technology Magazine, 2008, vol. 3 (4), pp. 31-38.
Bjornson et al., "Massive MIMO and Small Cells: Improving Energy Efficiency by Optimal Soft-Cell Coordination", ICT, 2013, Wireless Communications Symposium, pp. 5442-5447.

(56) References Cited

OTHER PUBLICATIONS

Bjornson et al., Designing Multi-User MIMO for Energy Efficiency: When is Massive MIMO the Answer?, IEEE Wireless Communications and Networking Conference (WCNC), Istanbul, Turkey, Apr. 2014, 6 pages.
Blelloch, "Introduction to Data Compression", Carnegie Mellon University Tech. Report, Sep. 2010, pp. 1-55.
Boche et al., "Analysis of Different Precoding decoding Strategies for Multiuser Beamforming", IEEE Vehicular Technology Conference, 2003, vol. 1, pp. 39-43.
Boche H., et al., "A General Duality Theory for Uplink and Downlink Beamforming", 2002, vol. 1, pp. 87-91.
Bourdoux et al., "Non-reciprocal transceivers in OFDM/SDMA systems: impact and mitigation", IEEE, 2003, pp. 183-186.
Brodersen et al., "Degrees of Freedom in Multiple Antenna Channels: A Signal Space Approach," IEEE Transactions on Information Theory, 2005, vol. 51, No. 2, pp. 523-536.
Bydon, "Silicon Valley Inventor's Radical Rewrite of Wireless", The Wall Street Journal, Retrieved on Jul. 28, 2011, Available Online at <http:biogs.wsj.comdigits20110728silicon-valley-inventors-radical-rewrite-of-wireless>, 2 pages.
Caire et al., "On the Achievable Throughput of a Multiantenna Gaussian Broadcast Channel", IEEE Transactions on Information Theory, Jul. 23, 2001, vol. 49, pp. 1-46.
Caire et al., "On the achievable throughput of a multiantenna Gaussian broadcast channel," IEEE Transactions on Information Theory, vol. 49, No. 7, Jul. 2003, pp. 1691-1706.
Caire, "On Achivable Rates in a Multi-Antenna Broadcast Downlink," IEEE Transactions on Information Theory, 2003, vol. 49, pp. 1691-1706.
Cannon et al., "Tomographical Imaging Using Uniformly Redundant Arrays," Applied Optics, vol. 18 No. 7, 1979 pp. 1052-1057.
Catreux et al., "Adaptive Modulation and MIMO Coding for Broadband Wireless Data Networks," IEEE Communications Magazine, 2002, vol. 2, pp. 108-115.
Cerato et al., Hardware implementation of low-complexity detector for large MIMO, in Proc. IEEE ISCAS'2009, Taipei, May 2009, pp. 593-596.
Cetiner et al., "A Reconfigurable Spiral Antenna for Adaptive MIMO Systems," EURASIP Journal on Wireless Communications and Networking 2005:3, 382-389, plus International Journal of Digital Multimedia Broadcasting, Special Issue on: Audio Coding, Indexing, and Effects for Broadcasting Applications, Call for Papers Hindawi Publishing Corporation, http://www.hindawi.com, pp. 1, and Special Issue on: Advances in 3DTV: Theory and Practice, Call for Papers Hindawi Publishing Corporation, http://www.hindawi.com, pp. 1.
Cetiner et al., "Multifunctional Reconfigurable MEMS Integrated Antennas for Adaptive MIMO Systems," Adaptive Antennas and MIMO Systems for Wireless Systems, IEEE Communications Magazine, vol. 42, No. 12, Dec. 2004, pp. 62-70.
Chae et al., "Adaptive MIMO Transmission Techniques for Broadband Wireless Communication Systems", IEEE Communications Magazine, 2010, vol. 48, No. 5, pp. 112-118.
Chae et al., "Coordinated Beamforming with Limited Feedback in the MIMO Broadcast Channel," Special Issue on Exploiting Limited Feedback in Tomorrow's Wireless Comm. Networks, IEEE Journal on Selected Areas in Communications, 2008, vol. 26, No. 8, pp. 1505-1515.
Chandrasekaran et al., "Near-Optimal Large-MIMO Detection Using Randomized MCMC and Randomized Search Algorithms," Proceeding in Institute of Electrical and Electronics Engineers International Conference on Communications, 2011, 5 pages.
Chapter 26—Electromagnetic-Wave Propagation, Reference Data for Radio Engineers, 5th Edition, Howard W. Sams & Co., Inc., 1973, pp. 1-32.
Chen et al., "Transmit selection diversity for unitary precoded multiuser spatial multiplexing systems with linear receivers", IEEE Trans. on Signal Processing, 2005, pp. 1-30.
Chen et al., "Transmit Selection Diversity for Unitary Precoded Multiuser Spatial Multiplexing Systems with Linear Receivers", IEEE Trans. on Signal Processing, 2007, vol. 55, No. 3, pp. 1159-1171.
Chen, R., "Multiuser Space-Time Block Coded MIMO System with Downlink," IEEE Communications Society, 2004, pp. 2689-2693.
Chockalingam, A., "Low-Complexity Algorithms for Large-MIMO Detection," International Symposium on Communications, Control and Signal Processing, 2010, 6 pages.
Choi et al., "A transmit preprocessing technique for multiuser MIMO systems using a decomposition approach," IEEE Trans. Wireless Comm, 2004, vol. 3, No. 1, pp. 20-24.
Choi et al., "Downlink Training Techniques for FDD Massive MIMO Systems: Open-Loop and Closed-Loop Training with Memory," IEEE Journal of Selected Topics in Signal Processing on Signal Processing for Large-Scale MIMO Communications, 2013, 13 pages.
Choi et al., "Noncoherent Trellis Coded Quantization: A Practical Limited Feedback Technique for Massive MIMO Systems," Nov. 8, 2013, pp. 1-14.
Choi et al., "Opportunistic space division multiple access with beam selection," IEEE Trans. on Communications, 2006, pp. 1-23.
Choi J., et al., "Interpolation Based Transmit Beamforming for MIMO-OFDM with Limited Feedback," IEEE Transactions on Signal Processing, 2005, vol. 53 (11), pp. 4125-4135.
Choi J., et al., "Interpolation Based Unitary Precoding for Spatial Multiplexing MIMO-OFDM with Limited Feedback," Global Telecommunications Conference 2004 (GLOBECOM '04), IEEE, Dec. 3, 2004, pp. 214-218.
Chu et al., "Polyphase codes with good periodic correlation properties (corresp.)", IEEE Trans. Inform. Theory, vol. 18, No. 4, Jul. 1972, pp. 531-532.
Chuah C. N., et al.,"Capacity Scaling in MIMO Wireless Systems under Correlated Fading", IEEE Trans. Inform. Theory, 2002, vol. 48 (3), pp. 637-650.
CMCC, "Discussion on CQI definition for non-PMI/RI reporting", 3GPP TSG-RAN WG1 #70, R1-123739, Aug. 13-17, 2012, 6 pages.
Cohn et al., "Group-theoretic Algorithms for Matrix Multiplication", IEEE Symposium on Foundations of Computer Science, 2005, pp. 379-388.
Communication pursuant to Article 94(3) EPC for Application No. EP13856705.2, dated Mar. 13, 2018, 6 pages.
Communication pursuant to Article 94(3) EPC for European Application No. 10156954, dated Jan. 25, 2017, 5 pages.
Communication pursuant to Article 94(3) EPC, EP App. No. 19189155.5, Apr. 9, 2021, 6 pages.
Coopersmith et al., "Matrix Multiplication via Arithmetic Progression", Journal of Symbolic Computation, 1990, vol. 9, pp. 251-280.
Corrected Notice of Allowability, U.S. Appl. No. 15/057,002, Jun. 3, 2019, 11 pages.
Corrected Notice of Allowability, U.S. Appl. No. 16/188,841, Oct. 28, 2020, 7 pages.
Corrected Notice of Allowability, U.S. Appl. No. 16/436,864, Jul. 22, 2020, 2 pages.
Corrected Notice of Allowance, U.S. Appl. No. 13/797,950, Nov. 13, 2018, 16 pages.
Corrected Notice of Allowance, U.S. Appl. No. 13/797,984, Apr. 5, 2018, 12 pages.
Corrected Notice of Allowance, U.S. Appl. No. 13/797,984, Feb. 8, 2018, 4 pages.
Corrected Notice of Allowance, U.S. Appl. No. 14/086,700, Nov. 8, 2018, 104 pages.
Corrected Notice of Allowance, U.S. Appl. No. 15/792,610, Oct. 6, 2020, 4 pages.
Couillet et al., "A Deterministic Equivalent for the Analysis of Correlated MIMO Multiple Access Channels," IEEE Trans. Inform. Theory, 2011, vol. 57, No. 6, pp. 3493-3514.
Office Action, CA App. No. 2514383, Jul. 26, 2012, 3 pages.
Office Action, CA App. No. 2816556, May 19, 2020, 3 pages.
Office Action, CA App. No. 2816556, May 30, 2019, 3 pages.
Office Action, CA App. No. 2945987, Apr. 13, 2021, 3 pages.
Office Action, CA App. No. 3025857, Dec. 8, 2020, 5 pages.

(56) References Cited

OTHER PUBLICATIONS

Office Action, CN App. No. 200510088676.1, Feb. 5, 2010, 18 pages.
Office Action, CN App. No. 200510088676.1, Jan. 25, 2011, 8 pages.
Office Action, CN App. No. 200510088676.1, Mar. 20, 2009, 24 pages.
Office Action, CN App. No. 200510088676.1, Oct. 26, 2010, 4 pages.
Office Action, CN App. No. 200880102933.4, Dec. 7, 2012, 20 pages.
Office Action, CN App. No. 201380061515.6, Apr. 23, 2019, 2 pages.
Office Action, CN Patent App. No. 201180061132.X, May 27, 2015, 6 pages.
Office Action, CN Patent App. No. 201180061132.X, Oct. 10, 2016, 11 pages.
Office Action, EP App. No. 05254757.7, Dec. 3, 2012, 6 pages.
Office Action, EP App. No. 05254757.7, Dec. 21, 2018, 4 pages.
Office Action, EP App. No. 05254757.7, Nov. 11, 2019, 5 pages.
Office Action, EP App. No. 05254757.7, Sep. 2, 2020, 5 pages.
Office Action, EP App. No. 08798313.6, Oct. 24, 2017, 8 pages.
Office Action, EP App. No. 10156950.7, Dec. 12, 2017, 9 pages.
Office Action, EP App. No. 10156950.7, Jan. 7, 2020, 6 pages.
Office Action, EP App. No. 10184659, Dec. 4, 2017, 5 pages.
Office Action, EP App. No. 10184659, Nov. 11, 2019, 5 pages.
Office Action, EP App. No. 10184659.0, Dec. 21, 2018, 4 pages.
Office Action, EP App. No. 10184659.0, Sep. 2, 2020, 5 pages.
Office Action, EP App. No. 12762167.0, Sep. 30, 2016, 6 pages.
Office Action, EP App. No. 13784690.3, Apr. 15, 2019, 4 pages.
Office Action, EP App. No. 13784690.3, Aug. 23, 2018, 6 pages.
Office Action, EP App. No. 13790935, Oct. 23, 2019, 8 pages.
Office Action, EP App. No. 13790935.4, Feb. 4, 2019, 11 pages.
Office Action, EP App. No. 13843203.4, Feb. 25, 2019, 6 pages.
Office Action, EP App. No. 13843203.4, Mar. 23, 2018, 5 pages.
Office Action, EP App. No. 13856705.2, Jul. 18, 2017, 5 pages.
Office Action, EP App. No. 14770916.6, Mar. 13, 2018, 5 pages.
Office Action, EP App. No. 15746217.7, Feb. 1, 2021, 10 pages.
Office Action, EP App. No. 15780522.7, Jun. 7, 2021, 8 pages.
Office Action, EP App. No. 15780522.7, Mar. 19, 2020, 6 pages.
Office Action, EP App. No. 17844265.3, May 10, 2021, 9 pages.
Office Action, EP App. No. 18186156.8, Jul. 30, 2019, 5 pages.
Office Action, EP App. No. 18186156.8, Jun. 12, 2020, 6 pages.
Office Action, EP App. No. 19159810.1, Oct. 4, 2021, 7 pages.
Office Action, IL App. No. 235518, Apr. 7, 2019, 4 pages.
Office Action, IL App. No. 241319, Nov. 26, 2019, 6 pages (3 pages of English Translation and 3 pages of Original Document).
Office Action, IL App. No. 248265, Feb. 26, 2020, 4 pages (2 pages of English Translation and 2 pages of Original Document).
Office Action, IL App. No. 248265, Oct. 25, 2018, 6 pages.
Office Action, IL App. No. 253541, Nov. 29, 2018, 4 pages.
Office Action, IL App. No. 269145, Jun. 16, 2020, 4 pages (2 pages of English Translation and 2 pages of Original Document).
Office Action, IL App. No. 270106, May 19, 2020, 8 pages (4 pages of English Translation and 4 pages of Original Document).
Office Action, JP App No 2019-168511, Dec. 24, 2020, 6 pages (3 pages of English Translation and 3 pages of Original Document).
Office Action, JP App. No. 2007-506302, Jan. 11, 2011, 5 pages.
Office Action, JP App. No. 20150162819, Oct. 3, 2016, 6 pages.
Non-Final Office Action, U.S. Appl. No. 14/611,565, Mar. 25, 2020, 5 pages.
Non-Final Office Action, U.S. Appl. No. 14/611,565, Nov. 5, 2021, 7 pages.
Non-Final Office Action, U.S. Appl. No. 14/672,014, Feb. 22, 2021, 12 pages.
Non-Final Office Action, U.S. Appl. No. 14/672,014, Jun. 8, 2020, 11 pages.
Non-Final Office Action, U.S. Appl. No. 15/181,383, Jun. 25, 2018, 7 pages.
Non-Final Office Action, U.S. Appl. No. 15/181,383, May 22, 2017, 48 pages.
Non-Final Office Action, U.S. Appl. No. 15/340,914, Aug. 8, 2019, 13 pages.
Non-Final Office Action, U.S. Appl. No. 15/340,914, Mar. 25, 2020, 15 pages.
Non-Final Office Action, U.S. Appl. No. 15/682,076, Jan. 28, 2019, 20 pages.
Non-Final Office Action, U.S. Appl. No. 15/682,076, May 27, 2020, 8 pages.
Non-Final Office Action, U.S. Appl. No. 15/792,610, Apr. 18, 2019, 147 pages.
Non-Final Office Action, U.S. Appl. No. 15/792,610, Apr. 29, 2020, 7 pages.
Non-Final Office Action, U.S. Appl. No. 15/792,610, Jan. 13, 2021, 8 pages.
Non-Final Office Action, U.S. Appl. No. 16/188,841, Jan. 22, 2020, 9 pages.
Non-Final Office Action, U.S. Appl. No. 16/208,895, Sep. 9, 2021, 7 pages.
Non-Final Office Action, U.S. Appl. No. 16/208,895, Apr. 26, 2019, 7 pages.
Non-Final Office Action, U.S. Appl. No. 16/208,895, Jan. 3, 2020, 7 pages.
Non-Final Office Action, U.S. Appl. No. 16/208,895, Jul. 28, 2020, 7 pages.
Non-Final Office Action, U.S. Appl. No. 16/253,028, Oct. 18, 2019, 10 pages.
Non-Final Office Action, U.S. Appl. No. 16/578,265, May 12, 2020, 8 pages.
Non-Final Office Action, U.S. Appl. No. 16/719,169, Feb. 4, 2021, 15 pages.
Non-Final Office Action, U.S. Appl. No. 17/100,875, Nov. 9, 2021, 10 pages.
Non-Final Office Action, U.S. Appl. No. 17/234,699, Jul. 15, 2021, 9 pages.
Non-Final Office Action, U.S. Appl. No. 17/308,031, Jul. 15, 2021, 12 pages.
Non-Final Office Action, U.S. Appl. No. 17/317,856, Jul. 19, 2021, 39 pages.
Non-Final Office Action, U.S. Appl. No. 17/361,252, Oct. 20, 2021, 10 pages.
Non-Final Office Action, U.S. Appl. No. 17/379,985, Aug. 26, 2021, 10 pages.
Non-Final Office Action, U.S. Appl. No. 17/498,666, Dec. 29, 2021, 22 pages.
Non-Final Office Action, U.S. Appl. No. 17/541,809, Feb. 8, 2022, 9 pages.
Non-Final Office Action, U.S. Appl. No. 12/802,958, Jun. 23, 2014, 24 pages.
Non-Final Office Action, U.S. Appl. No. 12/802,974, Aug. 1, 2013, 35 pages.
Non-Final Office Action, U.S. Appl. No. 12/802,975, Aug. 14, 2013, 26 pages.
Non-Final Office Action, U.S. Appl. No. 12/802,975, May 7, 2015, 25 pages.
Non-Final Office Action, U.S. Appl. No. 12/802,988, Apr. 12, 2013, 45 pages.
Non-Final Office Action, U.S. Appl. No. 12/802,988, Jun. 26, 2015, 17 pages.
Non-Final Office Action, U.S. Appl. No. 12/802,988, Mar. 24, 2014, 11 pages.
Non-Final Office Action, U.S. Appl. No. 12/802,989, Nov. 25, 2014, 17 pages.
Non-Final Office Action, U.S. Appl. No. 12/802,989, Nov. 26, 2013, 27 pages.
Non-Final Office Action, U.S. Appl. No. 13/232,996, Apr. 11, 2013, 23 pages.
Non-Final Office Action, U.S. Appl. No. 13/232,996, Jun. 24, 2015, 15 pages.
Non-Final Office Action, U.S. Appl. No. 13/233,006, Apr. 1, 2016, 9 pages.

(56) References Cited

OTHER PUBLICATIONS

Non-Final Office Action, U.S. Appl. No. 13/233,006, Apr. 16, 2013, 9 pages.
Non-Final Office Action, U.S. Appl. No. 13/233,006, Apr. 28, 2017, 10 pages.
Non-Final Office Action, U.S. Appl. No. 13/233,006, Jul. 11, 2018, 29 pages.
Non-Final Office Action, U.S. Appl. No. 13/233,006, Jun. 4, 2015, 12 pages.
Non-Final Office Action, U.S. Appl. No. 13/233,006, Sep. 12, 2013, 6 pages.
Non-Final Office Action, U.S. Appl. No. 13/233,006, Sep. 24, 2014, 9 pages.
Non-Final Office Action, U.S. Appl. No. 13/461,682, Feb. 25, 2014, 37 pages.
Non-Final Office Action, U.S. Appl. No. 13/464,648, Feb. 14, 2014, 11 pages.
Non-Final Office Action, U.S. Appl. No. 13/475,598, Mar. 23, 2015, 14 pages.
Notice of Allowance, U.S. Appl. No. 11/256,478, Jan. 26, 2010, 9 pages.
Notice of Allowance, U.S. Appl. No. 11/256,478, Jul. 30, 2009, 9 pages.
Notice of Allowance, U.S. Appl. No. 11/256,478, Oct. 29, 2009, 16 pages.
Notice of Allowance, U.S. Appl. No. 11/894,362, Mar. 23, 2009, 10 pages.
Notice of Allowance, U.S. Appl. No. 11/894,362, Nov. 10, 2009, 5 pages.
Notice of Allowance, U.S. Appl. No. 11/894,362, Sep. 3, 2009, 12 pages.
Notice of Allowance, U.S. Appl. No. 11/894,394, Jun. 26, 2009, 7 pages.
Notice of Allowance, U.S. Appl. No. 11/894,394, Jul. 30, 2009, 14 pages.
Notice of Allowance, U.S. Appl. No. 11/894,394, Mar. 6, 2009, 11 pages.
Notice of Allowance, U.S. Appl. No. 11/894,540, Nov. 9, 2009, 5 pages.
Notice of Allowance, U.S. Appl. No. 11/894,540, Sep. 14, 2009, 13 pages.
Notice of Allowance, U.S. Appl. No. 12/143,503, Apr. 11, 2011, 9 pages.
Notice of Allowance, U.S. Appl. No. 12/143,503, Aug. 18, 2011, 12 pages.
Notice of Allowance, U.S. Appl. No. 12/143,503, Dec. 9, 2011, 11 pages.
Notice of Allowance, U.S. Appl. No. 12/637,643, Jan. 17, 2013, 11 pages.
Notice of Allowance, U.S. Appl. No. 12/802,938, Dec. 6, 2012, 37 pages.
Notice of Allowance, U.S. Appl. No. 12/802,938, Sep. 19, 2012, 8 pages.
Notice of Allowance, U.S. Appl. No. 12/802,975, Apr. 17, 2020, 12 pages.
Notice of Allowance, U.S. Appl. No. 12/802,975, Aug. 26, 2020, 14 pages.
Notice of Allowance, U.S. Appl. No. 12/802,976, Apr. 14, 2011, 8 pages.
Notice of Allowance, U.S. Appl. No. 12/802,976, Aug. 22, 2011, 8 pages.
Notice of Allowance, U.S. Appl. No. 12/802,976, Dec. 9, 2011, 11 pages.
Notice of Allowance, U.S. Appl. No. 12/802,976, Nov. 29, 2010, 6 pages.
Notice of Allowance, U.S. Appl. No. 12/802,988, Nov. 15, 2018, 11 pages.
Notice of Allowance, U.S. Appl. No. 12/917,257, Dec. 6, 2012, 8 pages.
Notice of Allowance, U.S. Appl. No. 12/917,257, Feb. 15, 2013, 18 pages.
Notice of Allowance, U.S. Appl. No. 13/232,996, Jan. 9, 2019, 11 pages.
Notice of Allowance, U.S. Appl. No. 13/232,996, Mar. 20, 2019, 10 pages.
Notice of Allowance, U.S. Appl. No. 13/233,006, Apr. 3, 2019, 19 pages.
Notice of Allowance, U.S. Appl. No. 13/233,006, Jul. 12, 2019, 12 pages.
Notice of Allowance, U.S. Appl. No. 13/233,006, May 30, 2019, 12 pages.
Notice of Allowance, U.S. Appl. No. 13/475,596, Oct. 19, 2015, 29 pages.
Notice of Allowance, U.S. Appl. No. 13/475,598, Oct. 19, 2015, 10 pages.
Notice of Allowance, U.S. Appl. No. 13/797,950, Apr. 16, 2018, 117 pages.
Notice of Allowance, U.S. Appl. No. 13/797,950, Aug. 2, 2018, 23 pages.
Notice of Allowance, U.S. Appl. No. 13/797,984, Jan. 17, 2018, 146 pages.
Notice of Allowance, U.S. Appl. No. 13/797,984, Oct. 19, 2017, 10 pages.
Notice of Allowance, U.S. Appl. No. 13/844,355, Dec. 16, 2019, 2 pages.
Notice of Allowance, U.S. Appl. No. 13/844,355, Oct. 21, 2019, 8 pages.
Notice of Allowance, U.S. Appl. No. 14/023,302, May 17, 2016, 5 pages.
Notice of Allowance, U.S. Appl. No. 14/156,254, Nov. 11, 2015, 29 pages.
Notice of Allowance, U.S. Appl. No. 14/672,014, Sep. 23, 2021, 11 pages.
Notice of Allowance, U.S. Appl. No. 15/057,002, Apr. 16, 2019, 11 pages.
Notice of Allowance, U.S. Appl. No. 15/057,002, Dec. 19, 2018, 68 pages.
Notice of Allowance, U.S. Appl. No. 15/181,383, Jan. 25, 2019, 87 pages.
Notice of Allowance, U.S. Appl. No. 15/181,383, Mar. 20, 2019, 10 pages.
Notice of Allowance, U.S. Appl. No. 15/201,276, Jan. 23, 2019, 29 pages.
Notice of Allowance, U.S. Appl. No. 15/201,276, May 28, 2019, 4 pages.
Notice of Allowance, U.S. Appl. No. 15/340,914, Dec. 2, 2020, 9 pages.
Notice of Allowance, U.S. Appl. No. 15/340,914, Mar. 15, 2021, 4 pages.
Mattheijssen P., "Antenna-Pattern Diversity versus Space Diversity for use at Handhelds," IEEE Trans. on Yeh. Technol, 2004, vol. 53 (4), pp. 1035-1042.
Mazrouei-Sebdani et al., Vector Perbutation Precoding and User Scheduling for Network MIMO, 2011, Wireless Communications and Networking Conference (WCNC), 2011 IEEE, pp. 203-208.
McKay et al., "Multiplexing/beamforming switching for coded MIMO in spatially correlated channels based on Closed-Form BER Approximations," IEEE Transactions on Vehicular Technology, 2007, vol. 56, No. 5, pp. 2555-2567.
McKay MR., et al., "A throughput-based adaptive MIMO BICM approach for spatially-correlated channels," IEEE to appear in Proc. ICC, 2006, 5 pages.
McLean et al., "A re-examination of the fundamental limits on the radiation Q of electrically small antennas", IEEE Trans. Antennas Propagat., vol. 44, n.5,, (May 1996), pp. 672-676.
MikroTik, "Routerboard," Retrieved from the Internet: URL: http:routerboard.com, 2015, 30 pages.
Minn et al., "A robust timing and frequency synchronization for OFDM systems", IEEE Trans. Wireless Commun., vol. 2, No. 4, Jul. 2003, pp. 822-839.
Mitsubishi Electric, "Leakage-based Precoding for CoMP in LTE-A," 3GPP RAN1 #56, R1-090596, Feb. 9-13, 2009, 14 pages.

(56) References Cited

OTHER PUBLICATIONS

Miyakawa et al., "A Method of Code Conversion for Digital Communication Channels with Intersymbol Interference," Transactions of the Institute of Engineers of Japan, vol. 52-A (6), 1969, pp. 272-273.
Mohammed et al., "A Low-Complexity Precoder for Large Multiuser MISO Systems", IEEE Vehicular Technology Conference, 2008, pp. 797-801.
Mohammed et al., "Per-Antenna Constant Envelope Precoding for Large Multi-User MIMO Systems," IEEE Transactions on Communications, Jan. 2012, vol. 61, No. 3, pp. 1-24.
Mohammed et al., "Single-User Beamforming in Large-Scale MISO Systems with Per-Antenna Constant-Envelope Constraints," IEEE Transactions on Wireless Communications, Sep. 2012, vol. 2012, pp. 3992-4005.
Mohammed S. K., et al., "Constant-Envelope Multi-User Precoding for Frequency-Selective Massive MIMO Systems," IEEE Wireless Communications Letters, 2013, vol. 2(5), pp. 547-550.
Molisch et al., "MIMO Systems with Antenna Selection," IEEE Microwave Magazine, vol. 5, No. 1, Mar. 2004, pp. 46-56.
Montgomery B.G., "Analog RF-over-fiber technology, Syntonics LLC," 2008, pp. 2-51,Available Online at <http:chesapeakebayaoc.orgdocumentsSyntonics_AOC_RF_over-Fiber_19_Jan_08.pdf>.
Monziano et al., "Introduction to Adaptive Arrays," New York, Wiley, 1980, Table of Contents 21 pages.
Moose et al., "A technique for orthogonal frequency division multiplexing frequency offset correction", IEEE Trans. Commun., vol. 42, No. 10, Oct. 1994, pp. 2908-2914.
Morelli et al., "An improved frequency offset estimator for OFDM applications", IEEE Commun. Lett., vol. 3, No. 3, Mar. 1999, pp. 75-77.
Morelli et al., "Frequency ambiguity resolution in OFDM systems," IEEE Commun. Lett, 2000, vol. 4, No. 4, pp. 134-136.
Morgan Stanley, "Mobile data wave: who dares to invest, wins", Jun. 13, 2012.
Morris et al., "Network model for MIMO systems with coupled antennas and noisy amplifiers," IEEE Transactions on Antennas and Propagation, 2005, vol. 53, pp. 545-552.
Morris et al., "The Impact of Array Configuration on MIMO Wireless Channel Capacity," Proc. IEEE Antennas and Propagation Symposium, Jun. 2002, vol. 3, pp. 214-217.
Motorola, "Long Term Evolution (LTE): A Technical Overview," 2007, Retrieved from the Internet: http:business.motorola.comexperienceltepdfLTETechnicalOverview.pdf, 15 pages.
Moustakas et al., "Optimizing Multiple-Input Single-Output (MISO) Communication Systems with General Gaussian channels: Nontrivial Covariance and Nonzero Mean", Institute of Electrical and Electronics Engineers Transactions on Information Theory, 2003, vol. 49, pp. 2770-2780.
Moustakas et al.,"MIMO Capacity Through Correlated Channels in the Presence of Correlated Interferers and Noise: A (Not so) Large N Analysis", Institute of Electrical and Electronics Engineers Transformations and Information Theory, 2003, vol. 49, No. 10, pp. 2545-2561.
Muharar et al., "Downlink Beamforming with Transmit-Side Channel Correlation: A Large System Analysis," in Proc. IEEE International Conference on Communications (ICC), Kyoto, Japan, Jun. 2011, 5 pages.
Muller et al., "Blind Pilot Decontamination," IEEE Journal of Selected Topics in Signal Processing on Signal Processing for Large-Scale MIMO Communications, 2013, 31 pages.
Muller et al., "Vector Precoding for Wireless MIMO Systems and its Replica Analysis," IEEE J. Sel. Areas Commun, 2008, vol. 26, No. 3, pp. 530-540.
Nam J., et al., "Joint Spatial Division and Multiplexing: Realizing Massive MIMO Gains with Limited Channel State Information," in Proceedings Conference on Information Sciences and Systems, IEEE, Mar. 2012, 6 pages.
Narasimhan et al., "M-ary Detection and q-ary Decoding in Large-Scale MIMO: A Non-Binary Belief Propagation Approach," Oct. 16, 2013, 7 pages.
NEC, "Self organizing networks", White paper, Feb. 2009, 5 pages.
Netsukuku, printed on Sep. 30, 2015, Retrieved from the Internet: URL: http:netsukuku.freaknet.org., 8 pages.
Ngo et al., Energy and Spectral Efficiency of Very Large Multiuser MIMO Systems, IEEE Transactions on Communications, May 21, 2012, vol. 61 No. 4, pp. 1436-1449.
Ngo et al., EVD-Based Channel Estimations for Multicell Multiuser MIMO with Very Large Antenna Arrays, IEEE International Conference on Acoustics, Speed and Signal Processing (ICASSP), Kyoto, Japan, Mar. 2012, 5 pages.
Ngo et al., Massive MU-MIMO Downlink TDD Systems with Linear Precoding and Downlink Pilots, Proceedings in Allerton Conference on Communication, Control, and Computing, Urbana-Champaign, Illinois, Oct. 2013.
Ngo et al., The multicell multiuser MIMO uplink with very large antenna arrays and a finite-dimensional channel, IEEE Transactions Communications, 2013, vol. 61, No. 6, pp. 2350-2361.
Ngo et al., Uplink Performance Analysis of Multicell MU-MIMO Systems with ZF Receivers, Jun. 2012, pp. 1-32.
Nguyen et al., "Precoding for Multicell MIMO Systems with Compressive Rank-q Channel Approximation", in Proc. IEEE PIMRC, Fundamentals and Phy Track, London, UK, Sep. 2013, pp. 1227-1232.
Nguyen S., et al., "Compressive Sensing-Based Channel Estimation for Massive Multiuser MIMO Systems" in proceeding IEEE WCNC, 2013, 6 pages.
Nguyen, et al., "Multiuser Transmit Beamforming via Regularized Channel Inversion: A Large System Analysis" IEEE Global Communications Conference, New Orleans, LO, US, Dec. 2008, pp. 1-4.
NICTA, "InterfereX", Available Online at <http://www.interfereX.com, Jun. 22, 2015, 3 pages.
Nokia Siemens Networks, "2020: Beyond 4g, Radio Evolution for the Gigabit Experience", White Paper, 2011, www.nokiasiemensnetworks.com, 16 pages.
Non Final Office Action, U.S. Appl. No. 16/505,593, Sep. 10, 2020, 12 pages.
Non-Final Office Action, U.S. Appl. No. 13/844,355, Aug. 12, 2019, 14 pages.
Non-Final Office Action, U.S. Appl. No. 10/817,731, Jan. 4, 2008, 14 pages.
Non-Final Office Action, U.S. Appl. No. 10/817,731, Jan. 21, 2009, 23 pages.
Non-Final Office Action, U.S. Appl. No. 10/817,731, Mar. 15, 2010, 26 pages.
Non-Final Office Action, U.S. Appl. No. 10/817,731, May 18, 2007, 16 pages.
Non-Final Office Action, U.S. Appl. No. 10/902,978, Apr. 10, 2008, 8 pages.
Non-Final Office Action, U.S. Appl. No. 10/902,978, Nov. 6, 2007, 11 pages.
3GPP TSG-RAN WG1 #70, "Uplink timing advance", Qualcomm Incorporated, R1-123695, Aug. 13-17, 2012, 6 pages.
Decision of Refusal, JP App. No. 2019-093904, Feb. 7, 2022, 4 pages (2 pages of English Translation and 2 pages of Original Document).
Examination Search Report, CA App. No. 2945987, Jan. 27, 2023, 3 pages.
Final Office Action, U.S. Appl. No. 14/611,565, Jul. 12, 2022, 12 pages.
Final Office Action, U.S. Appl. No. 14/611,565, Sep. 28, 2023, 15 pages.
Final Office Action, U.S. Appl. No. 16/208,895, Jul. 28, 2022, 5 pages.
Final Office Action, U.S. Appl. No. 17/498,666, Apr. 22, 2022, 17 pages.
Final Office Action, U.S. Appl. No. 17/528,811, May 10, 2023, 12 pages.
Intention to Grant, EP App. No. 05254757.7, Mar. 1, 2023, 6 pages.
Intention to Grant, EP App. No. 10184659, Mar. 1, 2023, 6 pages.

(56) References Cited

OTHER PUBLICATIONS

International Preliminary Report on Patentability, PCT App. No. PCT/US2021/026431, Oct. 20, 2022, 5 pages.
Non Final Office Action, U.S. Appl. No. 17/528,811, Oct. 26, 2022, 14 pages.
Non-Final Office Action, U.S. Appl. No. 14/611,565, Jan. 4, 2023, 13 pages.
Non-Final Office Action, U.S. Appl. No. 16/208,895, Sep. 8, 2022, 7 pages.
Non-Final Office Action, U.S. Appl. No. 17/224,977, Feb. 22, 2023, 7 pages.
Non-Final Office Action, U.S. Appl. No. 17/498,666, Aug. 18, 2022, 7 pages.
Non-Final Office Action, U.S. Appl. No. 17/946,856, Mar. 17, 2023, 12 pages.
Non-Final Office Action, U.S. Appl. No. 17/948,193, Nov. 22, 2022, 23 pages.
Non-Final Office Action, U.S. Appl. No. 18/109,207, Apr. 25, 2023, 15 pages.
Non-Final Office Action, U.S. Appl. No. 18/144,838, Aug. 23, 2023, 18 pages.
Non-Final Office Action, U.S. Appl. No. 16/208,895, Apr. 15, 2022, 6 pages.
Notice of Acceptance, AU App. No. 2017350850, Aug. 10, 2022, 4 pages.
Notice of Allowance, U.S. Appl. No. 16/208,895, Feb. 8, 2023, 6 pages.
Notice of Allowance, U.S. Appl. No. 16/208,895, Jul. 21, 2023, 5 pages.
Notice of Allowance, U.S. Appl. No. 16/208,895, Oct. 4, 2023, 2 pages.
Notice of Allowance, U.S. Appl. No. 17/100,875, Apr. 22, 2022, 8 pages.
Notice of Allowance, U.S. Appl. No. 17/100,875, Aug. 10, 2022, 9 pages.
Notice of Allowance, U.S. Appl. No. 17/498,666, Oct. 13, 2022, 7 pages.
Notice of Allowance, U.S. Appl. No. 17/498,666, Sep. 29, 2022, 10 pages.
Notice of Allowance, U.S. Appl. No. 17/532,941, Jun. 1, 2023, 16 pages.
Notice of Allowance, U.S. Appl. No. 17/532,941, Jun. 28, 2023, 2 pages.
Notice of Allowance, U.S. Appl. No. 17/532,967, Jun. 14, 2023, 10 pages.
Notice of Allowance, U.S. Appl. No. 17/532,967, Jun. 28, 2023, 2 pages.
Notice of Allowance, U.S. Appl. No. 17/541,809, Mar. 15, 2022, 5 pages.
Notice of Allowance, U.S. Appl. No. 17/586,765, Apr. 7, 2022, 7 pages.
Notice of Allowance, U.S. Appl. No. 17/586,765, Jul. 27, 2022, 7 pages.
Notice of Allowance, U.S. Appl. No. 17/946,856, Sep. 6, 2023, 8 pages.
Notice of Allowance, U.S. Appl. No. 17/946,856, Sep. 21, 2023, 5 pages.
Notice of Allowance, U.S. Appl. No. 17/948,193, Dec. 21, 2022, 5 pages.
Notice of Allowance, U.S. Appl. No. 18/144,838, Sep. 20, 2023, 7 pages.
Notice of Final Rejection, KR App. No. 10-2015-7028298, Mar. 14, 2022, 8 pages (4 pages of English Translation and 4 pages of Original Document).
Office Action and Search Report, CN App. No. 201780052444.1, Sep. 20, 2022, 20 pages (11 pages of English Translation and 9 pages of Original Document).
Office Action, EP App. No. 05254757.7, Apr. 21, 2022, 6 pages.
Office Action, EP App. No. 10184659, Apr. 21, 2022, 6 pages.
Office Action, EP App. No. 15746217.7, Jan. 26, 2023, 6 pages.
Office Action, EP App. No. 17864744.2, Oct. 27, 2022, 9 pages.
Office Action, IL App. No. 272481, Nov. 9, 2022, 6 pages (3 pages of English Translation and 3 pages of Original Document).
Office Action, JP App. No. 2022-081379, May 24, 2023, 08 pages (04 pages of English Translation and 04 pages of Original Document).
Notice of Allowance, U.S. Appl. No. 15/682,076, Jan. 14, 2021, 11 pages.
Notice of Allowance, U.S. Appl. No. 15/682,076, Mar. 24, 2021, 11 pages.
Notice of Allowance, U.S. Appl. No. 15/792,610, Jul. 13, 2021, 10 pages.
Notice of Allowance, U.S. Appl. No. 15/792,610, Nov. 3, 2021, 2 pages.
Notice of Allowance, U.S. Appl. No. 15/792,610, Oct. 2, 2020, 7 pages.
Notice of Allowance, U.S. Appl. No. 15/792,610, Oct. 26, 2021, 2 pages.
Notice of Allowance, U.S. Appl. No. 16/188,841, Sep. 10, 2020, 9 pages.
Notice of Allowance, U.S. Appl. No. 16/253,028, Dec. 27, 2019, 10 pages.
Notice of Allowance, U.S. Appl. No. 16/436,864, Jun. 11, 2020, 5 pages.
Notice of Allowance, U.S. Appl. No. 16/578,265, Mar. 31, 2021, 7 pages.
Notice of Allowance, U.S. Appl. No. 16/719,169, Jun. 17, 2021, 8 pages.
Notice of Allowance, U.S. Appl. No. 16/719,169, Jun. 30, 2021, 2 pages.
Notice of Allowance, U.S. Appl. No. 16/719,169, Sep. 16, 2021, 2 pages.
Notice of Allowance, U.S. Appl. No. 17/234,699, Jul. 28, 2021, 7 pages.
Notice of Allowance, U.S. Appl. No. 17/308,031, Aug. 4, 2021, 7 pages.
Notice of Allowance, U.S. Appl. No. 17/317,856, Oct. 1, 2021, 2 pages.
Notice of Allowance, U.S. Appl. No. 17/317,856, Sep. 9, 2021, 8 pages.
Notice of Allowance, U.S. Appl. No. 17/317,856, Sep. 23, 2021, 8 pages.
Notice of Allowance, U.S. Appl. No. 17/361,252, Nov. 18, 2021, 14 pages.
Notice of Allowance, U.S. Appl. No. 17/379,985, Dec. 15, 2021, 7 pages.
Notice of Allowance, U.S. Appl. No. 12/630,627, Sep. 25, 2013, 11 pages.
Notice of Allowance, U.S. Appl. No. 12/802,938, Apr. 4, 2013, 16 pages.
Notice of Allowance, U.S. Appl. No. 12/802,938, May 24, 2013, 10 pages.
Notice of Allowance, U.S. Appl. No. 12/802,974, Feb. 28, 2017, 15 pages.
Notice of Allowance, U.S. Appl. No. 12/802,974, Jun. 30, 2017, 89 pages.
Notice of Allowance, U.S. Appl. No. 12/802,974, Oct. 4, 2017, 17 pages.
Notice of Allowance, U.S. Appl. No. 12/802,974, Sep. 29, 2016, 5 pages.
Notice of Allowance, U.S. Appl. No. 12/802,974, Sep. 13, 2016, 43 pages.
Notice of Allowance, U.S. Appl. No. 12/802,988, Sep. 25, 2018, 96 pages.
Notice of Allowance, U.S. Appl. No. 12/802,989, Jun. 27, 2017, 121 pages.
Notice of Allowance, U.S. Appl. No. 12/917,257, May 31, 2013, 12 Pages.
Notice of Allowance, U.S. Appl. No. 13/232,996, Oct. 12, 2016, 5 pages.
Notice of Allowance, U.S. Appl. No. 13/232,996, Oct. 26, 2016, 4 pages.

(56) References Cited

OTHER PUBLICATIONS

Notice of Allowance, U.S. Appl. No. 13/461,682, Oct. 2, 2014, 10 pages.
Notice of Allowance, U.S. Appl. No. 13/464,648, Aug. 14, 2015, 21 pages.
Notice of Allowance, U.S. Appl. No. 13/464,648, Aug. 25, 2015, 4 pages.
Notice of Allowance, U.S. Appl. No. 13/464,648, Feb. 23, 2016, 15 pages.
Notice of Allowance, U.S. Appl. No. 13/464,648, Nov. 30, 2015, 12 pages.
Notice of Allowance, U.S. Appl. No. 13/464,648, Sep. 19, 2014, 5 pages.
Notice of Allowance, U.S. Appl. No. 13/464,648, Apr. 24, 2015, 23 pages.
Notice of Allowance, U.S. Appl. No. 13/464,648, Jan. 9, 2015, 11 pages.
Notice of Allowance, U.S. Appl. No. 13/475,598, Feb. 14, 2017, 41 pages.
Notice of Allowance, U.S. Appl. No. 13/633,702, Aug. 15, 2014, 11 pages.
Notice of Allowance, U.S. Appl. No. 13/633,702, Jan. 6, 2015, 27 pages.
Notice of Allowance, U.S. Appl. No. 13/797,971, Jan. 29, 2018, 15 pages.
Notice of Allowance, U.S. Appl. No. 13/797,971, May 4, 2017, 8 pages.
Notice of Allowance, U.S. Appl. No. 13/797,971, Oct. 18, 2017, 144 pages.
Notice of Allowance, U.S. Appl. No. 14/023,302, Apr. 27, 2016, 3 pages.
Notice of Allowance, U.S. Appl. No. 14/023,302, Feb. 5, 2016, 27 pages.
Notice of Allowance, U.S. Appl. No. 14/023,302, Oct. 9, 2015, 5 pages.
Piazza et al., "Design and Evaluation of a Reconfigurable Antenna Array for MIMO Systems", IEEE Transactions on Antennas and Propagation, 2008, vol. 56, No. 3, pp. 869-881.
Ping-Heng., et al., "Compressive Sensing Based Channel Feedback Protocols for Spatially-Correlated Massive Antenna Arrays", in Proc. IEEE Wireless Communications and Networking Conference (WCNC 2012), Apr. 2012, pp. 492-497.
Pitarokoilis et al., "On the Optimality of Single-Carrier Transmission in Large-Scale Antenna Systems," IEEE Wireless Commun. Lett., Aug. 2012, vol. 1, No. 4, pp. 276-279.
Pitarokoilis, "Effect of Oscillator Phase Noise on Uplink Performance of Large MU-MIMO Systems," in Proc. of the 50th Annual Allerton Conference on Communication, Control, and Computing, Oct. 2012, 9 pages.
Pohl et al., "Antenna spacing in MIMO indoor channels", Proc. IEEE Veh. Technol. Conf., vol. 2,, Jun. 2002, pp. 749-753.
Pollock et al., "Antenna Saturation Effects on MIMO Capacity," IEEE International Conference on Communications, 2003, vol. 4, pp. 2301-2305.
Ponnampalam et al., "On DL Preceding for 11ac", IEEE 802.11-10/01119r0, Medialek, Sep. 2010, 8 pages.
Preliminary Report on Patentability and Written Opinion, App. No. PCT/US2014/025105, Sep. 24, 2015, 10 pages.
Proakis J., "Digital Communications Fourth edition," 2001, pp. 9, Department of Electrical and Computer Engineering, Northeastern University, ISBN 0-07-232111-3, Cover page, Title page, Table of Contents.
Qian, "Partially Adaptive Beamforming for Correlated Interference Rejection", IEEE Trans. on Sign. Proc., 1995, vol. 43, No. 2, pp. 506-515.
Qibi, "A Forward Link Performance Study of the 1 xEV-DO Rev. 0 System Using Field Measurements and Simulations," Lucent Technologies. Retrieved from the Internet: http://www.cdg.org/resources/white%5Fpapers/files/white_papers/files/Luce-nt%201xEV-DO%20Rev%200%20Mar%2004.pdf, Mar. 2004, 19 pages.
Qualcomm Incorporated, "Definition of Virtual Antenna Mapping (VAM) and Applicability of S-CPICH Power Accuracy Requirement", 3GPP TSG-WG4 Meeting 58Ad hoc #1-2011, R4-112408, Apr. 11-15, 2011, 6 pages.
Qualcomm, "The 1000x data challenge, the latest on wireless, voice, services and chipset evolution", 4G World, Oct. 31, 2012 61 pages submitted as Parts 1-3.
Rao et al., "I/Q mismatch cancellation for MIMO-OFDM systems", In Personal, Indoor and Mobile Radio Communications, PIMRC 2004. 15th IEEE International Symposium on, vol. 4, 2004, pp. 2710-2714.
Rao et al., "Multi-antenna testbeds for research and education in wireless communications", IEEE Communications Magazine, vol. 42, No. 12, Dec. 2004, pp. 72-81.
Rapajic et al., Information Capacity of Random Signature Multiple-Input Multiple Output Channel, IEEE Trans. Commun., 2000, vol. 48, No. 8, pp. 1245-1248.
Rappaport, T, Wireless Communications, Principles and Practice, Second Edition, Prentice Hall, 2002, ISBN 0-13-042232-0, Cover page, Title page, Table of Contents, 13 pages.
Ravindran N., et al., "MIMO Broadcast Channels with Block Diagonalization and Finite Rate Feedback", IEEE, ICASSP Apr. 2007, pp. 111-13-111-16.
Reconfigurable Radio Systems (RRS), Radio Base Station (RBS), Software Defined Radio (SOR), Status Implementations and Costs Aspects Including Future Possibilities, Technical Report, ETSI, No. V1.1.1, 2009, 24 pages.
Rejection Decision, JP Patent App. No. JP2014264325, Oct. 3, 2016, 7 pages.
Requirement for Restriction/Election, U.S. Appl. No. 15/792,610, Nov. 29, 2018, 7 pages.
Requirement for Restriction/Election, U.S. Appl. No. 15/792,610, Jun. 11, 2018, 6 pages.
Riegler et al., "Asymptotic Statistics of the Mutual Information for Spatially Correlated Rician Fading MIMO Channels with Interference", IEEE Trans. Inform. Theory, 2010, vol. 56, No. 4, pp. 1542-1559.
Robinson, S., "Toward an Optimal Algorithm for Matrix Multiplication," Nov. 2005, vol. 38, No. 9, 3 pages.
Ruckus wireless, "Long-range 802.11 n Wi-Fi point-to-pointmultipoint backhaul," Sep. 4, 2015, 2 pages, Retrieved from the Internet:<URL: http:www.ruckuswireless.comproductszaneflex-outdoor7731>.
Rusek et al., "Scaling up MIMO: Opportunities and Challenges with Very Large Arrays", IEEE Signal Proces. Mag., Jan. 2012, vol. 30, No. 1, pp. 1-30.
Rysavy P., "No. silver bullets for FCC, NTIA spectrum challenge", Daily report for executives, Bloomberg BNA, Aug. 2012, pp. 1-4, http://www.rysavy.com/Articles/2012 09 No Spectrum Silver Bullets.pdf.
Saleh et al.,"A Statistical Model for Indoor Multipath Propagation", Institute of Electrical and Electronics Engineers Journal on Selected Areas in Communications, 1987, vol. SAC-5 (2), pp. 128-137.
Samsung, "Discussion on open-loop CoMP schemes", 3GPP TSG RAN WG1 #58, R1-093377, 3rd Generation Partnership Project, (3GPP), Aug. 24-28, 2009, pp. 1-4.
Schafhuber D et al., "MMSE and Adaptive Prediction of Time-Varying Channels for OFDM Systems", IEEE Trans. Wireless Commun., 2005, vol. 4, No. 2, pp. 593-602.
Schmidl et al., "Robust frequency and timing synchronization for OFDM", IEEE Trans. Commun., vol. 45, No. 12, Dec. 1997, pp. 1613-1621.
Schubert M., et al., "Joint 'Dirty Paper' Pre-Coding and Downlink Beamforming," Spread Spectrum Techniques and Applications, 2002 IEEE Seventh International Symposium, Dec. 2002, vol. 2, pp. 536-540.
Schuchert et al., "A novel I/O imbalance compensation scheme for the reception of OFDM signals," IEEE Transaction on Consumer Electronics, 2001, pp. 313-318.
Search Report and Written Opinion, BR App. No. 112015012165-9, Jul. 16, 2021, 8 pages (4 pages of English Translation and 4 pages of Original Document).

(56) References Cited

OTHER PUBLICATIONS

Second Examination Report, AU App. No. 2017210619, May 31, 2019, 4 pages.
Second Office Action and Search Report, Chinese Patent App. No. 201180061132.X, Mar. 11, 2016, 11 pages.
Second Office Action and Search report, Chinese Patent App. No. 201280044869.5, Jan. 17, 2017, 19 pages.
Second Office Action and Search Report, CN App. No. 201580007666.2, Jul. 30, 2019, 8 pages (4 pages of English Translation and 4 pages of Original Document).
Second Office Action, CN App. No. 201780066182.4, May 7, 2021, 13 pages (9 pages of English Translation and 4 pages of Original Document).
Second Office Action, MX App. No. MX/a/2014/013795, Feb. 3, 2016, 7 pages.
Second Office Action, ON App. No. 201780066182.4, May 7, 2021, 13 pages (9 pages of English Translation and 4 pages of Original Document).
Serpedin et al., "Blind channel and carrier frequency offset estimation using periodic modulation precoders", Signal Processing, IEEE Transactions on [see also Acoustics, Speech, and Signal Processing, IEEE Transactions on], vol. 48, No. 8, Aug. 2000, pp. 2389-2405.
Sharif et al., "On the capacity of MIMO broadcast channel with partial side information," IEEE Trans. Info. Th, Feb. 2005, vol. 51, No. 2, pp. 506-522.
Shen et al., "Low complexity user selection algorithms for multiuser MIMO systems with block diagonalization," IEEE Transactions on Signal Processing, 2005, pp. 1-12.
Shen Z., et al., "Sum capacity of multiuser MIMO broadcast channels with block diagonalization," IEEE Trans. Wireless Comm, 2005, 5 pages.
Shepard C., Argos: Practical Many-Antenna Base Stations, in Proc. ACM Int. Conf. Mobile Computing and Networking (MobiCom), Aug. 2012, 12 pages.
Shepard C., ArgosV2: A Flexible Many-Antenna Research Platform, Extended Abstract for demonstration in Proc. ACM Int. Conf. Mobile Computing and Networking (MobiCom), Oct. 2013, 3 pages.
Shi et al., "Coarse frame and carrier synchronization of OFDM systems: a new metric and comparison", IEEE Trans. Wireless Commun., vol. 3, No. 4, Jul. 2004, pp. 1271-1284.
Shiu et al., "Fading correlation and its effect on the capacity of multielement antenna systems," IEEE Trans. Comm, 2000, vol. 48, No. 3, pp. 502-513.
Shuangqing Wei et al., "On the Asymptoticcapacity of Mimo Systems With Fixed Length Linear Antenna Arrays," IEEE International Conference on Communications, 2003, vol. 4, pp. 2633-2637.
Decision to grant, EP App. No. 05254757.7, Aug. 10, 2023, 2 pages.
Decision to grant, EP App. No. 10184659, Aug. 10, 2023, 2 pages.
Final Office Action, U.S. Appl. No. 17/224,977, Oct. 27, 2023, 9 pages.
Intention to grant, EP App. No. 17844265.3, Aug. 8, 2023, 7 pages.
Intention to Grant, EP App. No. 17844265.3, Jan. 5, 2024, 7 pages.
Intention to grant, EP App. No. 17844265.3, Mar. 30, 2023, 7 pages.
Intention to grant, EP App. No. 19159810.1, Aug. 4, 2023, 7 pages.
Intention to grant, EP App. No. 19159810.1, Mar. 16, 2023, 7 pages.
Non-Final Office Action, U.S. Appl. No. 17/528,811, Dec. 6, 2023, 12 pages.
Notice of Allowance, U.S. Appl. No. 17/532,941, Nov. 15, 2023, 12 pages.
Notice of Allowance, U.S. Appl. No. 17/532,967, Nov. 27, 2023, 7 pages.
Notice of Allowance, U.S. Appl. No. 17/946,856, Jan. 10, 2024, 5 pages.
Notice of Allowance, U.S. Appl. No. 17/946,856, Nov. 22, 2023, 8 pages.
Notice of Allowance, U.S. Appl. No. 18/144,838, Jan. 18, 2024, 7 pages.
Notice of Allowance, U.S. Appl. No. 18/144,838, Oct. 10, 2023, 4 pages.
Office Action, EP App. No. 15780522.7, Apr. 5, 2023, 7 pages.
Office Action, EP App. No. 15780522.7, Jan. 26, 2024, 7 pages.
Notice of Allowance, U.S. Appl. No. 14/086,700, Feb. 28, 2018, 5 pages.
Notice of Allowance, U.S. Appl. No. 14/086,700, May 18, 2018, 21 pages.
Notice of Allowance, U.S. Appl. No. 14/086,700, Sep. 28, 2018, 21 pages.
Notice of Allowance, U.S. Appl. No. 14/156,254, Feb. 26, 2016, 21 pages.
Notice of Allowance, U.S. Appl. No. 14/156,254, Jul. 8, 2015, 7 pages.
Notice of Allowance, U.S. Appl. No. 14/156,254, Mar. 12, 2015, 5 pages.
Notice of Allowance, U.S. Appl. No. 14/156,254, Nov. 3, 2015, 29 pages.
Notice of Allowance, U.S. Appl. No. 15/201,276, Oct. 11, 2018, 5 pages.
Notice of Allowance, U.S. Appl. No. 15/201,276, Nov. 27, 2017, 7 pages.
Notice of Allowance, U.S. Appl. No. 15/616,817, Jun. 26, 2018, 131 pages.
Notice of Allowance, U.S. Appl. No. 15/616,817, Oct. 22, 2018, 21 pages.
Notice of Allowance, U.S. Appl. No. 15/616,817, Apr. 25, 2018, 10 pages.
Notice of Allowance, U.S. Appl. No. 16/253,028, Feb. 25, 2020, 7 pages.
Notice of Allowance, U.S. Appl. No. 16/253,028, Mar. 12, 2020, 7 pages.
Notice of Allowance from U.S. Appl. No. 12/802,958, Sep. 19, 2018, 22 pages.
Notice of Final Rejection, KR App. No. 10-2020-7002077, Oct. 15, 2020, 8 pages (4 pages of English Translation and 4 pages of Original Document).
Notice of Grant, CN App. No. 201210464974.6, Jul. 1, 2015, 3 pages.
Notice of Reason for Rejection, KR App. No. 10-2019-7006428, Jun. 28, 2021, 20 pages (11 pages of English Translation and 9 pages of Original Document).
Notice of Reasons for Refusal, JP App. No. 2019-074024, Aug. 3, 2020, 10 pages (6 pages of English Translation and 4 pages of Original Document).
Notice of Reasons for Refusal, JP App. No. 2019-093904, May 27, 2021, 5 pages (3 pages of English Translation and 2 pages of Original Document).
Notice of Reasons for Refusal, JP App. No. 2019-109413, Sep. 10, 2020, 8 pages (5 pages of English Translation and 3 pages of Original Document).
Notice of Reasons for Rejection, JP App. No. 2016-234908, May 23, 2019, 6 pages (3 pages of English Translation and 3 pages of Original Document).
Notice of Reasons for Rejection, JP App. No. 2016-234908, Nov. 22, 2018, 10 pages.
Notice of Reasons for Rejection, JP Patent App. No. 20150510498, Sep. 26, 2016, 21 pages.
Notice of Reasons for Rejection, JP Patent App. No. 2016-501744, Mar. 5, 2018, 15 pages.
Notice of Reasons for Rejection, KR App. No. 10-2014-7009876, Mar. 25, 2019, 11 pages.
Notice to File a Response, KR App. No. 10-2018-7035654, Dec. 14, 2018, 10 pages.
Notification for Granting Patent Right, Chinese Patent App. No. 201180061132.X, Apr. 6, 2017, 6 pages.
Notification of Reason for Refusal, KR App. No. 10-2019-7014768, Jun. 27, 2019, 10 pages (5 pages of English Translation and 5 pages of Original Document).
Notification of Reason for Refusal, KR App. No. 10-2021-7002823, Apr. 14, 2021, 06 pages (03 pages of English Translation and 03 pages of Original Document).

(56) References Cited

OTHER PUBLICATIONS

Notification of Reason for Refusal, KR. App. No. 10-2016-7031260, Dec. 4, 2020, 12 pages (7 pages of English Translation and 5 pages of Original Document).
Notification of Reasons for Refusal, JP Patent App. No. 2017-112639, Aug. 13, 2018, 4 pages.
Notification of the 1st Substantive requirement, MX App. No. MX/A/2017/002906, Sep. 13, 2019, 6 pages (3 pages of English Translation and 3 pages of Original Document).
Notification of the 2nd Substantive requirement, MX App. No. MX/A/2017/002906, Jul. 15, 2020, 10 pages (5 pages of English Translation and 5 pages of Original Document).
Notification on Grant of Patent Right for Invention, CN App. No. 201210466082.X, Jan. 26, 2017, 3 pages.
Oberli et al., "Maximum likelihood tracking algorithms for MIMOOFDM, in Communications," IEEE International Conference on Networking, Jun. 20-24, 2004, vol. 4, pp. 2468-2472.
Oday, "Measured Path Loss and Multipath Propagation Characteristics in UHF and Microwave Frequency Bands for Urban Mobile Communications," IEEE, 2001, pp. 337-341.
Office Action and Examination Search Report, CA App. No. 2885817, Jul. 16, 2019, 4 pages.
Office Action and Examination Search Report, CA App. No. 2904981, May 3, 2019, 6 pages.
Office Action and Search Report, Chinese Patent App. No. CN201380035543, Jan. 3, 2017, 22 pages.
Office Action and Search Report, RU App. No. 2016144927/08(072072), Oct. 30, 2018, 12 pages.
Office Action and Search Report, RU Patent App. No. 2014148791/28(078479), Apr. 13, 2017, 14 pages.
Office Action and Search Report, RU Patent App. No. 2015143188/07, Dec. 15, 2017, 13 pages.
Office Action and Search Report, TW App. No. 103107541, Dec. 6, 2017, 15 pages.
Office Action and Search Report, TW App. No. 107123446, Aug. 8, 2019, 27 pages (10 pages of English Translation and 17 pages of Original Document).
Office Action and Search Report, TW Patent App. No. 105143637, Jan. 19, 2018, 12 pages.
Office Action for EP App. No. 08798313.6, May 2, 2017, 7 pages.
Office Action for EP App. No. 10156950.7, May 9, 2017, 9 pages.
Office Action, Au App. No. 2004203336, Jun. 5, 2009, 2 pages.
Office Action, AU App. No. 2019202296, May 12, 2020, 5 pages.
Coulson et al., "Maximum likelihood synchronization for OFDM using a pilot symbol: analysis," IEEE Journal on Selected Areas in Communications, 2001, vol. 19, No. 12, pp. 2495-2503.
Dahlman E., et al., "4G: LTE/LTE-Advanced for Mobile Broadband", Elsevier, 2011, Cover page, Title page, Copyright page, Table of Contents, 21 pages.
Dai et al., "Camier frequency offset estimation for OFDM/SDMA systems using consecutive pilots," IEEE Proceedings Communications, 2005, vol. 152, pp. 624-632.
Dai et al., "Reduced-complexity performance-lossless (quasi-)maximum-likelihood detectors for S-QAM modulated MIMO systems," Electronics Letters, 2013, vol. 49, No. 11, pp. 724-725.
Dai et al., "Reducing the Complexity of Quasi-ML Detectors for MIMO Systems Through Simplified Branch Metric and Accumulated Branch Metric Based Detection," Communications Letters, 2013, vol. 17, No. 5, pp. 916-919.
Daniel, J., "Introduction to public safety: RF Signal Distribution Using Fiber Optics", Available Online at <http://www.rfsolutions.com/fiber.pdf>, 2009, 13 pages.
Datta et al., "A Hybrid RTS-BP Algorithm for Improved Detection of Large-MIMO M-QAM Signals," in Proc. IEEE National Conference on Communication, 2011, 6 pages.
Datta et al., "A Novel MCMC Based Receiver for Large-Scale Uplink Multiuser MIMO Systems," Jan. 2012, 37 pages.
Datta et al., "Random-Restart Reactive Tabu Search Algorithm for Detection in Large-MIMO Systems," IEEE Communications Letters, 2010, vol. 14, No. 12, pp. 1107-1109.

Debbah et al., "MIMO Channel Modelling and the Principle of Maximum Entropy," IEEE Transactions on Information Theory, 2005, vol. 51, No. 5, pp. 1667-1690.
Decision of Grant a Patent, JP App. No. 2016120928, Apr. 10, 2017, 6 pages.
Decision of Grant, JP Patent App. No. 2015-510498, Jun. 14, 2017, 6 pages.
Decision of Grant, RU App. No. 2014151216, Jan. 31, 2017, 18 pages.
Decision of Grant, RU App. No. 2016144927, Nov. 29, 2019, 8 pages of Original Document Only.
Decision of Refusal, JP App. No. 2016-562961, Oct. 28, 2020, 5 pages (4 pages of English Translation and 1 page of Original Document).
Decision of Refusal, KR App. No. 2010-7006265, Apr. 23, 2015, 2 pages.
Decision of Refusal. JP App. No. 2014530763, Dec. 19, 2016, 6 pages (3 pages of English Translation and 3 pages of Original Document).
Decision to grant a European patent, EP App. No. 10156950.7, May 8, 2020, 2 pages.
Decision to grant a European patent, EP App. No. 11838640.8, Feb. 7, 2019, 2 pages.
Decision to Grant a Patent, EP App. No. 13790935.4, Sep. 24, 2020, 2 pages.
Decision to Grant a Patent, JP App. No. 2017-082862, Dec. 10, 2018, 7 pages.
Decision to Grant a patent, JP App. No. 2017-110950, Nov. 15, 2017, 6 pages.
Decision to Grant, EP App. No. 14770916.6, May 28, 2021, 2 pages.
Degen et al., "Performance evaluation of MIMO systems using dual-polarized antennas," International Conference on Telecommunications, 2003, vol. 2, pp. 1520-1525.
Delfas N., "Mobile Data Wave: Who Dares to Invest, Wins," Morgan Stanley Research Global, Jun. 13, 2012, pp. 1-62.
Derrick et al., "Energy-Efficient Resource Allocation in OFDMA Systems with Large Numbers of Base Station Antennas", 2011, 30 pages.
Devasirvatham, et al., "Time Delay Spread Measurements at 850 MHz and 1 7 GHz Inside a Metropolitan Office Building", Electronics Letters, Feb. 2, 1989, vol. 25, No. 3, pp. 194-196.
Devasirvatham, et al., Radio Propagation Measurements at 850MHz. 1.7GHz and 4GHz Inside Two Dissimilar Office Buildings, Electronics Letter Mar. 29, 1990 vol. 26 No. 7, pp. 445-447.
Devasirvatham., "Time Delay Spread and Signal Level Measurements of 850 MHz Radio Waves in Building Environments," IEEE Transactions on Antennas and Propagation, 1986, vol. AP-34 (11), pp. 1300-1305.
Devillers et al., "Mutual coupling effects in multiuser massive MIMO base stations", IEEE Antennas and Propagation Society International Symposium (APSURSI), Jul. 2012, 2 pages.
Dietrich et al., "Spatial, polarization, and pattern diversity for wireless handheld terminals," Proc. IEEE Antennas and Prop. Symp, 2001, vol. 49, pp. 1271-1281.
Dighe et al., "Analysis of Transmit-Receive Diversity in Rayleigh Fading", IEEE Transactions on Communications, vol. 51, No. 4, Apr. 2003, pp. 694-703.
DigitalAir wireless, "GeoDesy Laser Links 1.25Gbps Full Duplex", Available Onlibne at <http:www.digitalairwireless.comoutdoor-wireless-networkspoint-to-point-wirelesslaser-fso-linksgeodesy-fso-laser-links.html>, Retrieved on Oct. 2, 2015, 4 pages.
DigitalAir wireless, "Outdoor Wireless", Available Online at <URL: http:www.digitalairwireless.comoutdoor-wireless-networks.html>, Retreived on Sep. 29, 2015, 5 pages.
Ding et al., "On the Sum Rate of Channel Subspace Feedback for Multi-Antenna Broadcast Channels," in Proc., IEEE Globecom, vol. 5, Nov. 2005, pp. 2699-2703.
Divisional Notification, CN App. No. 201710491990.7, Jul. 13, 2020, 4 pages (2 pages of English Translation and 2 pages of Original Document).
Dohler et al., "A Step towards MIMO: Virtual Antenna Arrays," European Cooperation in the Field of Scientific and Technical Research, 2003, 9 pages.

(56) References Cited

OTHER PUBLICATIONS

Dong et al., "Multiple-input multiple-output wireless communication systems using antenna pattern diversity," Proceedings of IEEE Globe Telecommunications Conference, 2002, vol. 1, pp. 997-1001.
Dumont J., et al. "On the Capacity Achieving Transmit Covariance Matrices for MIMO Rician Channels: An Asymptotic Approach," IEEE Transactions on Information Theory, 2010, vol. 56 (3), pp. 1048-1069.
Dupuy, et al., "On the Capacity Achieving Covariance Matrix for Frequency Selective MIMO Channels Using the Asymptotic Approach", IEEE Trans. Inform. Theory. 2010, pp. 2153-2157.
Dupuy, et al., On the Capacity Achieving Covariance Matrix for Frequency Selective MIMO Channels Using the Asymptotic Approach, IEEE Trans. Inform. Theory, 2011, vol. 57 (9), pp. 5737-5753.
Durgin, "Space-Time Wireless Channels", Prentice Hall Communications Engineering and Emerging Technologies Series, 2003, Upper Saddle River, NJ, Cover page, Title pages, Copyright page, Table of Contents, Preface, 16 pages, USA.
Eklund et aL, "IEEE Standard 802.16: A Technical Overview of the WirelessMAN Air Interface for Broadband Wireless Access," IEEE Communications Magazine, Available Online at <http://ieee802.org/16/docs/02/C80216-02_05.pdf>, Jun. 2002, 12 pages.
Ekstrom et al., "Technical Solutions for the 3G Long-Term Evolution", IEEE Communications Magazine, 2006, pp. 38-45.
Erceg et al., "TGn Channel Models," IEEE 802.11-03940r4, May 2004, 45 pages.
Ericsson, The evolution of Edge, Available Online at <http:www.ericsson.com/res/docs/whitepapersevolution_to_edge.pdf>, Feb. 2007, 18 pages.
ETSI Reconfigurable Radio Systems: Status and Future Directions on Software Defined Radio and Cognitive Radio Standards, IEEE Communications Magazine, IEEE Service Center, Sep. 2010, vol. 48, No. 9, pp. 78-86.
ETSI, "Mobile Technologies GSM", Available Online at <http://www.etsi.org/WebSite/Technologies/gsm.asp>, Retreived on Aug. 14, 2014, 2 pages.
European Search Report and Search Opinion, EP App. No. 05254757.7, Sep. 13, 2005, 9 pages.
European Search Report and Search Opinion, EP App. No. 17844265.3, Feb. 21, 2020, 12 pages.
Decision to Grant received for European Patent Application No. 17844265.3, mailed on Mar. 28, 2024, 2 pages.
Decision to Grant received for European Patent Application No. 21180096.6, mailed on Feb. 1, 2024, 2 pages.
Decision to Grant received for Russian Patent Application No. 2020137689, mailed on Mar. 1, 2024, 14 pages.
European Application No. 24166023.2, Extended European Search Report mailed Jul. 19, 2024.
Notice of Allowance received for Israel Patent Application No. 291825, mailed on Jan. 2, 2024, 2 pages.
Notice of Allowance received for Korean Patent Application No. 10-2023-7006280, mailed on Feb. 14, 2024, 4 pages (1 pages of English Translation and 3 pages of Original Document).
Notice of Allowance received for Taiwanese Patent Application No. 111133396, mailed on Dec. 26, 2023, 4 pages of Original Document Only.
Office Action received for Australian Patent Application No. 2023200897, mailed on Feb. 9, 2024, 3 pages.
Office Action received for Brazil Patent Application No. 112019003824-8, mailed on Jul. 17, 2024, 4 pages of English translation Only.
Office Action received for Canadian Patent Application No. 2938253, mailed on Dec. 29, 2023 4 pages.
Office Action received for Canadian Patent Application No. 3170717, mailed on Nov. 27, 2023, 3 pages.
Office Action received for Chinese Patent Application No. 202010055466.7, mailed on Mar. 7, 2024, 14 pages (9 pages of English Translation and 5 pages of Original Document).
Office Action received for Chinese Patent Application No. 202010947388.1 , mailed on Jan. 31, 2024, 12 pages (5 pages of English Translation and 7 pages of Original Document).
Office Action received for Chinese Patent Application No. 202111391840.1, mailed on Jan. 15, 2024, 7 pages (3 pages of English Translation and 4 pages of Original Document).
Office Action received for Chinese Patent Application No. 202210110415.9, mailed on Jan. 19, 2024, 8 pages (2 pages of English Translation and 6 pages of Original Document).
Office Action received for Chinese Patent Application No. 202210110431.8, mailed on Jan. 19, 2024, 10 pages (3 pages of English Translation and 7 pages of Original Document).
Office Action received for Chinese Patent Application No. 202210479592.4, mailed on Apr. 18, 2024, 12 pages of original document only.
Office Action received for Indian Patent Application No. 201947016714, mailed on Jan. 1, 2024, 1 page.
Office Action received for Indian Patent Application No. 202248057257, mailed on Sep. 29, 2023, 8 pages.
Office Action received for Indian Patent Application No. 3008/CHENP/2015, mailed on Jan. 5, 2024, 3 pages.
Office Action received for Indian Patent Application No. 5512/CHENP/2015, mailed on Oct. 16, 2023 1 page.
Office Action received for Indian Patent Application No. 8134/CHENP/2014, mailed on Jan. 8, 2024 5 pages.
Office Action received for Israel Patent Application No. 299963, mailed on Jan. 3, 2024, 5 pages.
Office Action received for Korean Patent Application No. 10-2022-7014310, mailed on Mar. 7, 2024, 14 pages (8 pages of English Translation and 6 pages of Original Document).
Office Action received for Korean Patent Application No. 10-2022-7042645, mailed on Apr. 22, 2024, 6 pages (3 pages of English Translation and 3 pages of Original Document).
Office Action received for New Zealand Patent Application No. 750737, mailed on Dec. 21, 2023, 2 pages.
Office Action received for New Zealand Patent Application No. 791129, mailed on Mar. 11, 2024, 4 pages.
Office Action received for Taiwan Patent Application No. 112127951, mailed on Feb. 20, 2024, 9 pages (4 pages of English Translation and 5 pages of Original Document).
Office Action received for Taiwanese Patent Application No. 111107760, mailed on May 15, 2024, 9 pages (4 pages of English Translation and 5 pages of Original Document).
Office Action received for Taiwanese Patent Application No. 112109799, mailed on Dec. 28, 2023, 5 pages of Original Document Only.
Office Action, EP App. No. 15780522.7, Jun. 25, 2024, 7 pages.

\* cited by examiner

TDD LTE Duplex Configurations

| UL/DL Config. | UL/DL Switch Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 10
(PRIOR ART)

SYSTEMS AND METHODS FOR MITIGATING INTERFERENCE WITHIN ACTIVELY USED SPECTRUM

CROSS REFERENCE TO RELATED APPLICATIONS

This application is a continuation of co-pending U.S. patent Ser. No. 17/361,252, filed Jun. 28, 2021, which is a continuation of U.S. patent application Ser. No. 15/682,076, filed on Aug. 21, 2017, now U.S. Issued U.S. Pat. No. 11,050,468, Issued on Jun. 29, 2021, which claims the benefit of U.S. Provisional Patent Application No. 62/380,126, filed Aug. 26, 2016.

U.S. patent application Ser. No. 15/682,076, filed on Aug. 21, 2017, now U.S. Issued U.S. Pat. No. 11,050,468, Issued on Jun. 29, 2021, is also a continuation-in-part of U.S. application Ser. No. 14/672,014, entitled "Systems and Methods for Concurrent Spectrum Usage Within Actively Used Spectrum" filed Mar. 27, 2015, now U.S. Issued U.S. Pat. No. 11,190,947, Issued On Nov. 30, 2021, which claims the benefit of and priority to U.S. Provisional Patent Application No. 61/980,479, entitled, "Systems and Methods for Concurrent Spectrum Usage Within Actively Used Spectrum" filed Apr. 16, 2014, all of which is herein incorporated by reference.

This application may be related to the following co-pending U.S. patent applications and U.S. Provisional applications:

U.S. application Ser. No. 14/611,565, entitled "Systems and Methods for Mapping Virtual Radio Instances into Physical Areas of Coherence in Distributed Antenna Wireless Systems"

U.S. application Ser. No. 14/086,700, entitled "Systems and Methods for Exploiting Inter-cell Multiplexing Gain in Wireless Cellular Systems Via Distributed Input Distributed Output Technology"

U.S. application Ser. No. 13/844,355, entitled "Systems and Methods for Radio Frequency Calibration Exploiting Channel Reciprocity in Distributed Input Distributed Output Wireless Communications"

U.S. application Ser. No. 13/797,984, entitled "Systems and Methods for Exploiting Inter-cell Multiplexing Gain in Wireless Cellular Systems Via Distributed Input Distributed Output Technology"

U.S. application Ser. No. 13/797,971, entitled "Systems and Methods for Exploiting Inter-cell Multiplexing Gain in Wireless Cellular Systems Via Distributed Input Distributed Output Technology"

U.S. application Ser. No. 13/797,950, entitled "Systems and Methods for Exploiting Inter-cell Multiplexing Gain in Wireless Cellular Systems Via Distributed Input Distributed Output Technology"

U.S. application Ser. No. 13/475,598, entitled "Systems and Methods to enhance spatial diversity in distributed-input distributed-output wireless systems"

U.S. application Ser. No. 13/233,006, entitled "System and Methods for planned evolution and obsolescence of multiuser spectrum"

U.S. application Ser. No. 13/232,996, entitled "Systems and Methods to Exploit Areas of Coherence in Wireless Systems"

U.S. application Ser. No. 12/802,989, entitled "System And Method For Managing Handoff Of A Client Between Different Distributed-Input-Distributed-Output (DIDO) Networks Based On Detected Velocity Of The Client"

U.S. application Ser. No. 12/802,988, entitled "Interference Management, Handoff, Power Control And Link Adaptation In Distributed-Input Distributed-Output (DIDO) Communication Systems"

U.S. application Ser. No. 12/802,975, entitled "System And Method For Link adaptation In DIDO Multicarrier Systems"

U.S. application Ser. No. 12/802,974, entitled "System And Method For Managing Inter-Cluster Handoff Of Clients Which Traverse Multiple DIDO Clusters"

U.S. application Ser. No. 12/802,958, entitled "System And Method For Power Control And Antenna Grouping In A Distributed-Input-Distributed-Output (DIDO) Network"

U.S. Pat. No. 9,386,465, issued Jul. 5, 2016 entitled "System and Method For Distributed Antenna Wireless Communications"

U.S. Pat. No. 9,369,888, issued Jun. 14, 2016 entitled "Systems And Methods To Coordinate Transmissions In Distributed Wireless Systems Via User Clustering"

U.S. Pat. No. 9,312,929, issued Apr. 12, 2016, entitled "System and Methods to Compensate for Doppler Effects in Distributed-Input Distributed Output Systems"

U.S. Pat. No. 8,989,155, issued Mar. 24, 2015, entitled "Systems and Methods for Wireless Backhaul in Distributed-Input Distributed-Output Wireless Systems"

U.S. Pat. No. 8,971,380, issued Mar. 3, 2015, entitled "System and Method for Adjusting DIDO Interference Cancellation Based On Signal Strength Measurements U.S. Pat. No. 8,654,815, issued Feb. 18, 2014, entitled "System and Method for Distributed Input Distributed Output Wireless Communications"

U.S. Pat. No. 8,571,086, issued Oct. 29, 2013, entitled "System and Method for DIDO Precoding Interpolation in Multicarrier Systems"

U.S. Pat. No. 8,542,763, issued Sep. 24, 2013, entitled "Systems and Methods To Coordinate Transmissions In Distributed Wireless Systems Via User Clustering"

U.S. Pat. No. 8,428,162, issued Apr. 23, 2013, entitled "System and Method for Distributed Input Distributed Output Wireless Communications"

U.S. Pat. No. 8,170,081, issued May 1, 2012, entitled "System And Method For Adjusting DIDO Interference Cancellation Based On Signal Strength Measurements"

U.S. Pat. No. 8,160,121, issued Apr. 17, 2012, entitled, "System and Method For Distributed Input-Distributed Output Wireless Communications";

U.S. Pat. No. 7,885,354, issued Feb. 8, 2011, entitled "System and Method For Enhancing Near Vertical Incidence Skywave ("NVIS") Communication Using Space-Time Coding."

U.S. Pat. No. 7,711,030, issued May 4, 2010, entitled "System and Method For Spatial-Multiplexed Tropospheric Scatter Communications";

U.S. Pat. No. 7,636,381, issued Dec. 22, 2009, entitled "System and Method for Distributed Input Distributed Output Wireless Communication";

U.S. Pat. No. 7,633,994, issued Dec. 15, 2009, entitled "System and Method for Distributed Input Distributed Output Wireless Communication";

U.S. Pat. No. 7,599,420, issued Oct. 6, 2009, entitled "System and Method for Distributed Input Distributed Output Wireless Communication";

U.S. Pat. No. 7,418,053, issued Aug. 26, 2008, entitled "System and Method for Distributed Input Distributed Output Wireless Communication".

BACKGROUND

Both Frequency Division Duplex ("FDD") and Time Division Duplex ("TDD") modes are commonly used in wireless communications systems. For example, the LTE standard supports both FDD and TDD modes, as another example 802.11 versions (e.g. Wi-Fi) support TDD mode of operation.

In the case of LTE, various numbered bands are defined within what is called "Evolved UMTS Terrestrial Radio Access" (E-UTRA) air interface. Each E-UTRA band not only specifies a particular band number, but it defines whether the band is FDD or TDD, and what bandwidths are supported within the band (e.g. see http://en.wikipedia.org/wiki/LTE_frequency_bands#Frequency_bands_and_channel_bandwidths for a list of E-UTRA bands and their specifications). For example, Band 7 is an FDD band defined as using the frequency ranges of 2,500-2,570 MHz for Uplink ("UL"), 2,620-2,690 for downlink ("DL"), it supports 5, 10, 15, 20 and MHz signal bandwidths within each of the UL and DL bands.

In many cases E-UTRA bands overlap. For example, different bands may be common spectrum that has been allocated in different markets or regions. For example, Band 41 is a TDD band using the frequency ranges of 2,496-2,690 MHz for both UL and DL, which overlaps with both UL and DL ranges in FDD Band 7 (e.g. see FIGS. 16a and 16b. Currently, Band 41 is used in the U.S. by Sprint, while Band 7 is used by Rogers Wireless in the bordering country of Canada. Thus, in the U.S., 2,500-2,570 MHz is TDD spectrum, while in Canada that same frequency range is UL for FDD spectrum.

Typically, a mobile device, upon attaching to a wireless network, will scan through the band searching for transmissions from one or more base stations, and typically during the attach procedure, the base station will transmit the characteristics of the network, such as the bandwidth used by the network, and details of the protocol in use. For example, if an LTE device scans through 2,620-2,690 MHz in the U.S., it might receive an LTE DL frame transmitted by an eNodeB that identifies the spectrum as Band 41, and if the LTE device supports Band 41 and TDD, it may attempt to connect to the eNodeB in TDD mode in that band. Similarly, if an LTE device scans through 2,620-2,690 MHz in the Canada, it might receive an LTE DL frame transmitted by an eNodeB that identifies the spectrum as Band 7, and if the LTE device supports Band 7 and FDD, it may attempt to connect to the eNodeB in FDD mode in Band 7.

Most early LTE networks deployed worldwide used FDD mode (e.g., Verizon, AT&T), but increasingly TDD mode is being used, both in markets with extensive FDD coverage, such as the U.S. (where Sprint is deploying TDD) and in markets that do not yet have extensive LTE coverage, such as China (where China Mobile is deploying TDD). In many cases, a single operator is deploying both FDD and TDD at different frequencies (e.g. Sprint operates both FDD LTE and TDD LTE in different frequencies in the U.S.), and may offer LTE devices which can operate in both modes, depending on which band is used.

Note that the E-UTRA list of LTE bands is by no means a final list, but rather evolves as new spectrum is allocated to mobile operators and devices to use that spectrum are specified. New bands are specified both in spectrum with no current band that overlaps its frequencies, and in spectrum in bands overlapping frequencies of previous band allocations. For example, Band 44, a TDD band spanning 703-803 MHz, was added as an E-UTRA band several years after older 700 MHz FDD bands were specified, such as Bands 12, 13, 14 and 17.

As can be seen in FIG. 6, the bulk of mobile data used to be voice data (e.g. Q1 2007), which is highly symmetric. But, with the introduction of the iPhone in 2007, and the rapid adoption of Android and then introduction of the iPad in 2009, non-voice mobile data rapidly outpaced the growth of voice data, to the point where, by the middle of 2013, voice data was a small fraction of mobile data traffic. Non-voice data is projected to continue to grow exponentially, increasingly dwarfing voice data.

As can been seen in FIG. 7, non-voice mobile data is largely dominated by media, such as streaming video, audio and Web browsing (much of which includes streaming video). Although some streaming media is UL data (e.g. during a videoconference), the vast majority is DL data, resulting is highly asymmetric DL vs. UL data usage. For example, in the Financial Times May 28, 2013 article, "Asymmetry and the impending (US) spectrum crisis", it states that " . . . industry estimates of the ratio of data traffic downlink to data traffic in the uplink ranges from a ratio of about eight to one (8:1)—to considerably more." The article then points out that the largely FDD deployments in the U.S. are very inefficient in handling such asymmetry since FDD mode allocates the same amount of spectrum to each DL and UL. As another example, Qualcomm estimated DL/UL traffic asymmetry as high as 9:1 for one of the U.S. operators, based on 2009 measurements in live networks (cfr., Qualcomm, "1000×: more spectrum—especially for small cells", Nov. 2013, http://www.qualcomm.com/media/documents/files/1000x-more-spectrum-especially-for-small-cells.pdf). Thus, even when FDD DL spectrum is heavily utilized (potentially to the point of being overloaded), the UL spectrum may be largely unused.

The Financial Times article points out that TDD is far better suited to such asymmetry since it can be configured to allocate far more timeslots to the DL data than the UL data. For example, in the case when 20 MHz is allocated to FDD (as 10+10 MHz), DL data throughput is limited to a maximum of full-time use of 10 MHz (even when the UL data needs far less than the 10 MHz it has been allocated), whereas when 20 MHz allocated to TDD, DL data throughput can use all 20 MHz the vast majority of the time, allocating the 20 MHz to UL data a small percentage of the time, far better matching the characteristics of data usage today. The article acknowledges that, unfortunately, most existing U.S. mobile spectrum is already committed to FDD mode, but urges the FCC to encourage the use of TDD as it allocates new spectrum.

Although TDD would certainly allow for more efficient use of new spectrum allocations given the increasingly asymmetric nature of mobile data, unfortunately existing FDD networks deployments cannot change operating mode to TDD since the vast majority of users of such LTE FDD networks have devices that only support FDD mode and their devices would cease to be able to connect if the network were switched to TDD mode. Consequently, as LTE data usage becomes increasingly asymmetric, existing LTE FDD networks will see increasing DL congestion, while UL spectrum will be increasingly underutilized (at 8:1 DL:UL ratio, the lower estimate of the May 28, 2013 Financial Times article, that would imply that if the DL channel is fully utilized, only $\frac{1}{8}^{th}$, equivalent to 1.25 MHz of 10 Mhz, would be used of the UL channel). This is extremely wasteful and inefficient, particularly given the limited physical existence of practical mobile spectrum (e.g. frequencies that can penetrate walls and propagate well non-line-of-sight, such as ~450-2600 MHz) and the exponential growth of (increasingly asymmetric) mobile data (e.g. Cisco 2/2013

VNI predicts a 61% CAGR in mobile data growth through 2018, most of which is streaming video and other highly asymmetric data).

BRIEF DESCRIPTION OF THE DRAWINGS

A better understanding of the present invention can be obtained from the following detailed description in conjunction with the drawings, in which:

FIG. 10 is a prior art chart of TDD LTE duplex configurations

DETAILED DESCRIPTION

Figure 1:
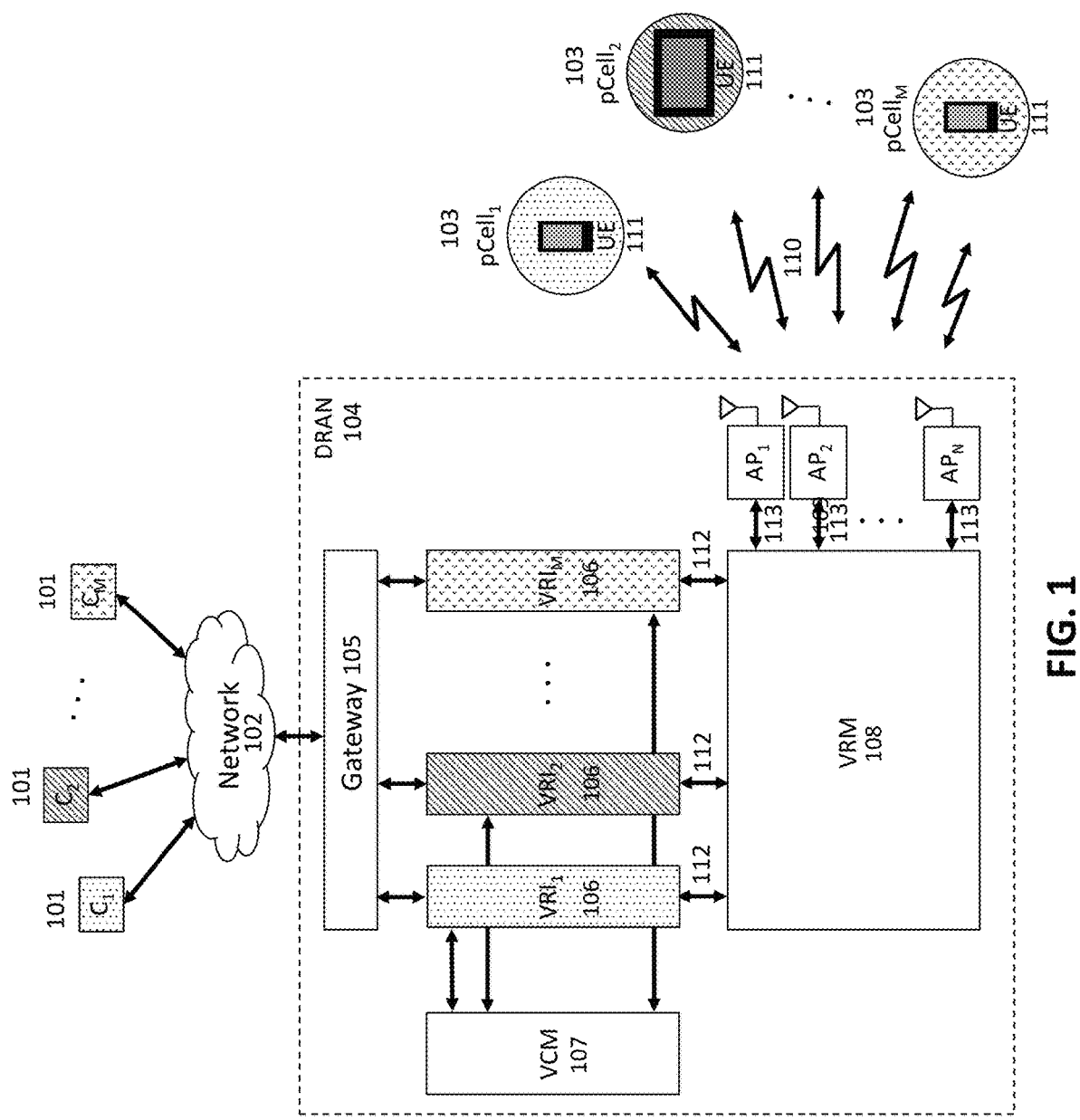
FIG. 1 illustrates the general framework of the DIDO Radio Access Network (DRAN)

One solution to overcome many of the above prior art limitations is to have user devices concurrently operate in TDD mode in the same spectrum as currently used UL or DL FDD spectrum, such that the TDD spectrum usage is coordinated so as to not conflict with current FDD spectrum usage. Particularly in the FDD UL channel, there is increasingly more unused spectrum, and TDD devices could use that spectrum without impacting the throughput of the existing FDD network. The also enables TDD usage highly propagation-efficient UHF spectrum which, in many regions of the world is almost entirely allocated to FDD, relegating TDD to far less propagation-efficient microwave bands.

In another embodiment is to have user devices concurrently operated in FDD mode in the same spectrum as currently used UL or DL FDD spectrum, such that the UL and DL channels are reversed and each network's spectrum usage is coordinated so as not to conflict with the other network's spectrum usage. Given that the UL channel of each network is increasingly underutilized relative to the DL channel, it allows each network's DL channel to utilize the unused spectrum in the other network's UL channel.

Further, in either embodiment spectral efficiency can be vastly increased by implementing one or both networks using Distributed-Input Distributed-Output ("DIDO") technology as described in the following patents, patent applications and provisional applications, all of which are assigned the assignee of the present patent and are incorporated by reference. These patents, applications and provisional applications are sometimes referred to collectively herein as the "Related Patents and Applications."

U.S. patent application Ser. No. 15/682,076, filed on Aug. 21, 2017, entitled "Systems and Methods for Concurrent Spectrum Usage Within Actively Used Spectrum".

U.S. Provisional Patent Application No. 62/380,126, filed Aug. 26, 2016, entitled "Systems and Methods for Concurrent Spectrum Usage Within Actively Used Spectrum".

U.S. application Ser. No. 14/672,014, entitled "Systems And Methods For Concurrent Spectrum Usage Within Actively Used Spectrum".

U.S. Provisional Patent Application No. 61/980,479, filed Apr. 16, 2014, entitled, "Systems and Methods for Concurrent Spectrum Usage Within Actively Used Spectrum".

U.S. application Ser. No. 14/611,565, entitled "Systems and Methods for Mapping Virtual Radio Instances into Physical Areas of Coherence in Distributed Antenna Wireless Systems"

U.S. application Ser. No. 14/086,700, entitled "Systems and Methods for Exploiting Inter-cell Multiplexing Gain in Wireless Cellular Systems Via Distributed Input Distributed Output Technology"

U.S. application Ser. No. 13/844,355, entitled "Systems and Methods for Radio Frequency Calibration Exploiting Channel Reciprocity in Distributed Input Distributed Output Wireless Communications"

U.S. application Ser. No. 13/797,984, entitled "Systems and Methods for Exploiting Inter-cell Multiplexing Gain in Wireless Cellular Systems Via Distributed Input Distributed Output Technology"

U.S. application Ser. No. 13/797,971, entitled "Systems and Methods for Exploiting Inter-cell Multiplexing Gain in Wireless Cellular Systems Via Distributed Input Distributed Output Technology"

U.S. application Ser. No. 13/797,950, entitled "Systems and Methods for Exploiting Inter-cell Multiplexing Gain in Wireless Cellular Systems Via Distributed Input Distributed Output Technology"

U.S. application Ser. No. 13/475,598, entitled "Systems and Methods to enhance spatial diversity in distributed-input distributed-output wireless systems"

U.S. application Ser. No. 13/233,006, entitled "System and Methods for planned evolution and obsolescence of multiuser spectrum"

U.S. application Ser. No. 13/232,996, entitled "Systems and Methods to Exploit Areas of Coherence in Wireless Systems"

U.S. application Ser. No. 12/802,989, entitled "System And Method For Managing Handoff Of A Client Between Different Distributed-Input-Distributed-Output (DIDO) Networks Based On Detected Velocity Of The Client"

U.S. application Ser. No. 12/802,988, entitled "Interference Management, Handoff, Power Control And Link Adaptation In Distributed-Input Distributed-Output (DIDO) Communication Systems"

U.S. application Ser. No. 12/802,975, entitled "System And Method For Link adaptation In DIDO Multicarrier Systems"

U.S. application Ser. No. 12/802,974, entitled "System And Method For Managing Inter-Cluster Handoff Of Clients Which Traverse Multiple DIDO Clusters"

U.S. application Ser. No. 12/802,958, entitled "System And Method For Power Control And Antenna Grouping In A Distributed-Input-Distributed-Output (DIDO) Network"

U.S. Pat. No. 9,386,465, issued Jul. 5, 2016 entitled "System and Method For Distributed Antenna Wireless Communications"

U.S. Pat. No. 9,369,888, issued Jun. 14, 2016 entitled "Systems And Methods To Coordinate Transmissions In Distributed Wireless Systems Via User Clustering"

U.S. Pat. No. 9,312,929, issued Apr. 12, 2016, entitled "System and Methods to Compensate for Doppler Effects in Distributed-Input Distributed Output Systems"

U.S. Pat. No. 8,989,155, issued Mar. 24, 2015, entitled "Systems and Methods for Wireless Backhaul in Distributed-Input Distributed-Output Wireless Systems"

U.S. Pat. No. 8,971,380, issued Mar. 3, 2015, entitled "System and Method for Adjusting DIDO Interference Cancellation Based On Signal Strength Measurements U.S. Pat. No. 8,654,815, issued Feb. 18, 2014, entitled "System and Method for Distributed Input Distributed Output Wireless Communications"

U.S. Pat. No. 8,571,086, issued Oct. 29, 2013, entitled "System and Method for DIDO Precoding Interpolation in Multicarrier Systems"

U.S. Pat. No. 8,542,763, issued Sep. 24, 2013, entitled "Systems and Methods To Coordinate Transmissions In Distributed Wireless Systems Via User Clustering"

U.S. Pat. No. 8,428,162, issued Apr. 23, 2013, entitled "System and Method for Distributed Input Distributed Output Wireless Communications"

U.S. Pat. No. 8,170,081, issued May 1, 2012, entitled "System And Method For Adjusting DIDO Interference Cancellation Based On Signal Strength Measurements"

U.S. Pat. No. 8,160,121, issued Apr. 17, 2012, entitled, "System and Method For Distributed Input-Distributed Output Wireless Communications";

U.S. Pat. No. 7,885,354, issued Feb. 8, 2011, entitled "System and Method for Enhancing Near Vertical Incidence Skywave ("NVIS") Communication Using Space-Time Coding."

U.S. Pat. No. 7,711,030, issued May 4, 2010, entitled "System and Method For Spatial-Multiplexed Tropospheric Scatter Communications";

U.S. Pat. No. 7,636,381, issued Dec. 22, 2009, entitled "System and Method for Distributed Input Distributed Output Wireless Communication";

U.S. Pat. No. 7,633,994, issued Dec. 15, 2009, entitled "System and Method for Distributed Input Distributed Output Wireless Communication";

U.S. Pat. No. 7,599,420, issued Oct. 6, 2009, entitled "System and Method for Distributed Input Distributed Output Wireless Communication";

U.S. Pat. No. 7,418,053, issued Aug. 26, 2008, entitled "System and Method for Distributed Input Distributed Output Wireless Communication".

The present invention discloses systems and methods for concurrent spectrum usage within actively used spectrum. Some of the embodiments utilize Distributed-Input Distributed-Output and MU-MAS technology previously disclosed by the assignee of the assignee of the present patent. The disclosures in Section 1 and Section 2 below correspond to the disclosures in the U.S. Provisional Application Ser. No. 61/937,273 filed Feb. 7, 2014, entitled "Systems and Methods for Mapping Virtual Radio Instances into Physical Areas of Coherence in Distributed Antenna Wireless Systems" and relate to the present invention. The disclosures of Sections 3 and 4 below correspond to the disclosures in the U.S. Provisional Application Ser. No. 61/980,479 filed Apr. 16, 2014, entitled "System and Methods for Concurrent Spectrum Usage Within Actively Used Spectrum" and also relate the present invention.

1. Systems and Methods for Mapping VRIs into Areas of Coherence

One embodiment of the present invention discloses systems and methods to deliver multiple simultaneous non-interfering data streams within the same frequency band between a network and a plurality of areas of coherence in a wireless link through Virtual Radio Instances (VRIs). In one embodiment the system is a multiuser multiple antenna system (MU-MAS) as depicted in FIG. 1. The color-coded units in FIG. 1 show one-to-one mapping between the data sources 101, the VRIs 106 and the areas of coherence 103 as described hereafter.

1.1 Overview of the System Architecture

In FIG. 1, the data sources 101 are data files or streams carrying web content or files in a local or remote server, such as text, images, sounds, videos or combinations of those. One or multiple data files or streams are sent or received between the network 102 and every area of coherence 103 in the wireless link 110. In one embodiment the network is the Internet or any wireline or wireless local area network.

The area of coherence is a volume in space where the waveforms from different antennas of the MU-MAS add up coherently in a way that only the data output 112 of one VRI is received within that area of coherence, without any interference from other data output from other VRIs sent simultaneously over the same wireless link. In the present application we use the term "area of coherence" to describe volumes of coherence or private cells (e.g., "pCells™" 103) as described in our previous patent application [U.S. application Ser. No. 13/232,996, entitled "Systems and Methods to Exploit Areas of Coherence in Wireless Systems"]. In one embodiment, the areas of coherence correspond to the locations of the user equipment (UE) 111 or subscribers of the wireless network, such that every subscriber is associated to one or multiple data sources 101. The areas of coherence may vary in size and shape depending on propagation conditions as well as type of MU-MAS precoding techniques employed to generate them. In one embodiment of the invention, the MU-MAS precoder dynamically adjusts size and shape of the areas of coherence to adapt to the changing propagation conditions while delivering contents to the users with good link reliability.

Figures 2A, 2B:
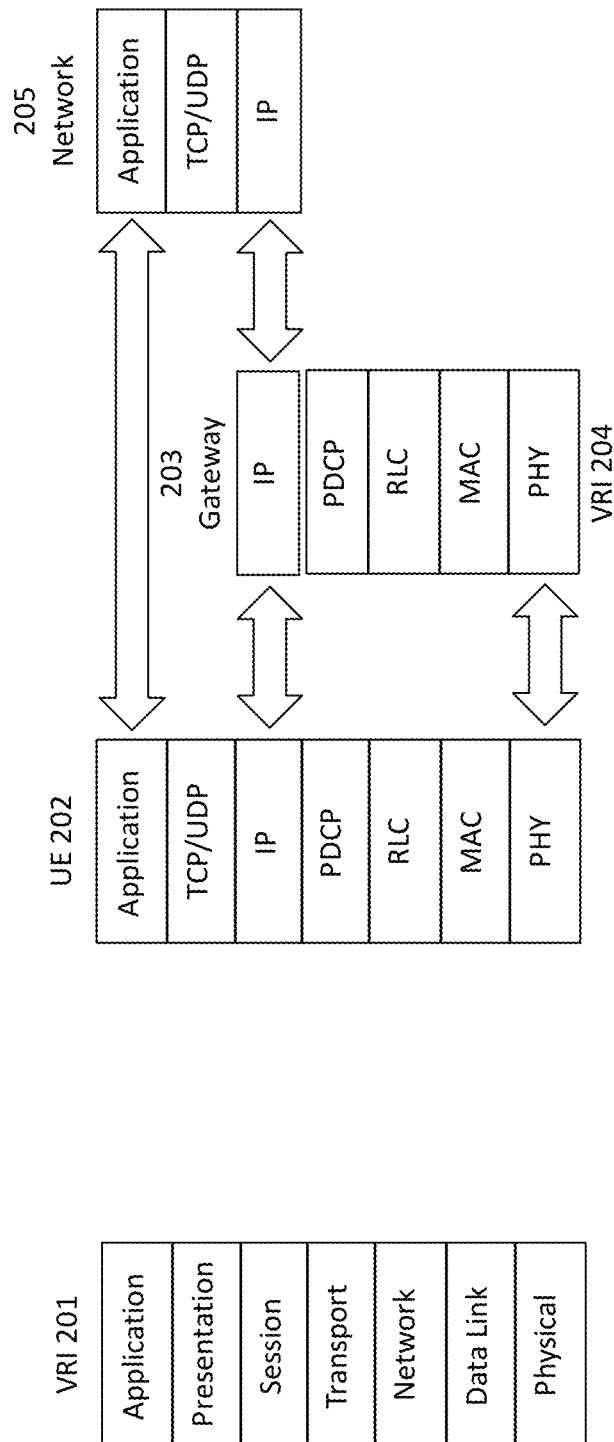
FIGS. 2A, 2B illustrate the protocol stack of the Virtual Radio Instance (VRI) consistent to the OSI model and LTE standard

The data sources 101 are first sent through the Network 102 to the DIDO Radio Access Network (DRAN) 104. Then, the DRAN translates the data files or streams into a data format that can be received by the UEs and sends the data files or streams simultaneously to the plurality of areas of coherence, such that every UE receives its own data files or streams without interference from other data files or streams sent to other UEs. The DRAN consists of a gateway 105 as the interface between the network and the VRIs 106. The VRIs translate packets being routed by the gateway into data streams 112, either as raw data, or in a packet or frame structure, that are fed to a MU-MAS baseband unit. In one embodiment, the VRI comprises the open systems interconnection (OSI) protocol stack consisting of sever layers: application, presentation, session, transport, network, data link and physical, as depicted in FIG. 2a. In another embodiment, the VRI only comprises a subset of the OSI layers.

In another embodiment, the VRIs are defined from different wireless standards. By way of example, but not limitation, a first VRI consists of the protocol stack from the GSM standard, a second VRI from the 3G standard, a third VRI from HSPA+ standard, a fourth VRI from LTE standard, as fifth VRI from LTE-A standard and a sixth VRI from the Wi-Fi standard. In an exemplary embodiment, the VRIs comprise the control-plane or user-plane protocol stack defined by the LTE standards. The user-plane protocol stack is shown in FIG. 2b. Every UE 202 communicates with its own VRI 204 through the PHY, MAC, RLC and PDCP layers, with the gateway 203 through the IP layer and with the network 205 through the application layer. For the control-plane protocol stack, the UE also communicates directly with the mobility management entity (MME) through the NAS (as defined in the LTE standard stack) layer.

The Virtual Connection Manager (VCM) 107 is responsible for assigning the PHY layer identity of the UEs (e.g., cell-specific radio network temporary identifier, RNTI), authentication and mobility of the VRI and UE. The data streams 112 at the output of the VRIs are fed to the Virtual Radio Manager (VRM) 108. The VRM comprises a scheduler unit (that schedules DL (downlink) and UL (uplink) packets for different UEs), a baseband unit (e.g., comprising of FEC encoder/decoder, modulator/demodulator, resource grid builder) and a MU-MAS baseband processor (comprised of precoding logic for implementing precoding operations). In one embodiment, the data streams 112 are I/Q samples at the output of the PHY layer in FIG. 2b that are processed by the MU-MAS baseband processor. In a different embodiment, the data streams 112 are MAC, RLC or PDCP packets sent to a scheduler unit that forwards them to a baseband unit. The baseband unit converts packets into I/Q fed to the MU-MAS baseband processor.

The MU-MAS baseband processor is the core of the VRM that converts the M I/Q samples from the M VRIs into N data streams 113 sent to N access points (APs) 109. In one embodiment, the data streams 113 are I/Q samples of the N waveforms transmitted over the wireless link 110 from the APs 109. In this embodiment the AP consists of ADC/DAC, RF chain and antenna. In a different embodiment, the data streams 113 are bits of information and MU-MAS precoding information that are combined at the APs to generate the N waveforms sent over the wireless link 110. In this embodiment every AP is equipped with CPU, DSP or SoC to carry out additional baseband processing before the ADC/DAC units.

1.2 Supporting Mobility and Handoff

Figure 3:
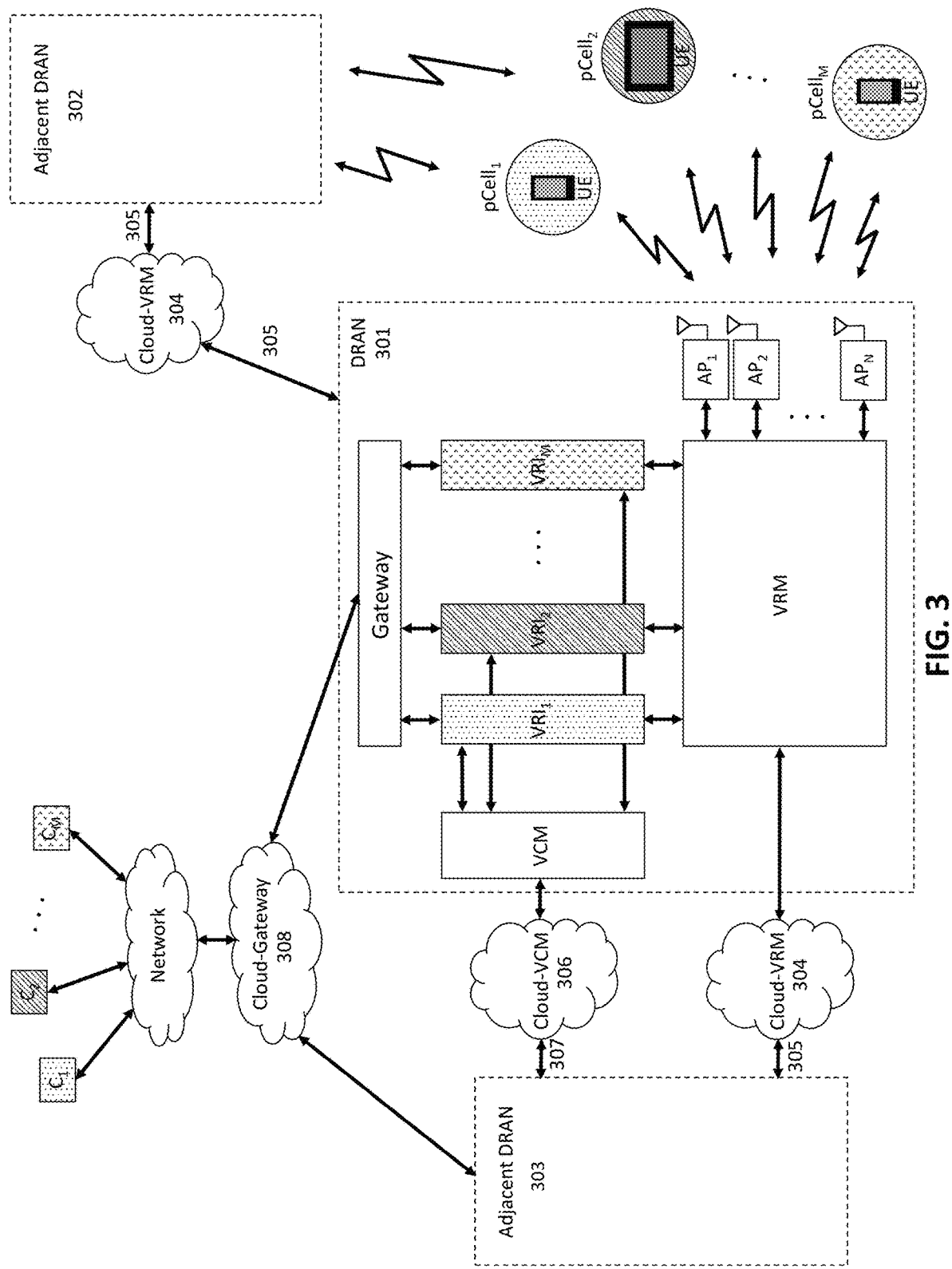
FIG. 3 illustrates adjacent DRANs to extend coverage in DIDO wireless networks

The systems and methods described thus far work as long as the UEs are within reach of the APs. When the UEs travel away from the AP coverage area the link may drop and the DRAN 301 is unable to create areas of coherence. To extend the coverage area, the systems can gradually evolve by adding new APs. There may not be enough processing power in the VRM, however, to support the new APs or there may be practical installation issues to connect the new APs to the same VRM. In these scenarios, it is necessary to add adjacent DRANs 302 and 303 to support the new APs as depicted in FIG. 3.

In one embodiment a given UE is located in the coverage area served by the first DRAN 301 and the adjacent DRAN 302. In this embodiment, the adjacent DRAN 302 only carries out MU-MAS baseband processing for that UE, jointly with the MU-MAS processing from the first DRAN 301. No VRI is handled by the adjacent DRAN 302 for the given UE, since the VRI for that UE is already running within the first DRAN 301. To enable joint precoding between the first and adjacent DRANs, baseband information is exchanged between the VRM in the first DRAN 301 and the VRM in the adjacent DRAN 302 through the cloud-VRM 304 and the links 305. The links 305 are any wireline (e.g., fiber, DSL, cable) or wireless link (e.g., line-of-sight links) that can support adequate connection quality (e.g. low enough latency and adequate data rate) to avoid degrading performance of the MU-MAS precoding.

In a different embodiment a given UE moves out of the coverage area of the first DRAN 301 into the coverage area of the adjacent DRAN 303. In this embodiment the VRI associated to that UE is "teleported" from the first DRAN 301 to the adjacent DRAN 303. What is meant by the VRI being teleported or "VRI teleportation" is the VRI state information is transferred from DRAN 301 to DRAN 303, and the VRI ceases to execute within DRAN 301 and begins to execute within DRAN 303. Ideally, the VRI teleportation occurs fast enough that, from the perspective of the UE served by the teleported VRI, it does not experience any discontinuity in its data stream from the VRI. In one embodiment, if there is a delay before the VRI is fully executing after being teleported, then before the VRI teleportation begins, the UE served by that VRI is put into a state where it will not drop its connection or otherwise enter an undesirable state until the VRI starts up at the adjacent DRAM 303, and the UE once again is served by an executing VRI. "VRI teleportation" is enabled by the cloud-VCM 306 that connects the VCM in the first DRAN 301 to the VCM in the adjacent DRAN 303. The wireline or wireless links 307 between VCM do not have the same restrictive constraints as the links 305 between VRMs since they only carry data and do not affect performance of the MU-MAS precoding. In the same embodiment of the invention, additional links 305 are employed between the first DRAN 301 and the adjacent DRAN 303 to connect their VRMs that can support adequate connection quality (e.g., low enough latency and adequate data rate) to avoid degrading performance of the MU-MAS precoding. In one embodiment of the invention, the gateways of the first and adjacent DRANs are connected to the cloud-gateway 308 that manages all network address (or IP address) translation across DRANs.

Figure 4:
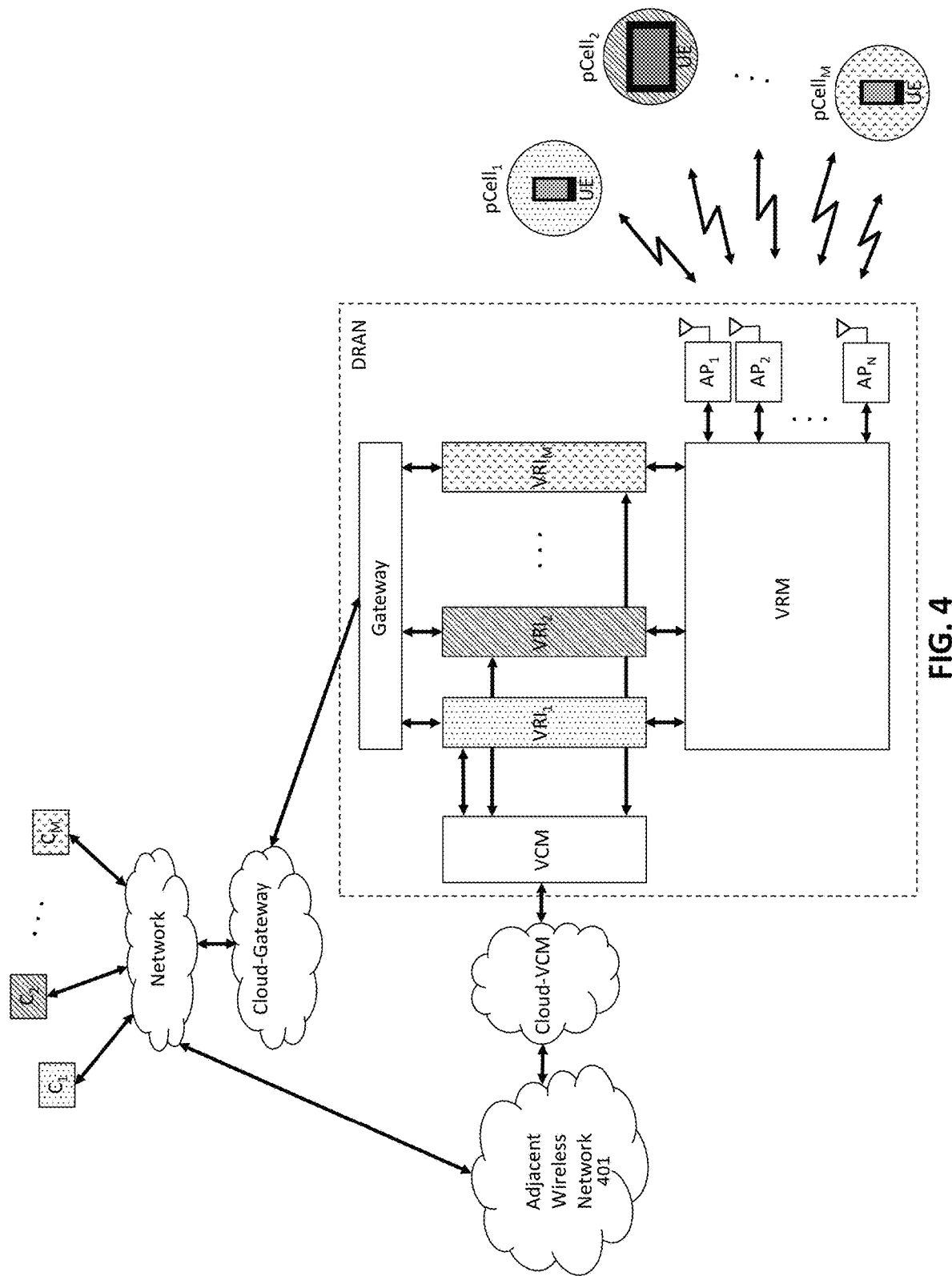
FIG. 4 illustrates handoff between DRAN and adjacent wireless networks

In one embodiment of the invention, VRI teleportation occurs between the DRAN network disclosed in the present application and any adjacent wireless network 401 as depicted in FIG. 4. By way of example, but not limitation, the wireless network 401 is any conventional cellular (e.g., GSM, 3G, HSPA+, LTE, LTE-A) or wireless local area network (WLAN, e.g., Wi-Fi). As the VRI is teleported from the DRAN to the adjacent wireless network 401 the UE is handed off between the two networks and its wireless connection may continue.

Figure 5:
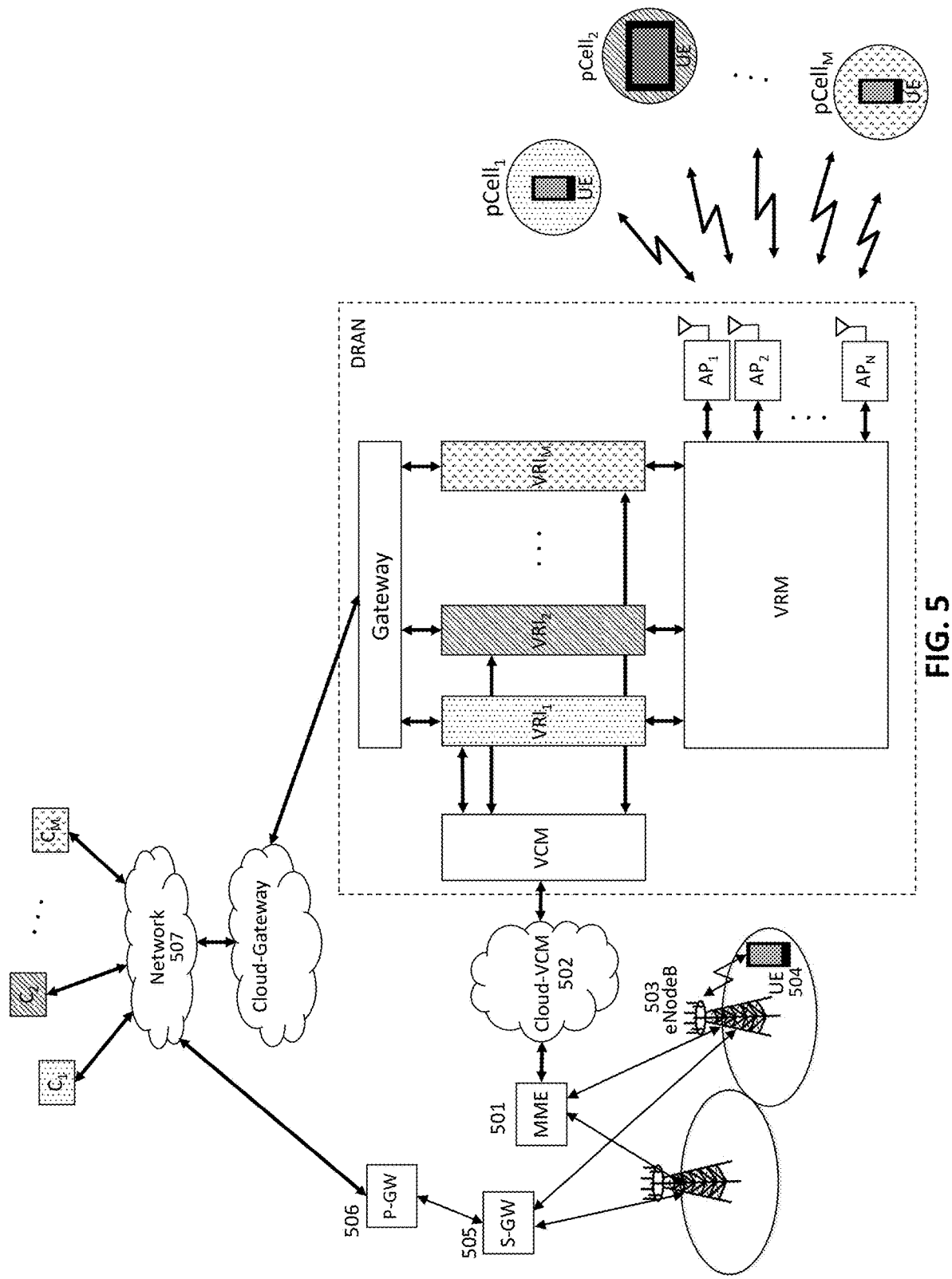
FIG. 5 illustrates handoff between DRAN and LTE cellular networks

In one embodiment, the adjacent wireless network 401 is the LTE network shown in FIG. 5. In this embodiment, the Cloud-VCM 502 is connected to the LTE mobility management entity (MME) 501. All the information about identity, authentication and mobility of every UE handing-off between the LTE and the DRAN networks is exchanged between the MME 501 and the cloud-VCM 502. In the same embodiment, the MME is connected to one or multiple eNodeBs 503 connecting to the UE 504 through the wireless cellular network. The eNodeBs are connected to the network 507 through the serving gateway (S-GW) 505 and the packet data network gateway (P-GW) 506.

2. Systems and Methods for DL and UL MU-MAS Processing

Typical downlink (DL) wireless links consist of broadcast physical channels carrying information for the entire cell and dedicated physical channels with information and data for given UE. For example, the LTE standard defines broadcast channels such as P-SS and S-SS (used for synchronization at the UE), MIB and PDCCH as well as channels for carrying data to given UE such as the PDSCH. In one embodiment of the present invention, all the LTE broadcast channels (e.g., P-SS, S-SS, MIC, PDCCH) are precoded such that every UE receives its own dedicated information. In a different embodiment, part of the broadcast channel is precoded and part is not. By way of example, but not limitation, the PDCCH contains broadcast information as well as information dedicated to one UE, such as the DCI 1A and DCI 0 used to point the UEs to the resource blocks (RBs) to be used over DL and uplink (UL) channels. In one embodiment, the broadcast part of the PDCCH is not precoded, whereas the portion containing the DCI 1A and 0 is precoded in such a way that every UE obtains its own dedicated information about the RBs that carry data.

In another embodiment of the invention, precoding is applied to all or only part of the data channels, such as the PDSCH in LTE systems. By applying precoding over the entire data channel, one embodiment of the MU-MAS disclosed in the present application allocates the entire bandwidth to every UE and the plurality of data streams of the plurality of UEs are separated via spatial processing. In typical scenarios, however, most, if not all, of the UEs do not need the entire bandwidth (e.g., ~70 Mbps per UE, peak data rate for TDD configuration #2 in 20 MHz of spectrum). Then, one embodiment of the MU-MAS in the present application subdivides the DL RBs in multiple blocks as in OFDMA systems and assigns each block to a subset of UEs. All the UEs within the same block are separated through the MU-MAS precoding. In another embodiment, the MU-MAS allocates different DL subframes to different subsets of UEs, thereby dividing up the DL as in TDMA systems. In yet another embodiment, the MU-MAS both subdivides the DL RBs in multiple blocks as in OFDMA systems among subsets of UEs and also allocates different DL subframes to different subsets of UEs as in TDMA systems, thus utilizing both OFDMA and TDMA to divide up the throughput. For example, if there are 10 APs in a TDD configuration #2 in 20 MHz, then there is an aggregate DL capacity of 70 Mbps*10=700 Mbps. If there are 10 UEs, then each UE could receive 70 Mbps concurrently. If there are 200 UEs, and the aggregate throughput is to be divided up equally, then using OFDMA, TDMA or a combination thereof, the 200 UEs would be divided into 20 groups of 10 UEs, whereby each UE would receive 700 Mbps/200=3.5 Mbps. As another example, if 10 UEs required 20 Mbps, and the other UEs were to evenly share the remaining throughput, then 20 Mbps*10=200 Mbps of the 700 Mbps would be used for 10 UEs, leaving 700 Mbps-200 Mbps=500 Mbps to divide among the remaining 200-10=190 UEs. As such, each of the remaining 90 UEs would receive 500 Mbps/190=2.63 Mbps. Thus, far more UEs than APs can be supported in the MU-MAS system, and the aggregate throughput of all the APs can be divided among the many UEs.

In the UL channel, the LTE standard defines conventional multiple access techniques such as TDMA or SC-FDMA. In one embodiment of the present invention, the MU-MAS precoding is enabled over the DL in a way to assign UL grants to different UEs to enable TDMA and SC-FDMA multiple access techniques. As such, the aggregate UL throughput can be divided among far more UEs than there are APs.

When there are more UEs than there are APs and the aggregate throughput is divided among the UEs, as described above, in one embodiment, the MU-MAS system supports a VRI for each UE, and the VRM controls the VRIs such that VRIs utilize RBs and resource grants in keeping with the chosen OFDMA, TDMA or SC-FDMA system(s) used to subdivide the aggregate throughput. In another embodiment, one or more individual VRIs may support multiple UEs and manage the scheduling of throughput among these UEs via OFDMA, TDMA or SC-FDMA techniques.

In another embodiment, the scheduling of throughput is based on load balancing of user demand, using any of many prior art techniques, depending upon the policies and performance goals of the system. In another embodiment, scheduling is based upon Quality of Service (QoS) requirements for particular UEs (e.g., that pay for a particular tier of service, guaranteeing certain throughput levels) or for particular types of data (e.g. video for a television service).

In a different embodiment, UL receive antenna selection is applied to improve link quality. In this method, the UL channel quality is estimated at the VRM based on signaling information sent by the UEs (e.g., SRS, DMRS) and the VRM decides the best receive antennas for different UEs over the UL. Then the VRM assigns one receive antenna to every UE to improve its link quality. In a different embodiment, receive antenna selection is employed to reduce cross-interference between frequency bands due to the SC-FDMA scheme. One significant advantage of this method is that the UE would transmit over the UL only to the AP closest to its location. In this scenario, the UE can significantly reduce its transmit power to reach the closest AP, thereby improving battery life. In the same embodiment, different power scaling factors are utilized for the UL data channel and for the UL signaling channel. In one exemplary embodiment, the power of the UL signaling channel (e.g., SRS) is increased compared to the data channel to allow UL CSI estimation and MU-MAS precoding (exploiting UL/DL channel reciprocity in TDD systems) from many APs, while still limiting the power required for UL data transmission. In the same embodiment, the power levels of the UL signaling and UL data channels are adjusted by the VRM through DL signaling based on transmit power control methods that equalize the relative power to/from different UEs.

In a different embodiment, maximum ratio combining (MRC) is applied at the UL receiver to improve signal quality from every UE to the plurality of APs. In a different embodiment zero-forcing (ZF) or minimum mean squared error (MMSE) or successive interference cancellation (SIC) or other non-linear techniques or the same precoding technique as for the DL precoding are applied to the UL to differentiate data streams being received from different UEs' areas of coherence. In the same embodiment, receive spatial processing is applied to the UL data channel (e.g., PUSCH) or UL control channel (e.g., PUCCH) or both.

Figure 6:
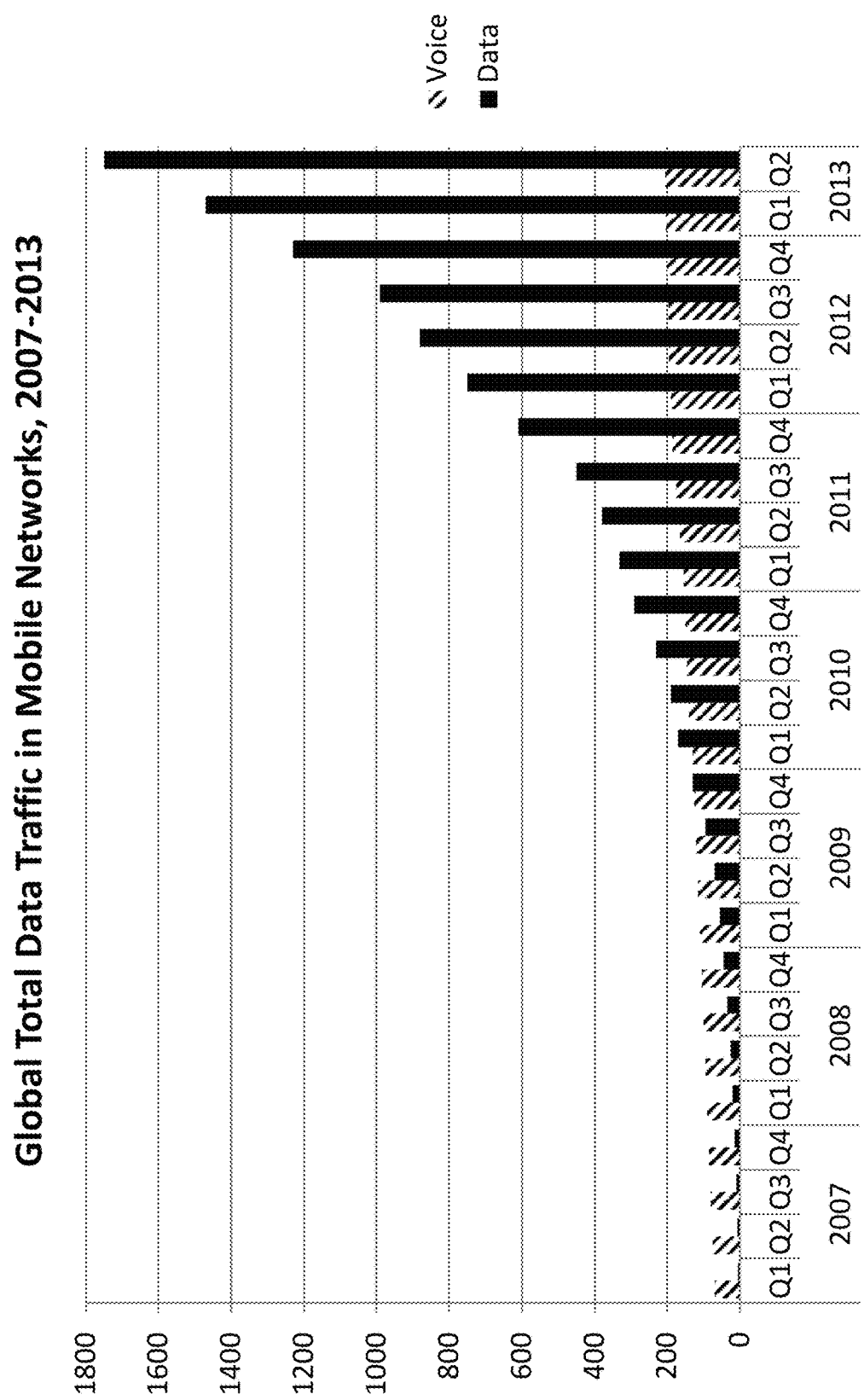
FIG. 6 is prior art showing voice and non-voice data utilization of mobile spectrum from 2007-2013.
Figure 7:
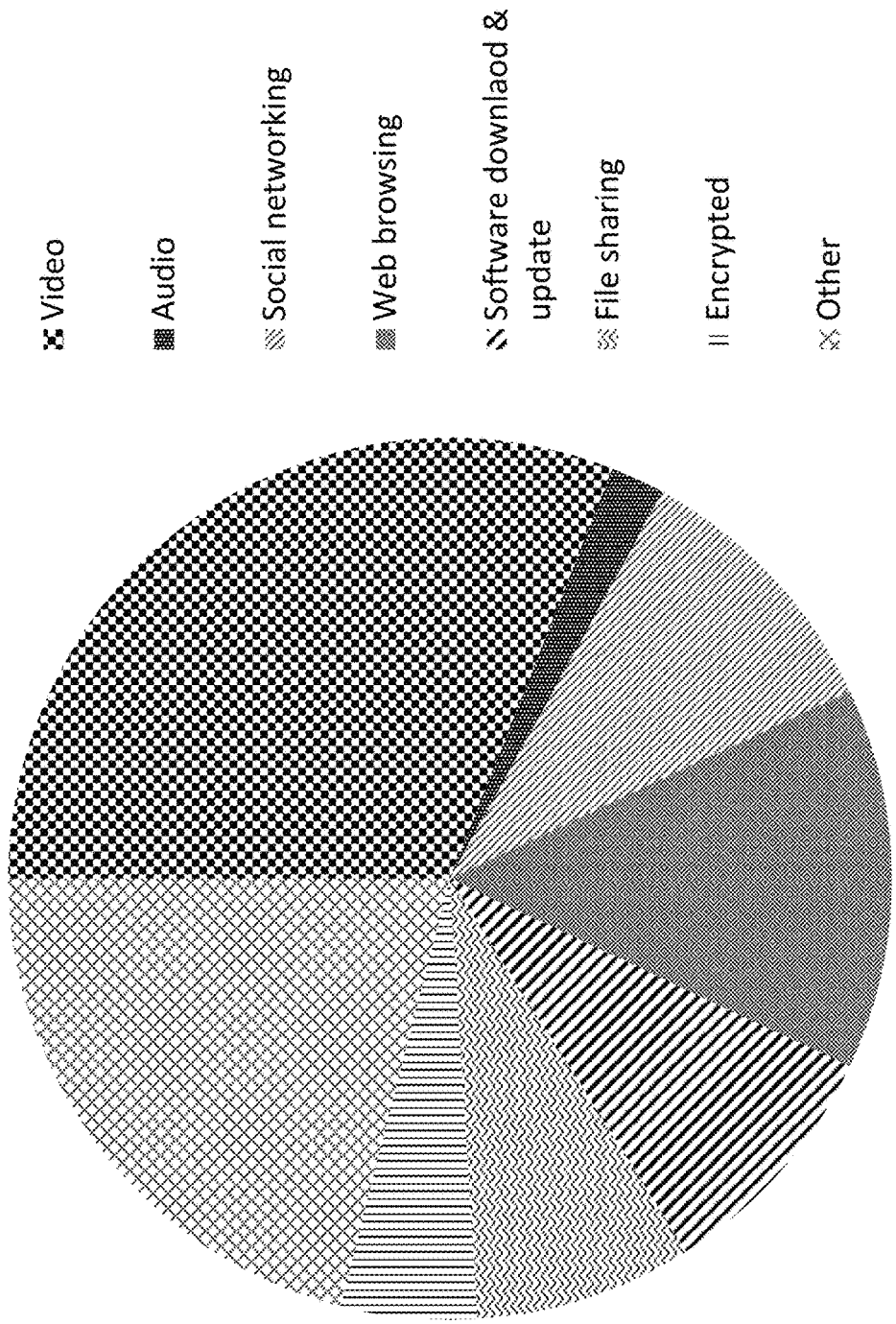
FIG. 7 is prior art showing mobile data traffic share by application type in 2012.

3. Systems and Methods for Concurrent Spectrum Usage within Actively Used Spectrum As detailed in the Background section above, and shown in FIG. 6 and FIG. 7 mobile data usage has changed dramatically from being dominated by largely symmetric voice data to highly asymmetric non-voice data, particularly media such as video streaming. Most mobile LTE deployments worldwide are FDD LTE, whose physical layer structure is illustrated in the upper half of FIG. 8, which have fixed, symmetric uplink ("UL") and downlink ("DL") channels, and as a result, as the DL channels have become increasingly congested with exponential growth of DL data relative to UL data, the UL data channels have been increasingly underutilized.

Figure 8:
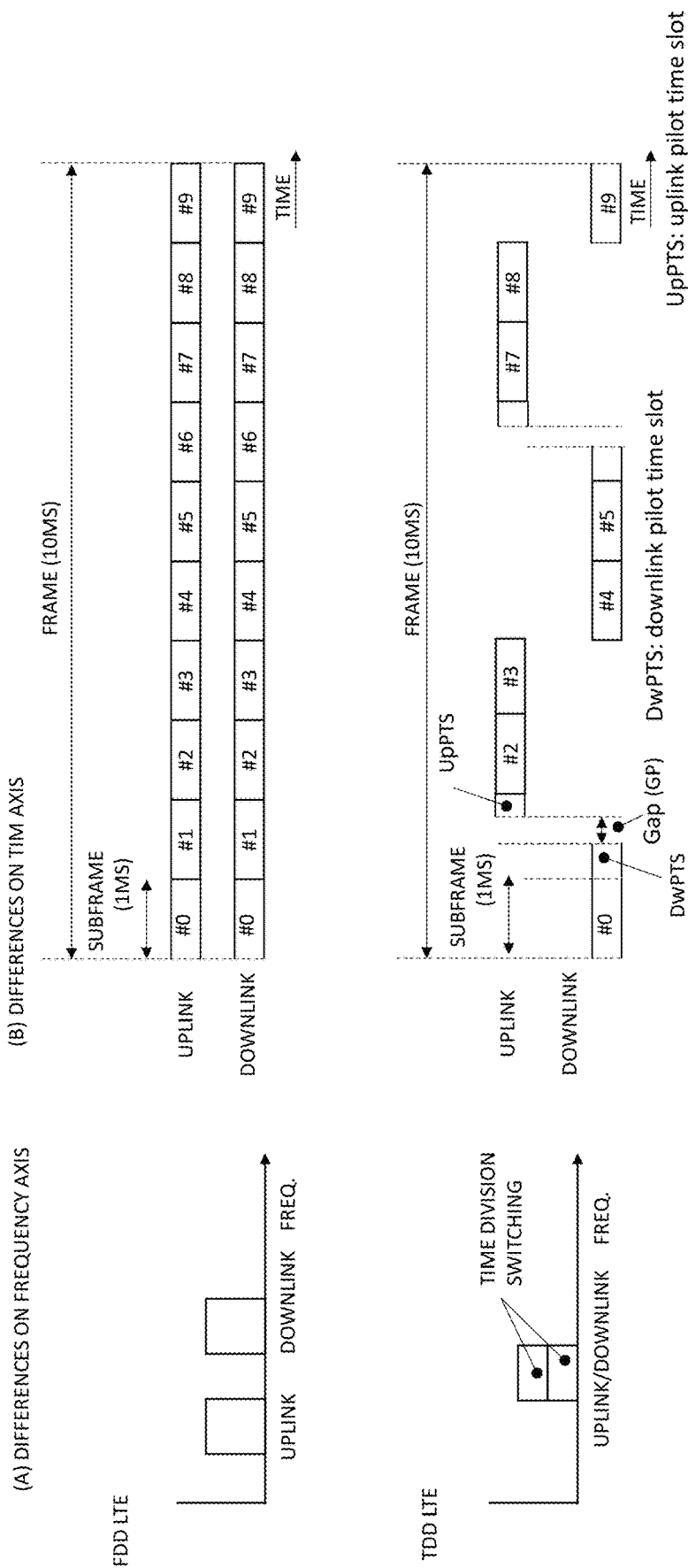
FIG. 8 is a prior art comparison of FDD LTE and TDD LTE modes of operations

The LTE standard also supports TDD LTE (also called "TD-LTE") whose physical layer structure is illustrated in the lower half of FIG. 8, and the mobile operator can choose whether the UL and DL channels are symmetric (as shown in this illustration) or asymmetric (e.g. with more subframes allocated to either the DL or UL channel), and as a result, as the DL channels become increasingly congested with exponential growth of DL data relative to UL data, the mobile operator can choose to allocate more subframes to DL than to UL. For example, in one configuration TD-LTE supports an 8:1 DL:UL ratio, allocating 8 times as many subframes to DL as to UL.

Other than the fact that TD-LTE is bi-directional in one channel, the structure and details of TD-LTE and FDD LTE are almost identical. In both modes every frame has 10 ms duration and consists of ten subframes of 1 ms each. The modulation and coding schemes are almost identical, and the upper layers of the protocol stack are effectively the same. In both cases, the time and frequency reference for the user equipment ("UE") devices (e.g. mobile phones, tablets) is provided by the eNodeB (the LTE base station protocol stack) to all devices (via the DL channel with FDD LTE and during DL subframes with TD-LTE).

Notably, in the case of both FDD and TDD LTE, the network can be configured so that a UE may only transmit UL data when given a grant to do so by the eNodeB, received through a DL transmission. As such, the eNodeB not only controls when it transmits DL data, but it also controls when UEs may transmit UL data.

Also, notably, in the case of an LTE FDD UE, its receiver is only tuned to its DL channel and has no receiver tuned to its UL channel. As such an FDD UE is "deaf" to anything that is transmitted in its UL channel by another device.

And, in the case of all LTE UEs, whether FDD or TDD, even to the extent their receivers are tuned to a particular channel, other than certain control signals intended for all UEs (or for a given UE) which maintain their time reference and connection to the network, or give them directions at what time and frequency they are to receive data, they ignore DL data not intended to them. Or to put it another way, the only relevant DL data to an LTE UE is data that is either control information or is data that is directed to the UE. During other times, whether the channel is utilized with a DL to another UE, not utilized at all or utilized for a purpose that falls outside of the LTE standard, the UE is "deaf" to any DL transmissions that are not control information or DL data directed to that UE. Thus, LTE receivers, whether FDD or TDD, only receive control data intended for all UEs or for a given UE, or receive data for a given UE. Other transmissions in the DL channel are ignored.

Figure 9:
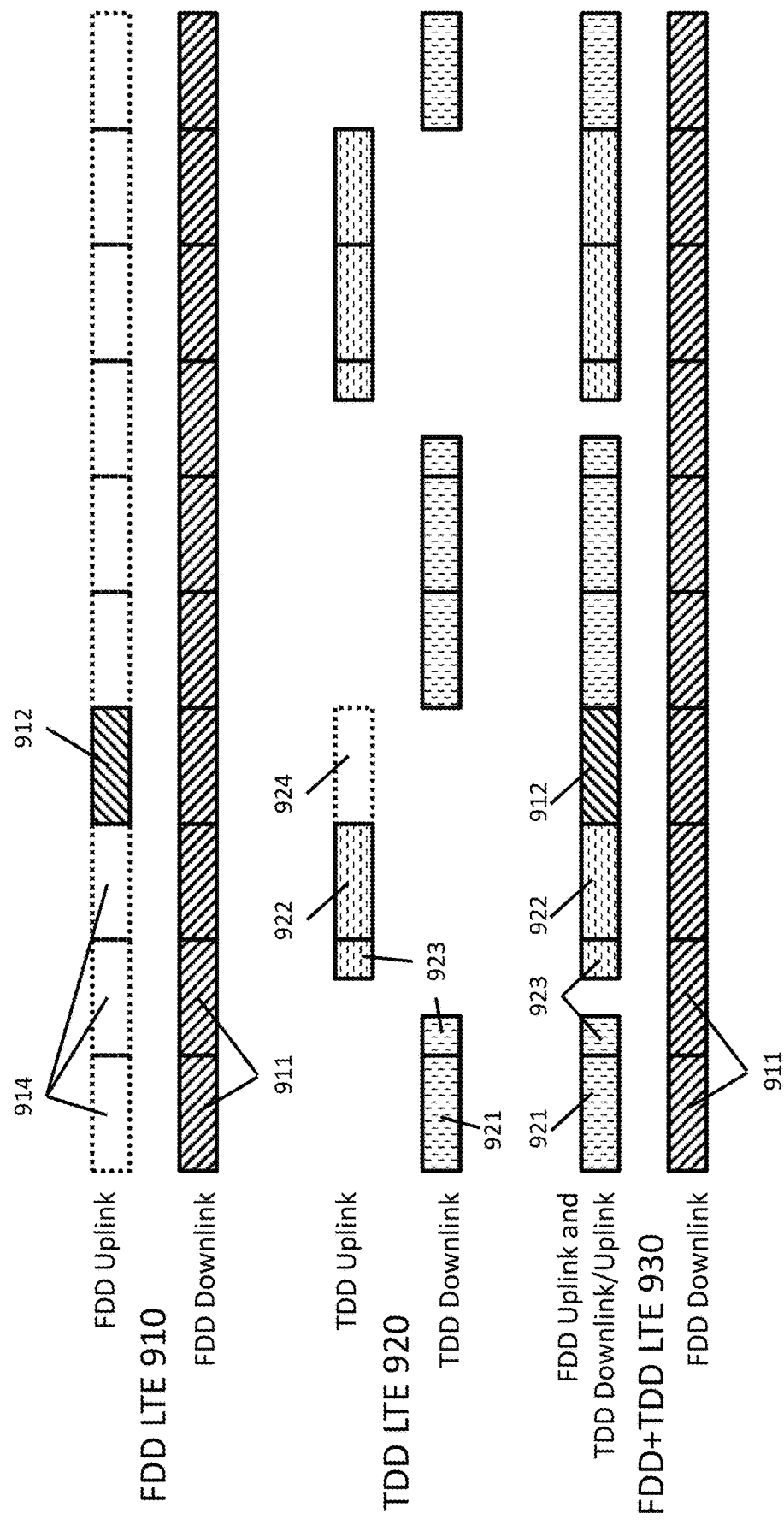
FIG. 9 illustrates a new TDD network concurrently using UL spectrum with an existing FDD network

FIG. 9 illustrates how an FDD and TDD network can concurrently utilize actively utilize FDD spectrum. The top two lines of boxes labeled "FDD LTE 910" illustrate one LTE frame interval (10 ms) made up of ten 1 ms subframe intervals, in both the Uplink ("UL") and Downlink ("DL") channels. This illustration shows the type of asymmetric data transmission that is increasingly more typical (e.g. downlink streaming video) where there is far more DL data than UL data. Boxes with solid outlines filled with slanted lines (e.g. box 912 and boxes 911) indicate subframes where data is being transmitted, boxes with dotted outlines that are blank (e.g. boxes 914) show "idle" subframes were no data is being transmitted (i.e. there are no transmissions in the channel during that subframe interval). Boxes 911 are 2 of the 10 DL subframes, all of which are full of data. Box 912 shows 1 UL subframe which has data. And boxes 914 are 3 of the 9 idle UL subframes which have no data transmissions.

The middle two lines of boxes in FIG. 9 labeled "TDD LTE 920" illustrate one LTE frame interval (10 ms) made up of 10 1 ms subframe intervals, including 2 "Special" subframe intervals, but unlike the FDD LTE 910 lines, both lines of boxes in the TDD LTE 920 line not only share the same spectrum with each other, but they share the same spectrum as the FDD Uplink. This illustration shows asymmetric data transmission where there are 4 DL subframes and 3 UL subframes transmitting data. Boxes with solid outlines filled with dashed lines (e.g. box 921, box 922 and box 923) indicate subframes where data is being transmitted, the box with a dotted outline that is blank (i.e. box 924) shows an idle subframe were no data is being transmitted (i.e. there are no transmissions in the channel during that subframe interval). Box 921 is 1 of 4 DL subframes, all of which are full of data. Box 922 shows 1 of 3 UL subframes all of which have data. Box 924 is the 1 idle UL subframe which is empty.

The third two lines of boxes in FIG. 9 labeled "FDD+TDD LTE 930" illustrate one LTE frame interval (10 ms) made up of 10 1 ms subframe intervals, including 2 "Special" subframe intervals, and shows the concurrent operation of the FDD LTE 910 system and the TDD LTE 920 system, with the TDD LTE 920 system sharing the same spectrum as the FDD LTE 910 Uplink. The two systems do not interfere with each other because, (a) during the subframe interval 912 where the FDD LTE 910 system has UL data transmission, the TDD LTE 920 system has an idle interval 924 when it is neither an UL or DL and (b) during the subframe intervals where the TDD LTE 920 system has transmissions in either the UL or DL direction (e.g. 921, 923 and 922), the FDD LTE 910 system has idle UL intervals (e.g. idle UL subframes 914) with no UL data transmissions. Thus, the two systems coexist using the same spectrum with no interference between them.

For FDD LTE 910 and TDD LTE 920 networks to concurrently use the same spectrum, their operation must be coordinated by either one eNodeB that is set up to operate two spectrum sharing networks concurrently, or by the coordination of an eNodeB operating the existing TDD LTE 920 network and a second network controller that could be a second eNodeB or another system compatible with LTE timing and frame structure, such as the Distributed-Input Distributed-Output Distributed antenna MU-MAS C-RAN system disclosed in Sections 1 and 2 above and in the Related patents and applications. In any of these cases, both the frames of the FDD LTE 910 and TDD LTE 920 systems have to be synchronized, not only in terms of timing, but in terms of subframe resource allocations. For example, in the case of FIG. 9, the system controlling the FDD LTE 910 system will need to be aware of which subframes are TDD UL subframes that are available to be used for UL (e.g. will not conflict with TDD DL control signals sent over subframes #0 and #5 for time and frequency synchronization at the UE), and use one of those subframes for its FDD UL subframe 912. If the same system is also controlling the TDD LTE 920 system, it will also have to be sure not to schedule an UL from a TDD device during that subframe 912, and if it is not controlling the TDD LTE 920 system, it will have to notify whatever system is controlling the TDD LTE 920 system to not schedule an UL from a TDD device during that subframe 912. Of course, it may be the case that the FDD LTE 910 system requires more than one UL subframe during a frame time, and if so, its controller would use any or all of the 3 TDD LTE 920 subframes 922 for its UL subframes, appropriately controlling or notifying as described above. Note that it may be the case that in some 10 ms frames all of the UL subframes are allocated to one of the networks and the other network gets no UL subframes. LTE devices do not expect to be able to transmit UL data every frame time (e.g. when an LTE network is congested, an LTE device may wait many frame times before it is granted even a portion of a UL subframe), so one embodiment of the present invention will function when all of the available TDD LTE 920 UL subframes in a given frame are utilized by one network (i.e. "starving" the other network of UL subframes). However, starving one network for too many successive frames or allowing too few UL frames in aggregate will result in poor network performance (e.g., low UL throughput, or high round-trip latency) and, at some point, if the LTE devices attached to the network seeking to transmit UL data may determine the network is not usable and disconnect. As such, establishing appropriate scheduling priorities and paradigms to balance the UL subframe resources between the FDD LTE 910 and TDD LTE 920 networks may result in the best overall network performance and user (and/or UE) experience.

One tool that is available for balancing the UL subframe resources (and to meet network operator priorities) that is not available in a standalone FDD LTE system are the TDD LTE Duplex Configurations shown in FIG. 10. FIG. 9 illustrates TDD LTE 920 system TDD LTE Duplex Configuration 1, in which during the 10 subframes in the 10 ms frame, there are 4 UL subframes, 4 DL subframes and 2 Special subframes. As can be seen in FIG. 10, there are several TDD LTE Duplex Configurations which can be used, depending on the mobile operator's needs and data traffic patterns, and for balancing the UL subframe resources with the FDD LTE 910 network needs. The TDD LTE Duplex Configuration can also be changed over time as data traffic patterns change. Any of the TDD LTE Duplex Configurations can be used with the embodiments of the invention. For example, in Configuration 1, as shown in FIG. 9, 1 UL subframe has been allocated to the FDD network and 3 UL subframes have been assigned to the TDD network. If the FDD network had a sudden need for more UL throughput, then 2 UL subframes can be allocated for FDD, leaving 2 for TDD, the very next frame time. So, switching UL subframe allocation between the FDD and TDD network can be extremely dynamic.

Note that, if desired, UL resource allocation between the FDD LTE 910 and TDD LTE 920 networks can be even more fine-grained than a subframe basis. It is possible to allocate some resource blocks within a single subframe to FDD devices and others to TDD devices. For example, the LTE standard employs SC-FDMA multiple access technique for the UL channel. As such, UL channels from FDD and TDD devices can be assigned to different resource blocks within the same subframe via SC-FDMA scheme.

Finally, it is possible to schedule an FDD LTE 910 UL during what would be a TDD LTE 920 DL or Special subframe. One consideration is that TDD DL control signals used by the TDD LTE UEs to maintain their connections and maintain timing (e.g., P-SS and S-SS broadcast signaling sent over subframes #0 and #5) must be received by the TDD LTE UEs with sufficient regularity or else the UEs may disconnect.

Figure 11:
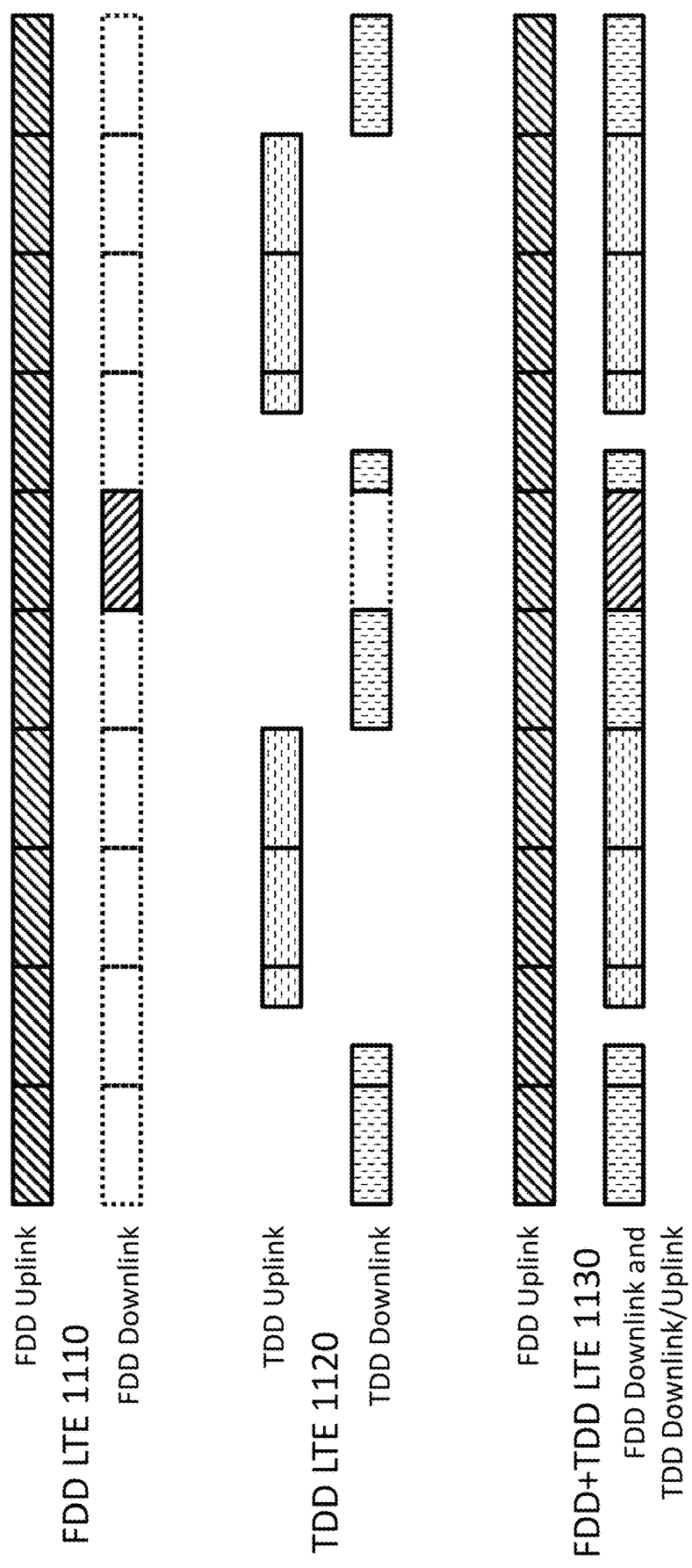
FIG. 11 illustrates a new TDD network concurrently using DL spectrum with an existing FDD network

FIG. 11 shows the same concept in FIG. 9 and described above, except the shared channel is the FDD DL channel, not the FDD UL channel. The same subframe filling and outlining designations from FIG. 9 are used in FIG. 11 and as can be seen, the FDD traffic situation is reversed with all of the subframes of FDD LTE 1110 UL channel being used for data while only 1 of the FDD LTE 1110 DL subframes is used for data, while all of the other DL subframes are "idle" and not transmitting data. Similarly, all of the TDD LTE 1120 UL subframes are used for data, while all but one of the TDD LTE 1120 DL subframes are used for data, and in this case the TDD LTE 1120 LTE channel is the same frequency as the FDD LTE 1110 DL channel. The result of the combined FDD LTE 1110 and TDD LTE 1120 networks is shown in the FDD+TDD LTE 1120 channels. As with the example in FIG. 9 the two networks can be controlled by a single controller or by coordination of multiple controllers, with scheduling between them to be sure both networks operate as desired by the network operator with adequate performance to the users and user devices.

Note that the FDD devices attached to the FDD LTE 1110 network are relying on DL transmissions for control and timing information, as well as for data and they must receive adequate control signals on a sufficiently regular basis to remain connected. In one embodiment of the invention, the FDD devices use the broadcast signaling sent by the TDD LTE 1120 network over the DL subframes (e.g., subframes #0 and #5) to obtain time and frequency synchronization. In a different embodiment, subframes #0 and #5 carrying broadcast signaling are assigned to the FDD LTE 1110 network and used to derive time and frequency synchronization at every FDD device.

Although, as described above, typically the FDD DL channel is far more congested than the FDD UL channel, there may be reasons why a mobile operator wishes to share the DL channel. For example, some UL channels are limited to only UL use by the spectrum regulating authority (e.g. there may be concerns about output power interfering with adjacent bands). Also, once a mobile operator begins to offer TDD devices compatible with its FDD spectrum, the mobile operator will likely find these devices to be using spectrum more efficiently than FDD devices and, as such, may discontinue sales of FDD devices. As old FDD devices gradually are replaced and an increasing percentage of devices are TDD, the operator may wish to allocate increasingly more of its spectrum to TDD devices, but still maintain compatibility with the remaining FDD devices in the market.

Figure 12:
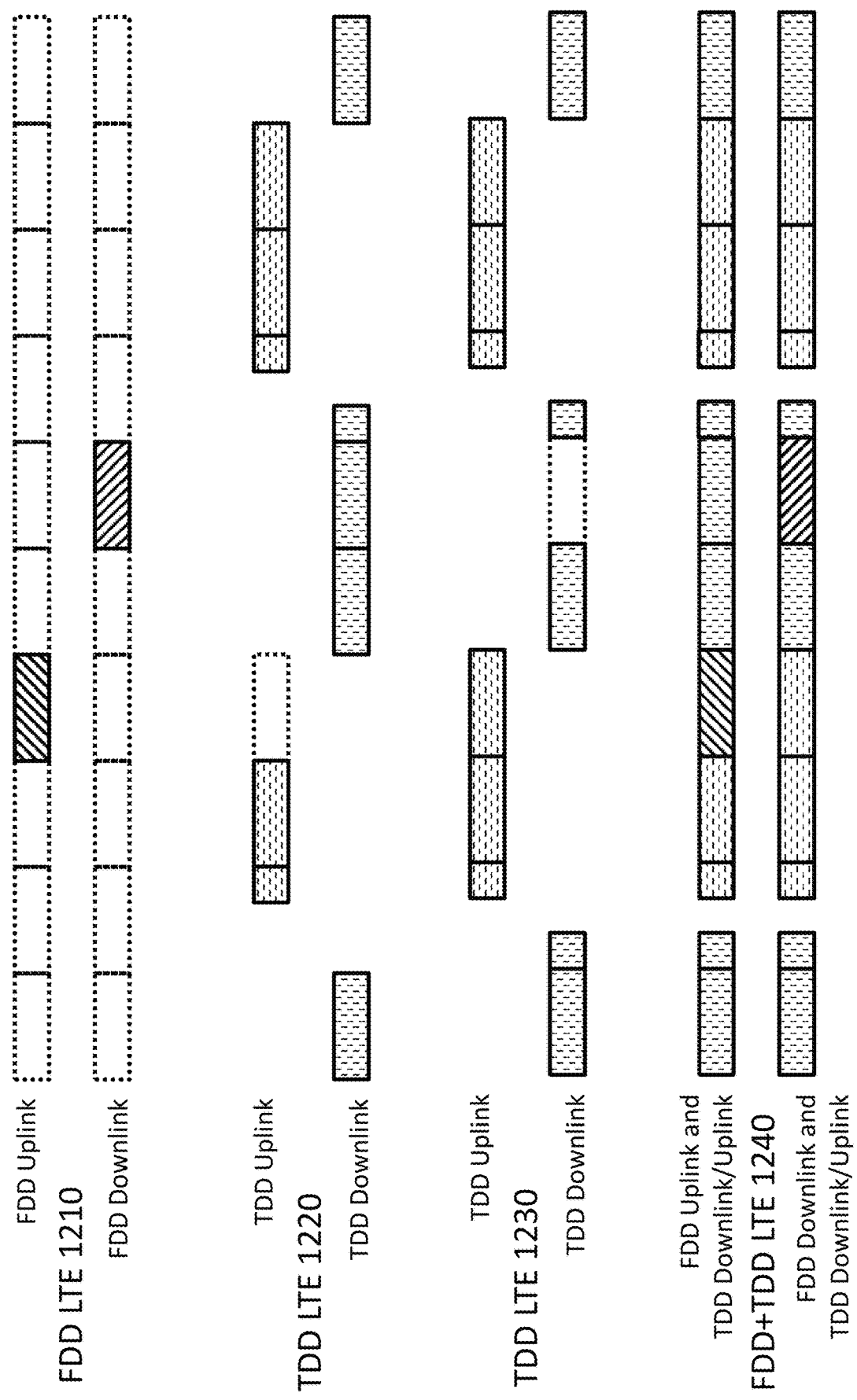
FIG. 12 illustrates two new TDD networks concurrently using UL and DL spectrum with an existing FDD network

Toward this end, as there are fewer and fewer FDD devices remaining in operation, the operator may decide to use both the UL and DL bands for TDD operation. This is illustrated in FIG. 12 where FDD LTE 1210 only has one subframe in use for UL and one for DL and the remainder are idle. There are two TDD LTE networks 1220 and 1230 each respectively using the FDD LTE 1210 UL and DL channels, resulting the three networks sharing the two channels as show in FDD+TDD LTE 1240. The same flexibilities and constraints apply as described previously, and there can be a single controller of all 3 networks or multiple controllers. The two TDD networks can be operated independently, or by using Carrier Aggregation techniques.

Figure 13:
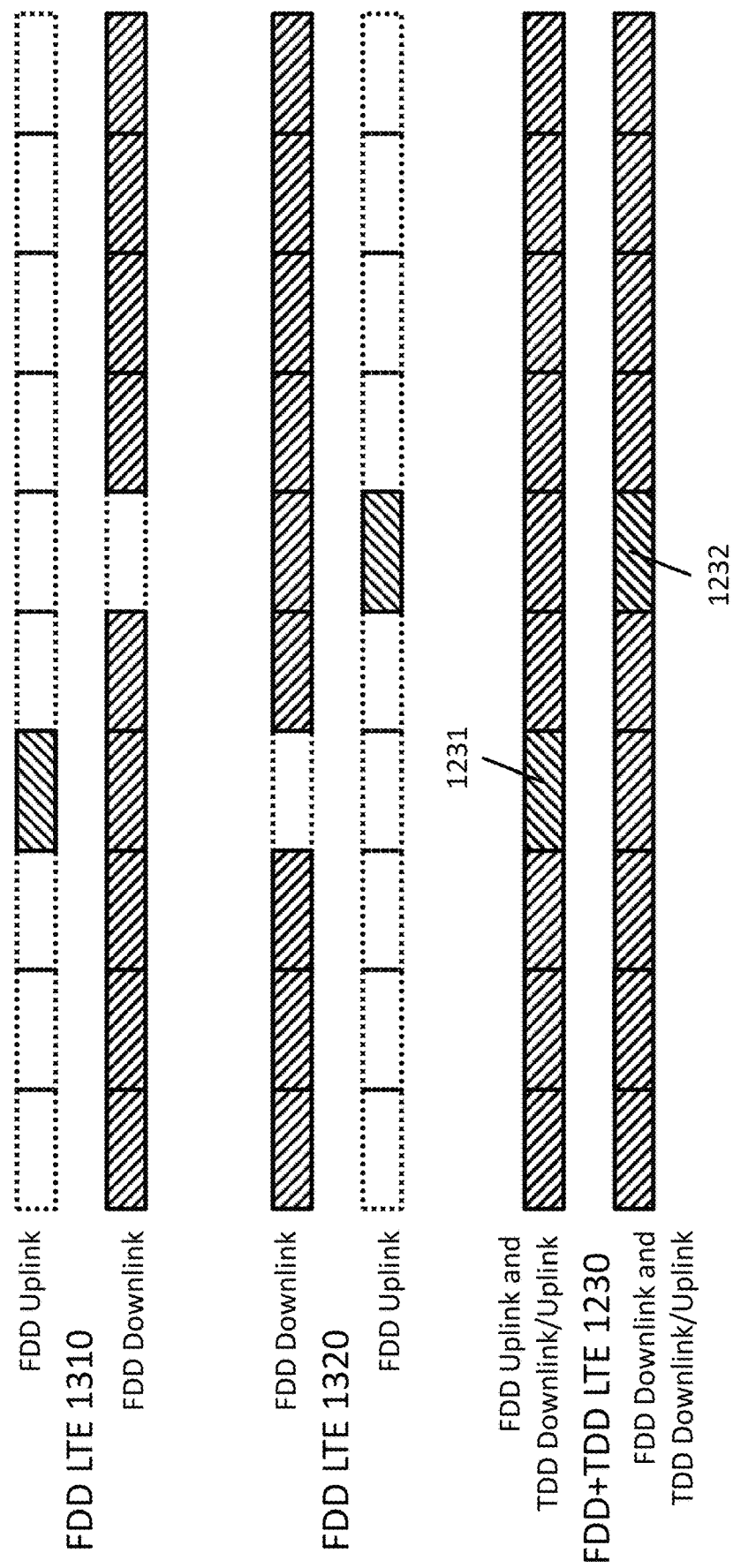
FIG. 13 illustrates a new FDD network concurrently using UL and DL spectrum with an existing FDD network

An operator may also choose to forgo TDD altogether but instead add a second FDD network in the same spectrum as an existing FDD network, but with the Uplink and Downlink channels swapped. This is illustrated in FIG. 13 where FDD LTE 1310 network is very asymmetrically utilized in favor of the DL channel, so only one subframe is used for UL, and a second FDD LTE 1320 network is also very asymmetrically utilized in favor of the DL channel, but notice that in FIG. 13 the channel allocation for FDD LTE 1320 is swapped, with the FDD Downlink channel shown above the FDD Uplink channel, contrary to the channel order for FDD LTE 1310 or as shown in prior figures. In the case of both FDD LTE 1310 and 1320, the DL channel leaves one DL subframe idle that corresponds with the one UL frame that is used by the other network. When the networks are combined as shown in FDD+TDD LTE 1230, all of the subframes in both channels are DL, except for subframes 1231 and 1232. Thus, 90% of the subframes are devoted to DL, which better matches mobile traffic patterns as they have evolved than symmetric spectrum allocation for UL and DL.

Also, this structure enables the controller (or controllers) that manage the network to dynamically change the number of UL and DL subframes allocated to each network on a subframe-by-subframe basis, affording extremely dynamic UL/DL traffic adaptation, despite the fact that FDD devices are using both networks.

As with the combined FDD/TDD networks previously described, the same constraints apply for FDD mode in that the LTE devices must receive sufficient control and timing information to remain connected and operate well, and they need sufficiently regular and adequate number of UL frames.

The two FDD networks can be operated independently or through Carrier Aggregation.

In another embodiment, the control information transmitted by the DL channel an existing active network (e.g. in FIGS. 9, 11, 12 and 13 FDD LTE 910, FDD LTE 1110, FDD LTE 1210, or FDD LTE 1310) is used by a new network (or networks) using the same channel (e.g. in FIGS. 9, 11, 12 and 13 TDD LTE 920, TDD LTE 1120, TDD LTE 1220 and TDD LTE 1230, or FDD LTE 1320) to determine which subframes and/or resource blocks and and/or other intervals will be idle. In this way, the new network(s) can determine when it is able to transmit (whether DL or UL) without interfering with the existing active network. This embodiment may make it possible to concurrently use the spectrum of the existing active network without any modification of the existing active network or relying upon any special connection to the existing active network's controller, since it is just a matter of the controller of the new network(s) receiving what is already in the DL transmission from the existing active network. In another embodiment, the only modification to the existing active network is to make sure it enables the new network(s) to transmit essential control and timing information to maintain connections with UEs. For example, the existing active network could be configured to not transmit during times when essential timing and synchronization information are being transmitted, but otherwise operate unmodified.

Although the above embodiments of concurrently supporting networks in the same spectrum used the LTE standard for examples, similar techniques can be utilized with other wireless protocols as well.

4. Utilizing Distributed Antenna MU-MAS Concurrently with Actively Used Spectrum The Distributed Antenna MU-MAS techniques (collectively called "DIDO") as disclosed in Sections 1 and 2 and in the Related Patents and Applications, dramatically increase the capacity of wireless networks, improve reliability and throughput per device, and make it possible to reduce the cost of devices as well.

In general, DIDO operates more efficiently in TDD than FDD networks because the UL and DL are in the same channel and, as a result, training transmission received in the UL channel can be used to derive channel state information for the DL channel by exploiting channel reciprocity. Also, as described above, TDD mode inherently better suits the asymmetry of mobile data, allowing for more efficient spectrum utilization.

Given that most of the world's current LTE deployments are FDD, by utilizing the techniques disclosed in Section 3, it is possible to deploy a TDD network in spectrum actively used for FDD, and DIDO can be used with that new TDD network, thereby dramatically increasing the capacity of the spectrum. This is particularly significant in that, UHF frequencies propagate far better than microwave frequencies, but most UHF mobile frequencies are already in use by FDD networks. By combining DIDO-based TDD networks with existing FDD networks in UHF spectrum, an exceptionally efficient TDD network can be deployed. For example, Band 44 is a TDD band from 703-803 MHz, overlaying a large number of 700 MHz FDD bands in the U.S. Band 44 devices could be used concurrently in the same spectrum as 700 MHz FDD devices, enabling DIDO TDD in prime spectrum.

DIDO does not add significant new constraints to the spectrum combining techniques described above. The DRAN 104 shown in FIG. 1 would either replace the existing eNodeBs in the coverage area, or coordinate with the existing eNodeBs 401, as shown in FIG. 4 per the subframe (or resource block) sharing techniques described above.

Notably, if the DIDO system is controlling the entire system and providing the eNodeB for the FDD network, then DIDO can use a training signal such as the SRS UL from the FDD devices so as to decode via spatial processing the UL from multiple existing FDD devices at the same time and within the same frequency band, thus dramatically increasing the spectral efficiency of the existing FDD UL channel and also reducing the UL power required (and/or receiving better signal quality) since the distributed DIDO APs are likely closer to the UEs than a single cellular base station, and also can utilize signal combining techniques, such as maximum ratio combining (MRC) or other techniques as described previously for DIDO.

Thus, DIDO can replace existing eNodeBs and simultaneously use existing spectrum with DIDO TDD devices, while also applying the benefits of DIDO to the UL of the existing FDD devices that are already deployed.

5. Mitigating Interference in Actively Used Spectrum

As noted previously, when a TDD network is deployed in either UL or DL frequencies in a band that has been allocated as an FDD band, there may be concerns about output power interfering with adjacent bands. This can be caused by out of band emissions (OOBE) interference and/or receiver "blocking" or receiver "desensitization". OOBE refers to power emissions outside of the allocated band. OOBE are typically are at highest power in frequencies immediately adjacent to a transmit band and typically diminish as frequencies become more distant to the transmit band. "Receiver blocking" or "receiver desensitization" refers to a receiver's front-end amplifier losing sensitivity to a desired in-band signal due to the presence of a powerful out-of-band signal, typically in a nearby band.

When regulatory authorities (e.g. the FCC) allocate spectrum in adjacent bands for use by multiple mobile operators or other users of spectrum, typically rules are put in place to limit OOBE and power levels so that mobile devices (e.g. mobile phones) and base stations can be manufactured to practical specifications given technology available at the time of the regulatory ruling. Further, consideration is given to existing users of adjacent spectrum and the rules under which those devices were manufactured. For example, a new allocation of spectrum may take into account the availability of technology that will better tolerate OOBE to better reject powerful out-of-band transmissions than technology made during prior spectrum allocations, where older technology was deployed that is more sensitive to OOBE and powerful out-of-band transmissions. Since it is often impractical to replace prior generation base stations and mobile devices, it is necessary for the new deployments to adhere to the OOBE and powerful out-of-band transmission limitations of the prior deployments.

In the case of TDD deployments in FDD bands, there are additional constraints that must be adhered to. In an FDD pair, each of the UL or DL bands was allocated with an expectation of, respectively, UL-only transmissions or DL-only transmissions. Since TDD transmits alternatively in both UL and DL, then if a TDD deployment is operating in a FDD band the was previously allocated as UL-only or DL-only band, then it is operating in a transmit direction that was not anticipated. Thus, to be sure the TDD transmissions do not interfere with previously-defined FDD usage in adjacent spectrum, the TDD transmissions in the opposite direction of the previously-defined FDD usage must meet the emission requirements for the existing usage. For example, if TDD is deployed in an FDD UL band, then the UL part of the TDD transmission should not be a problem, since UL is the direction of previously-defined usage. But, since the DL part of the TDD transmission is in the opposite direction of the previously-defined UL usage, typically the TDD DL transmission must meet the OOBE and powerful out-of-band transmission requirements defined for UL transmissions.

Figures 16A, 16B:
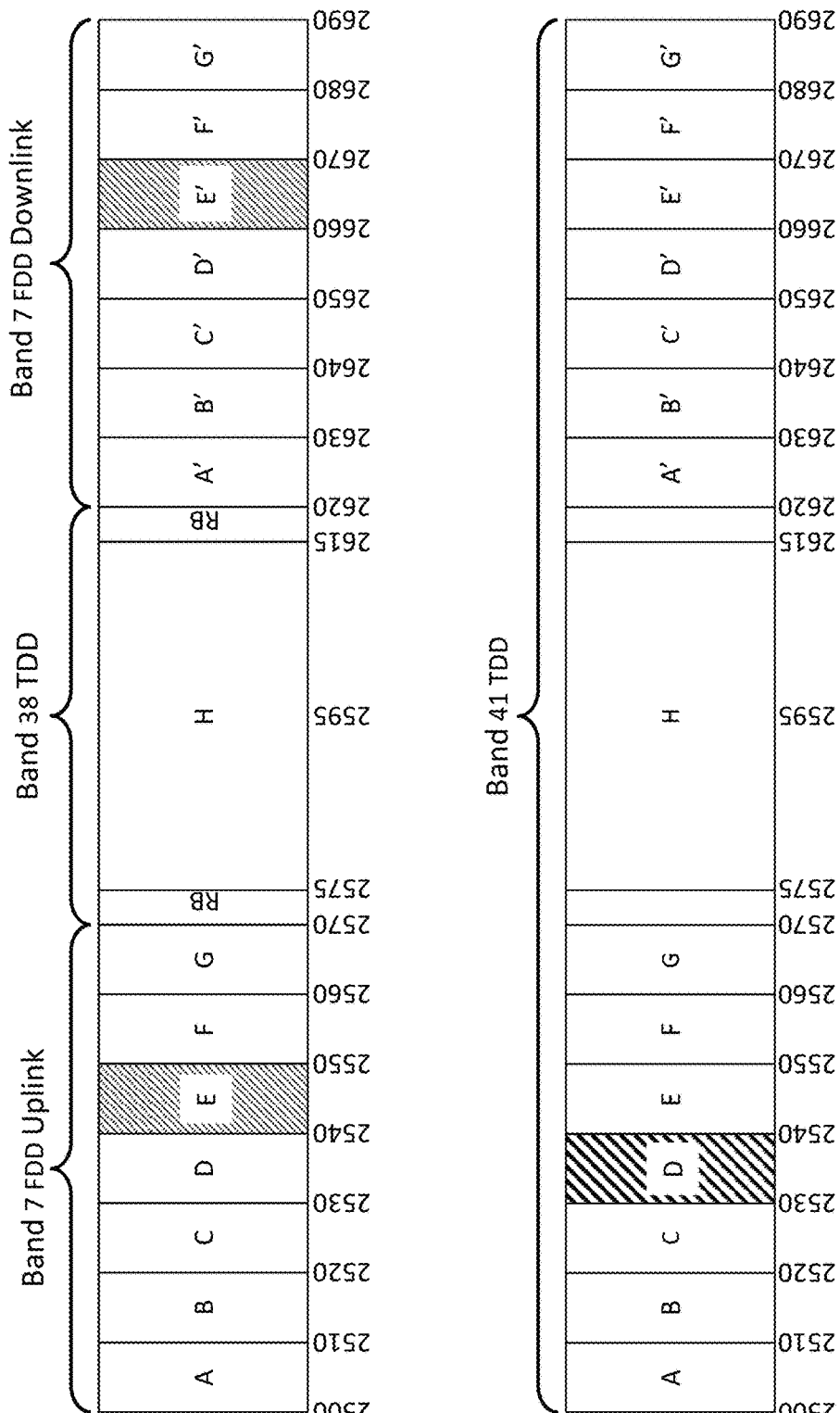
FIGS. 16A and 16B are prior art diagrams of allocations of the 2500-2690 MHz band in different regions as either FDD and TDD or only as TDD.

In the case of deploying TDD in an UL band, the UL part of the TDD transmission will typically be a transmission from a mobile device (e.g. a mobile phone). FDD phones in adjacent bands and base stations in adjacent bands will have been designed to tolerate the UL transmissions from mobile phones in adjacent bands. For example, FIG. 16a shows the FDD band 7 UL band divided into sub-bands A through G. FDD mobile phones and base stations operating in shaded sub-band E are designed to tolerate UL transmission in FDD sub-bands A through D, F and G. Thus, if a TDD device is operated in adjacent sub-band D (as shown shaded in FIG. 16b in TDD band 41 sub-band D, the same frequency as FDD band 7 sub-band D), the FDD band 7 mobile phone and base station devices will have no issue with UL part of the TDD transmission in band 41 sub-band D.

But, the DL transmission in TDD band 41 sub-band D is not a scenario that was anticipated in the allocation of FDD band 7 or in mobile phones and base stations designed to operate in that band. Let's consider each device in turn.

In the case of a FDD band 7 mobile phone in sub-band E, it is unlikely to be adversely impacted by base station DL transmissions in adjacent TDD band 41 sub-band D because a mobile phone's band 7 receiver is designed to reject UL transmissions from other mobile phones transmitting in adjacent UL bands. In normal usage, mobile phones might operate within inches of each other (e.g. if two people seated next to each other at a stadium are both making calls) resulting in very high transmit power incident upon each phone's receiver. Technologies (e.g. cavity filters) reject such powerful nearby band transmissions, enabling mobile phones that are physically close to mobile phones using an adjacent band to transmit UL signals without adversely impacting the adjacent mobile phone's DL reception.

But the case of a FDD band 7 base station operating in sub-band E is different. Its receiver was designed to receive UL from mobile devices in FDD band 7 sub-band E and to reject UL from mobiles devices in adjacent FDD band 7 sub-bands A through D, F and G. It was also designed to reject DL transmissions in band 38 TDD sub-band H and band 7 FDD DL in sub-bands A'-H' shown in FIG. 16a. Thus, the only scenario the FDD band 7 base station was not designed for is to reject DL transmissions from other base stations in sub-band A through D, F and G. We shall consider this case.

Figures 15A, 15B:
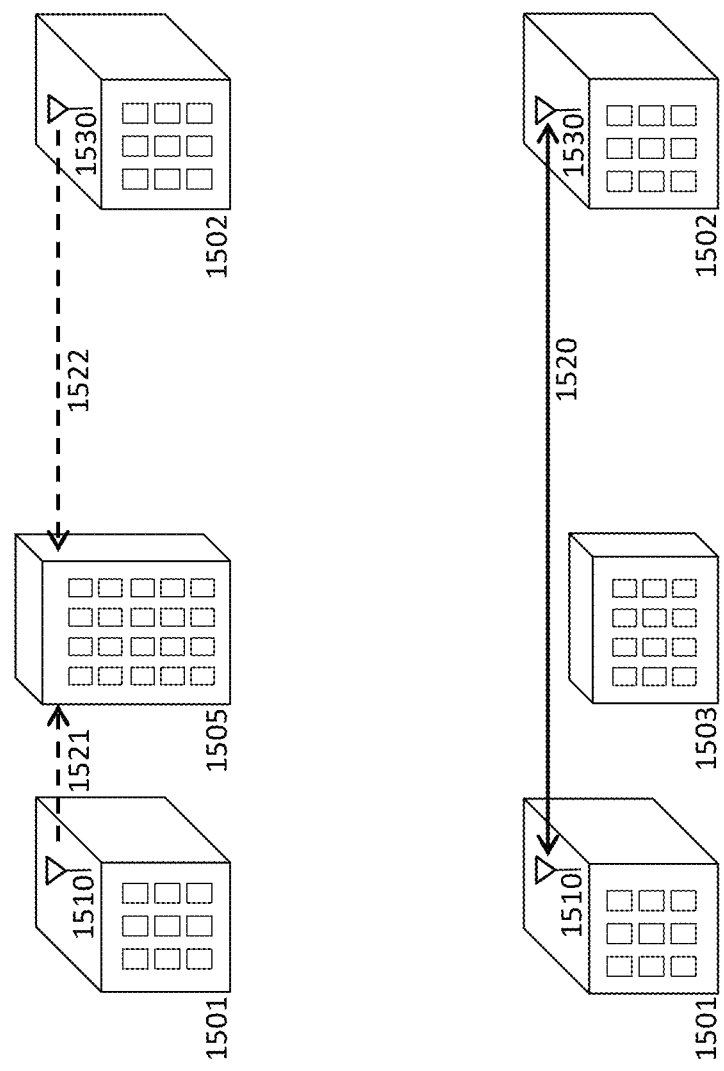
FIGS. 15A, 15B, 15C, and 15D illustrate various propagation scenarios between base station antennas.
Figure 15C:
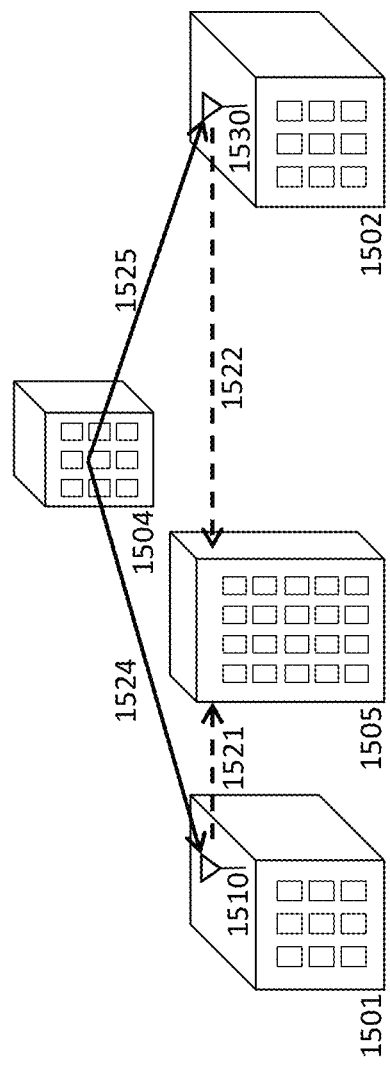
Figure 15D:
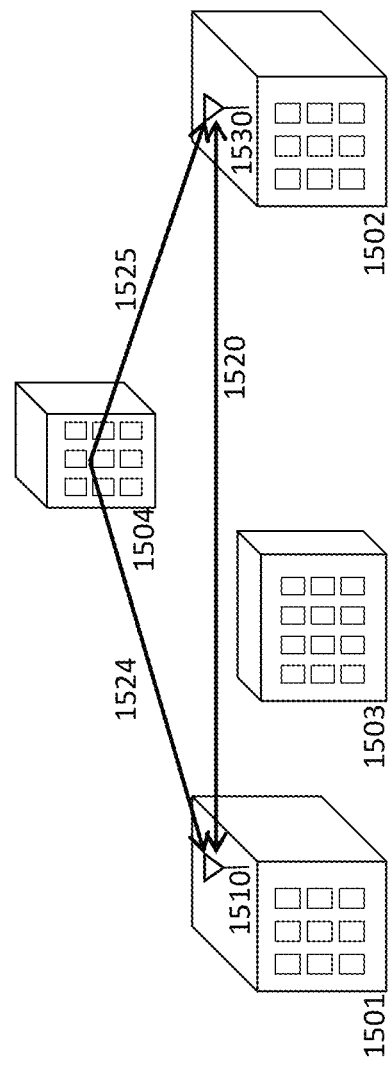

FIGS. 15a, 15b, 15c and 15d consider four transmission scenarios between a TDD band 41 base station (BTS) 1510 on structure 1501 (e.g. a building, a tower, etc.) transmitting in sub-band D and an FDD band 7 base station (BTS) 1530 on structure 1502 receiving in UL sub-band E and transmitting in DL sub-band E'. In scenario:

a. 15a: there no path between TDD BTS 1510 and FDD BTE 1530 because the transmission is completely obstructed by building 1505 and there is no multi-path route around building 1505, and as a result no TDD DL signal will reach FDD BTS 1530.

b. 15b: there is only a Line of Sight (LOS) path between TDD BTS 1510 and FDD BTS 1530. A LOS path will result in a very powerful TDD DL signal reaching FDD BTS 1530.

c. 15c: there is a Non-Line of Sight (NLOS) path between TDD BTS 1510 and FDD BTS 1530, but no LOS path. While it is possible that an NLOS path is via a highly efficient reflector (e.g. a large wall of metal) that is exactly angled such that the signal reaching FDD BTS 1530 approaches the power of an LOS signal, it is statistically unlikely in real-world scenarios that an NLOS path exists that approaches the efficiency of a LOS path. In contrast, what is likely in real-world scenarios is that an NLOS path will be affected by objects that reflect and scatter in a variety of angles as well as objects that absorb and refract the signal to a greater or lesser degree. Further, by definition NLOS paths are longer than LOS paths resulting in higher path loss. All of these factors result in significant path loss in NLOS paths relative to LOS paths. Thus, statistically, it is likely in real-world scenarios that the TDD DL NLOS signal power received by the FDD BTS 1530 will be much less than the TDD DL LOS signal power received by the FDD BTS 1530 as illustrated in FIG. 15b.

d. 15d: there is both an LOS and NLOS path between TDD BTS 1510 and FDD BTS 1530. This scenario is effectively the sum of scenarios 15b and 15c, resulting in the FDD BTS 1530 receiving the sum of a very powerful signal from the LOS path from TDD BTS 1510 as well as a statistically much weaker signal from the NLOS path from TDD BTS 1510.

In considering the four scenarios of the previous paragraph, clearly scenario 15a presents no issue at all since there is no signal received by FDD BTS 1530. NLOS scenario 15c results in some TDD DL BTS 1510 signal reaching FDD BTS 1530, but statistically it is a much weaker signal than an LOS signal. Further, in the unlikely, but possible, scenario where an NLOS path is a highly efficient reflector, then that can often be mitigated by site planning, e.g., repositioning or repointing the TDD DL BTS 1510 antenna such that the NLOS path is not efficiently reflected. Scenarios 15b (LOS) and 15d (LOS+NLOS) are the problematic scenarios because of the LOS component in each resulting in a high power signal in an adjacent band, which the FDD BTS 1530 was not designed to tolerate.

While the NLOS components of scenarios 15c and 15d certainly can result in a lower power signal received by the FDD BTS 1530 in an adjacent UL band, the FDD BTS 1530 is designed to reject lower power, largely NLOS signal from the entire UL band from mobile devices, e.g., using cavity filters. Thus, if the LOS component of scenarios 15b and 15d can be mitigated, leaving only a lower power (e.g. avoiding unlikely highly efficient reflections) NLOS signal component from scenarios 15c and 15d, then this would result in the FDD BTS 1530 only receiving transmissions in the UL band at power levels it was designed to tolerate and would thus enable DL transmissions from TDD BTS 1510 in the UL band without disrupting the operation of the FDD BTS 1530. As noted previously, no other transmission direction in the FDD UL band will disrupt adjacent band operation and, thus, if the TDD DL BTS 1510 LOS transmission component to the FDD BTS 1530 can be mitigated, then FDD UL bands can be used for TDD bi-directional operation without disrupting adjacent band FDD operation.

As previously disclosed in the Related Patents and Applications, a multi-user multi-antennas system (MU-MAS), such as the DIDO system, the technology marketed under pCell™ trademark, or other multi-antenna systems are able to utilize channel state information (CSI) knowledge from the location of a user antenna to either synthesize a coherent signal at the location of the user antenna, or synthesize a null (i.e. zero RF energy) at that location. Typically, such CSI is determined from an in-band (IB) training signal, either transmitted from the base station to the user device, with the user device responding with CSI information, or transmitting from the user device to the base station, with the base station exploiting reciprocity to determine CSI as the location of the user antenna.

Figure 14:
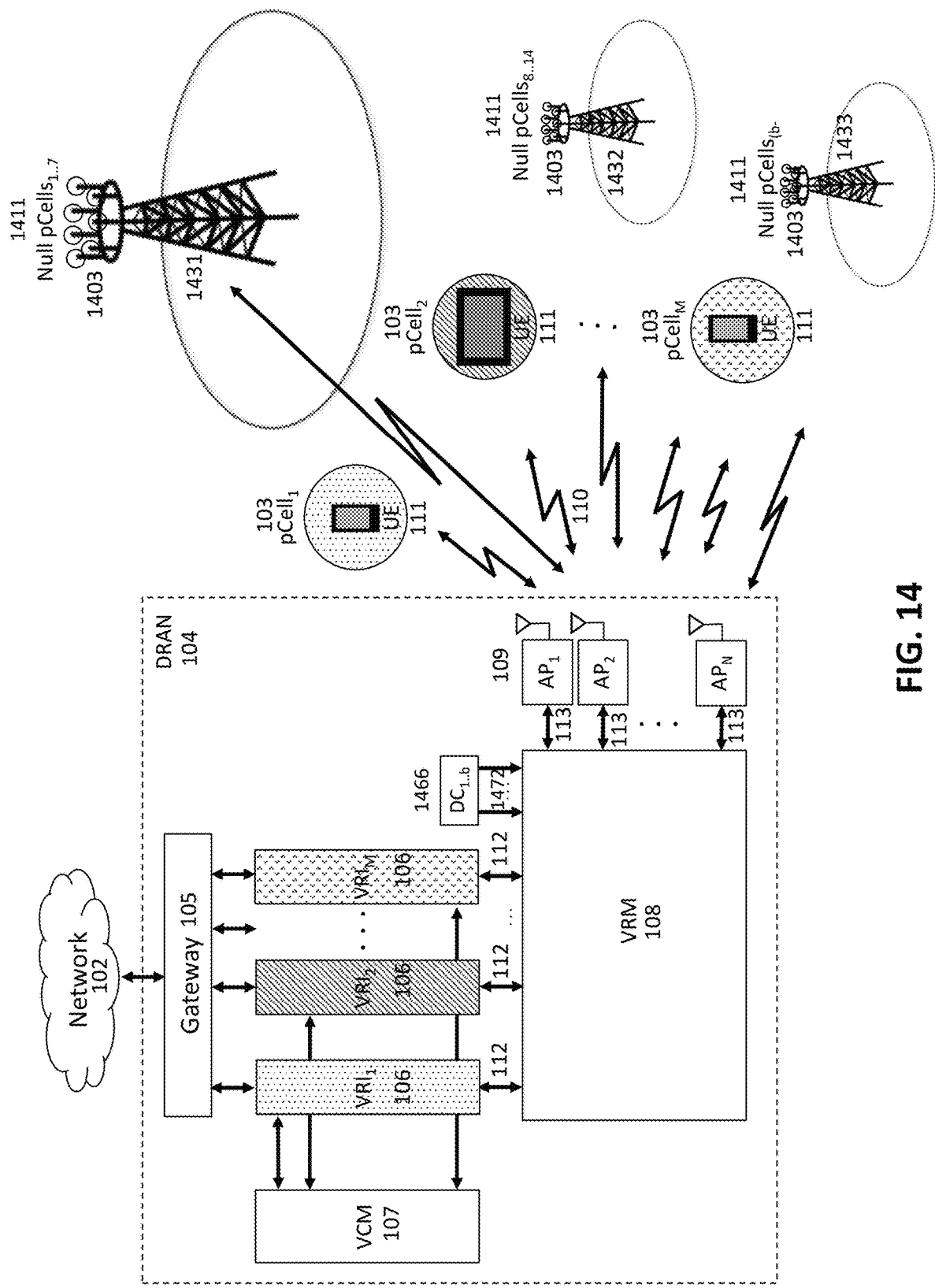
FIG. 14 illustrates a DRAN that synthesizes null pCells at the location of base station antennas.

In one embodiment the MU-MAS system as depicted in FIG. 14 and operates as described in Sections 1-4, above, estimates the CSI at each UE location 111, synthesizing independent pCells 103 ($pCell_1$, $pCell_2$, ... $pCell_M$) in the same frequency band at each UE location 111 with the signal from each of the respective VRIs 106 ($VRI_1$, $VRI_2$, ... $VRI_M$). In addition to estimating the CSI at each UE location 111 as described in Section 1-4 above, in this embodiment the MU-MAS system also estimates CSI at each antenna 1403 shown on structures 1431-1433 and as it synthesizes pCells 103 at each location 111, it also concurrently synthesizes pCells 1411 (pCells 1 ... 7, 8 ... 14, and (b-6) ... b, (collectively, $pCells_{1...b}$)) at the location of each antenna 1403, with all pCells in the same frequency band. But unlike pCells 103, which each contains a synthesized waveform from its respective VRI, each pCell 1411 is a null with zero RF energy.

In one embodiment the null pCells 1411 described in the previous paragraph are synthesized by instantiating VRIs 1466 that input flat (Direct Current ($DC_{1...b}$)) signals to the VRM 108. In another embodiment, they are calculated within the VRM as null locations using techniques previously disclosed in the Related Patents and Applications for synthesizing null signal (zero RF energy) contributions at antenna locations.

When an in-band ("IB") training signal is used to estimate the CSI at the location of each antenna 1403, a highly accurate CSI estimation will result, using the techniques described in Sections 1 through 4 and in the Related Patents and Applications. For example, if the pCell transmission band is from 2530 to 2540 MHz, band D in FIG. 16b, if a training signal in the same frequency range of 2530 to 2540 is used, a highly accurate CSI estimation will result. But when an out-of-band ("OOB") signal (e.g. at 2660 to 2670 MHz) is used to estimate the CSI at the location of an antenna instead of an IB signal (e.g. at 2530 to 2540 MHz, band E' in FIG. 16a), such an OOB CSI estimate will only be reasonably accurate if the channel is "frequency flat" between the IB and OOB frequencies. Frequency flat means that the channel has flat fading in both the IB and OOB frequencies, such that the signals in each of the IB and OOB frequencies experience the same magnitude of fading. If the IB and OOB frequencies have selective fading, i.e. frequency components of IB and OOB frequencies experience uncorrelated fading, then using the CSI estimate obtained from an OOB signal may not be very accurate for an IB signal. Thus, if band E' of FIG. 16a is frequency flat relative to band D of Fig. b then a training signal in band E' can be used to obtain a highly accurate CSI for band D. But, if band E' has significant selective fading relative to band D, then a training signal from band E' will not result in an accurate CSI for band D.

A purely LOS signal in free space where there is no NLOS component (e.g. as illustrated in FIG. 15b) is in a frequency-flat channel. Thus, if the only component to the signal is LOS, then an OOB signal can be used to accurately estimate the CSI for an IB signal in at the location of a user antenna. In many real-world deployments, however, there is not a purely LOS signal, but rather there is either no signal at all (e.g. FIG. 15a), only an NLOS signal (e.g. FIG. 15c) or a combined LOS and NLOS signal (e.g. 15d).

If an OOB signal is used to estimate the CSI of FDD BTS 1530's antenna from the perspective of TDD BTS antenna 1510, then the following be the results for each of the scenarios in FIGS. 15a, 15b, 15c and 15d:

a. 15a: no signal, so no CSI will result.
b. 15b: LOS-only will result in CSI that is consistently accurate.
c. 15c: NLOS-only will result in CSI that is not consistently accurate due to the likelihood of selective fading from the NLOS-only channel.
d. 15d: LOS+NLOS that, the resulting CSI will be a combination of CSI components where the NLOS component is not consistently accurate and LOS component is consistently accurate.

We refer to the CSI derived from a pure LOS channel as $C_L$, the CSI derived from a pure NLOS channel as $C_N$, and the CSI derived from a channel with a combination of pure LOS and pure NLOS components as $C_{LN}$. The CSI of a combined LOS and NLOS can then be formulated as $C_{LN}=C_L+C_N$.

In the case of a pure LOS channel between Access Points 109 ($AP_{1...N}$) and antennas 1403 in FIG. 14, then the only CSI component is a $C_L$ for each antenna 1403. Since pure LOS channels are frequency flat, if an OOB signal is used for the deriving the CSI, the CSI for each antenna 1403 will still be accurate. Thus, when using an OOB signal to derive the CSI, the LOS signal from each AP 109 will be nulled with a high degree of accuracy at the location of each antenna 1403, resulting in little or no detectable signal by each antenna 1403 from the transmissions of APs 109.

In the case of a pure NLOS channel between APs 109 and the antennas 1403, then the only CSI component for is a $C_N$ for each antenna 1403. If an OOB signal is used for the deriving the CSI, the CSI for each antenna 1403 will be more or less accurate, depending on how frequency flat the channel is. Thus, when using an OOB signal to derive the CSI, the NLOS signal from each AP 109 will be either nulled completely (in the case of a perfectly frequency-flat channel), partially nulled, or not nulled at all, depending on the degree of channel frequency selectivity. To the extent the NLOS signals are not nulled, each antenna 1403 will receive some random summation of the NLOS signals from the APs 109. Thus, there may be some reduction in the NLOS signal strength from APs 109 to the antennas 1403, but the NLOS signal strength will be no higher than NLOS signal strength than would have been received had no CSI been applied to attempt to null the NLOS signals.

In the case of a combined LOS and NLOS channel between APs 109 and the antennas 1403, then the CSI is a combination of LOS and NLOS components $C_{LN}=C_L+C_N$ for each antenna 1403. If an OOB signal is used for the deriving the CSI, the $C_L$ component of the CSI for each antenna 1403 will be highly accurate and CSI for $C_N$ component will be more or less accurate, depending on how frequency flat the channel is. The $C_L$ component of the CSI affects the nulling of the LOS component of the signal between the APs 109 and the antennas 1403, while the $C_N$ component of the CSI affects the nulling of the NLOS component of the signal between the APs 109 and the antennas 1403. Thus, when using an OOB signal to derive the CSI, the LOS signal from each AP 109 will be consistently nulled completely, while the NLOS signal from each AP 109 will be nulled to a greater or lesser degree, depending on the degree of channel frequency selectivity. So, in sum, the LOS components of the transmissions from APs 109 will be completely nulled, and NLOS components of the transmissions from APs 109 will have no greater signal strength than would have been received by the antennas 1403 had no CSI been applied to attempt to null the NLOS signals.

As previously noted above, in the scenarios shown in FIGS. 15a, 15b, 15c, and 15d, the problematic scenarios are when the LOS component of TDD BTS 1510 is received by FDD BTS 1530. It is generally not a problem when the NLOS component of TDD BTS 1510 is received by FDD BTS 1530. Consider the MU-MAS embodiment described in the preceding paragraphs: If TDD BTS 1510 is one of the APs 109 from FIG. 14 and FDD BTS 1530 is one of the antennas 1403, then if the training signal used to determine the CSI for antennas 1403 is an IB signal, then transmission from TDD BTS 1530 will be completely nulled at FDD BTS 1530. If the training signal used to determine the CSI for antennas 1403 is an OOB signal, then the LOS transmission from FDD BTS 1530 will be completely nulled at FDD BTS 1530, and the NLOS transmission from TDD BTS 1530 to FDD BTS 1530 will be no worse than if no CSI had been applied to attempt to null the NLOS signals. Thus, an OOB training signal from antenna 1530 will completely null any LOS component of a transmission from antenna 1510, but will neither reliable null nor make any stronger any NLOS component of a transmission from antenna 1510.

Since only the LOS component of the signal transmitted from antenna 1510 is problematic and it has been nulled, and NLOS component of antenna 1510 is not problematic and won't be made any worse, we thus have an embodiment in which a TDD BTS 1530 can operate in a MU-MAS system such as that shown in FIG. 14 in FDD UL spectrum without significantly disrupting the receiver performance of an adjacent band FDD BTS, provided that at least an OOB signal from the FDD BTS is available.

In the case of many FDD systems, such an OOB signal is indeed available. For example, in FIG. 16a, the FDD BTS 1530 that is receiving UL in sub-band E is concurrently transmitting DL in sub-band E'. While data traffic may vary in the DL sub-band, the control signals typically (e.g. in the LTE standard) are transmitted repeatedly. So, at a minimum, these DL control signals can be used as the OOB training signal used for determining the CSI of the FDD BTS 1530, utilizing reciprocity techniques previously disclosed in the Related Patents and Applications, and applying the CSI derived from channel reciprocity of the DL transmission from FDD BTS 1530 (corresponding to antennas 1403 in FIG. 14) in sub-band E' to create a null at FDD BTS 1530 (corresponding to antennas 1403 in FIG. 14) in sub-band D concurrently with the TDD DL transmission from TDD BTS 1510 (corresponding to APs 109 in FIG. 14) to UEs at locations 111. The LOS component of the sub-band D TDD DL transmission from TDD BTS 1510 (corresponding to APs 109 in FIG. 14) will be completely nulled at FDD BTS 1530 (corresponding to antennas 1403 in FIG. 14), while the NLOS component of the sub-band D TDD DL transmission will be no worse that it would be had been had there been no nulling of the LOS component.

In addition to creating a null for TDD DL transmissions at the location of FDD BTS locations 1530 within the bandwidth of the TDD DL transmissions, it is desirable to also null high power OOBE from the TDD DL transmission at the FDD BTS locations. Because the OOBE from the LOS component is in a frequency-flat channel, then nulling of the in-band LOS component will also null the OOBE from the LOS component. However, to the extent the NLOS component is in a frequency-selective channel, the OOBE of the NLOS component will not be nulled, but it will be no worse than the OOBE from the NLOS would have been had there been no attempt to null the LOS component. The power of the OOBE of each of the LOS and NLOS transmissions is proportionate to the power of the in-band LOS and NLOS transmissions, respectively. Thus, nulling the OOBE of the LOS transmission, and making the OOBE of the NLOS transmission no worse than it would otherwise have been, addresses the highest-power and most problematic OOBE component, LOS, will making the less-problematic NLOS component no worse.

FDD base stations typically have multiple antennas for diversity, beamforming, MIMO or other reasons. This scenario is depicted in FIG. 14 where there are multiple antennas 1411 on each structure 1431-1433. So, rather than the single FDD BTS antenna 1530 depicted in FIGS. 15a, 15b, 15c and 15d, typically there would be multiple FDD BTS antennas 1411. To the extent any such antennas are transmitting, then the MU-MAS system described above and depicted in FIG. 14 would receive a transmission from each of the antennas 1411 that it would use to derive the CSI for each antenna and null the LOS component of the APs 109 transmissions to that antenna. In another embodiment, nulls would only be created for some of the BTS antenna 1411. For example, some of the antennas 1411 might not be used in UL reception, and it would be unnecessary to create a null for them.

In a wide-scale deployment of the above embodiments, many TDD BTS antennas and adjacent sub-band FDD BTS antennas would be distributed throughout a large coverage area (e.g. a city, a region, a country or a continent). Clearly, not all antennas would be within range of each other, and as such it would only be necessary to null a TDD BTS DL transmission that is of sufficient power levels to interfere with a given FDD BTS antenna. In one embodiment, the VRM 108 receives from TDD BTS DL APs 109 transmissions from FDD BTS antennas 1403 and assesses the power level incident from the TDD BTS APs 109 upon each FDD BTS antenna 1403 from each TDD BTS AP 109. Various means can be used to make this assessment, including utilizing channel reciprocity. The VRM 108 only synthesizes nulls at the FDD BTS antennas 1403 that would be receiving OOBE or receiver blocking/receiver desensitization power above a given threshold. The threshold can be set to any level, including, but not limited thresholds that are determined to be an interfering threshold or a threshold established by spectrum regulations.

The null pCells 1411 are similar to pCells 103 transmitting a signal in that they require computing resources and AP 109 resources. Thus, it is advantageous to minimize the number of AP 109 resources needed to create null pCells throughout the coverage area. In another embodiment clustering techniques such as those previously disclosed in the Related Patents and Applications can be utilized to reduce the number of APs 109 needed to synthesize the pCells 103 needed for user devices and pCells 1411 needed to null antennas 1403 throughout the coverage area.

The embodiments described above address creating nulls at FDD DL antennas that have no knowledge of the TDD operation in adjacent spectrum. In another embodiment the FDD DL antennas do have knowledge of the TDD operation in adjacent spectrum and cooperate with the TDD system. In one embodiment, the FDD DL antennas 1403 regularly transmit a training signal within the TDD band (e.g. such as the LTE SRS signal) the enables the MU-MAS system in FIG. 14 to have an IB reference for determining accurate CSI for the FDD DL antennas 1403. With accurate CSI the VRM 108 will be able to synthesize a null for both the LOS and NLOS components, thus enabling a very high power TDD DL transmission to be used in adjacent spectrum since even the NLOS signal will be nulled. In another embodiment the FDD DL transmission is timing and/or frequency interleaved with training signals from either the UEs (such as SRS) or the TDD DL BTS. In another embodiment the FDD DL antennas 1403 also transmit an IB training signal in their own UL spectrum (e.g. choosing a time when there is no concurrent UL activity) that the VRM 108 can use to determine the OOBE CSI and create nulls for both the NLOS as well as the LOS OOBE.

In another embodiment the antennas 1403 are TDD antennas used in adjacent TDD spectrum. When adjacent TDD systems are synchronized in UL and DL, then interference from OOBE and receiver blocking/receiver desensitization is minimized since all BSTs are in transmit or receive mode at the same time. Sometimes there is a need to have adjacent TDD system operate without synchronizing DL and UL times, for example, if adjacent networks require different DL and UL ratios or if they have different latency requirements, e.g., if one network needs more frequent DL or UL intervals to reduce round-trip latency. In these scenarios, adjacent bands will be in use with UL and DL at the same time. The same techniques described above can be used for one or both systems to synthesize nulls at the BST antennas of the other system during DL intervals. Per the techniques described above, one or both of the in-band and the OOBE transmissions can be nulled, either nulling the LOS component or the NLOS component as well.

In one embodiment the same spectrum for the MU-MAS system in FIG. 14 is used to provide terrestrial wireless services while it is concurrently used as a DL band (i.e. with transmissions directed skyward) for aircraft. Even though the MU-MAS system is intended for terrestrial use, to the extent the aircraft falls within the antenna pattern of the APs 109 the path from the APs 109 to the aircraft will be LOS or largely LOS and potentially could interfere with the DL to the aircraft. By receiving the UL (i.e. transmission directed to the ground) from the aircraft, the VRM can derive the CSI to the aircraft antennas using the techniques described previously and thus synthesize a null at the locations of the aircraft antennas. Since the path to the aircraft is LOS, the CSI can be quite accurate, even if the aircraft UL signal is OOB. Thus, in this way spectrum can be concurrently used with aircraft DL. This is a very efficient use of spectrum since aircraft do not fly by very often and if spectrum were reserved exclusively for aircraft, it would be inactive most of the time.

In another embodiment the aircraft's antenna(s) are treated as one or more UEs along with the terrestrial UEs, and when the aircraft flies within range of the MU-MAS system show in FIG. 14, it uses UL and DL capacity the same as any other UEs. Multiple antennas can be used on the aircraft to increase capacity. The antennas can be located spread apart from each other on or in the aircraft and can be polarized to increase capacity. Individuals within the aircraft can also use their own devices (e.g. mobile phones) in the same spectrum, connected to the same MU-MAS. The MU-MAS would create independent pCells for the aircraft antennas and for the user UEs.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices. Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

We claim:

1. A ground-based wireless transceiver station configured to create a plurality of concurrent and independent orthogonal frequency-division multiplexing ("OFDM") wireless links between the ground-based wireless transceiver station and a plurality of user devices within a same frequency band, the plurality of wireless links formed over multipath downlink or uplink channels;

wherein the ground-based wireless transceiver station comprises one or more computer processors that carry out instructions embodied in a non-transitory computer readable medium so that the ground-based wireless transceiver station is configured to create the plurality of concurrent and independent OFDM wireless links using a plurality of ground-based wireless transceiver station antennas equal to more than ten times a number of antennas configured to communicate over at least one of the uplink channels of the plurality of concurrent and independent OFDM wireless links of at least one user device;

wherein the ground-based wireless transceiver station is configured to create at least one of the plurality of concurrent and independent OFDM wireless links with at least one user device's antennas in or on an aircraft flying over the ground-based wireless transceiver station and at least one of the plurality of concurrent and independent OFDM wireless links with at least one ground-based user device's antennas; and wherein the ground-based wireless transceiver station is configured to exploit channel reciprocity by estimating an uplink channel state information (CSI) between the plurality of ground-based wireless transceiver station antennas the at least one user device's antennas or the at least one ground-based user device's antennas and using it to derive a downlink CSI.

2. The ground-based wireless transceiver station as in claim 1 wherein the ground-based wireless transceiver station is configured to estimate a CSI between the plurality of antennas on the ground-based wireless transceiver station and the at least one user device's antennas or the at least one ground-based user device's antennas by using pilot tones, channel sounding or training signals.

3. The ground-based wireless transceiver station as in claim 1 wherein the ground-based wireless transceiver station is configured to estimate a CSI between the plurality of antennas on the ground-based wireless transceiver station and the at least one user device's antennas or the at least one ground-based user device's antennas by training signals that are orthogonal.

4. The ground-based wireless transceiver station as in claim 1 wherein the ground-based wireless transceiver station is configured to store a CSI estimate between the plurality of antennas on the ground-based wireless transceiver station and the at least one user device's antennas or the at least one ground-based user device's antennas in a channel characterization matrix.

5. The ground-based wireless transceiver station as in claim 1 wherein the ground-based wireless transceiver station is configured to store a CSI estimate between the plurality of antennas on the ground-based wireless transceiver station and the at least one user device's antennas or the at least one ground-based user device's antennas in a channel characterization matrix comprised of phase and amplitude of an uplink channel corresponding to the stored CSI estimate.

6. The ground-based wireless transceiver station as in claim 1 wherein the ground-based wireless transceiver station is configured to direct the plurality of user devices to transmit training signals.

7. The ground-based wireless transceiver station as in claim 1 wherein the ground-based wireless transceiver station is configured to direct the plurality of user devices to transmit training signals that are synchronized.

8. The ground-based wireless transceiver station as in claim 1 wherein the ground-based wireless transceiver station is configured to update a CSI estimate between the plurality of antennas on the ground-based wireless transceiver station and the at least one user device's antennas or the at least one ground-based user device's antennas continually or periodically.

9. The ground-based wireless transceiver station as in claim 1 wherein the ground-based wireless transceiver station is configured to update a CSI estimate between the plurality of antennas on the ground-based wireless transceiver station and the at least one user device's antennas or the at least one ground-based user device's antennas as the at least one user device moves from one location to another.

10. The ground-based wireless transceiver station as in claim 1 wherein the ground-based wireless transceiver station is configured to create the plurality of concurrent and independent OFDM wireless links via precoding based on a plurality of CSI estimates between the plurality of antennas on the ground-based wireless transceiver station and the at least one user device's antennas or the at least one ground-based user device's antennas.

11. The ground-based wireless transceiver station as in claim 1 wherein the ground-based wireless transceiver station is configured to divide the plurality of user devices into groups.

12. The ground-based wireless transceiver station as in claim 1 wherein the ground-based wireless transceiver station is configured to divide the plurality of user devices into groups and schedule different groups of users by cycling between groups.

13. The ground-based wireless transceiver station as in claim 1 wherein the ground-based wireless transceiver station is configured to divide the plurality of user devices into groups and assign the same or different levels of bandwidth to the user devices.

14. The ground-based wireless transceiver station as in claim 1 wherein the ground-based wireless transceiver station is configured to divide the plurality of user devices into groups and schedule different groups based on relative proximity between the plurality of user devices.

* * * * *